(12) United States Patent
Emamjomeh et al.

(10) Patent No.: US 12,110,362 B2
(45) Date of Patent: Oct. 8, 2024

(54) THREE-DIMENSIONAL PRINTING

(71) Applicant: HEWLETT-PACKARD DEVELOPMENT COMPANY, L.P., Spring, TX (US)

(72) Inventors: Ali Emamjomeh, San Diego, CA (US); Shannon Reuben Woodruff, San Diego, CA (US); Kenneth Flack, San Diego, CA (US); Greg S Long, Corvallis, OR (US); Katrina Donovan, Corvallis, OR (US); Erica Fung, San Diego, CA (US); Jacob Tyler Wright, San Diego, CA (US); James W Stasiak, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 105 days.

(21) Appl. No.: 16/756,391

(22) PCT Filed: Sep. 7, 2018

(86) PCT No.: PCT/US2018/050053
§ 371 (c)(1),
(2) Date: Apr. 15, 2020

(87) PCT Pub. No.: WO2019/108288
PCT Pub. Date: Jun. 6, 2019

(65) Prior Publication Data
US 2021/0095152 A1      Apr. 1, 2021

(30) Foreign Application Priority Data

Nov. 30, 2017 (WO) ............... PCT/US2017/063935
Jul. 31, 2018 (WO) ............... PCT/US2018/044635

(51) Int. Cl.
C08G 65/00         (2006.01)
B29C 64/165        (2017.01)
(Continued)

(52) U.S. Cl.
CPC .......... *C08G 65/007* (2013.01); *B29C 64/165* (2017.08); *B29C 64/194* (2017.08);
(Continued)

(58) Field of Classification Search
CPC ..... C09D 11/101; C09D 11/38; B29C 64/165; B29C 64/153
See application file for complete search history.

(56) References Cited

U.S. PATENT DOCUMENTS 5,674,314 A  10/1997 Auslander et al.
5,843,328 A  12/1998 Pacifici
(Continued)

FOREIGN PATENT DOCUMENTS

CN       1358807 A    7/2002
CN     102099416 A    6/2011
(Continued)

OTHER PUBLICATIONS

Junkar et al. "The Role of Crystallinity on Polymer Interaction with Oxygen Plasma" Plasma Process. Polym. 2009, 6, p. 667-675. (Year: 2009).*
(Continued)

*Primary Examiner* — Timothy Kennedy
*Assistant Examiner* — Ariella Machness
(74) *Attorney, Agent, or Firm* — Dierker & Kavanaugh, P.C.

(57) ABSTRACT

An example of a three-dimensional (3D) printing kit includes a build material composition and a fusing agent to be applied to at least a portion of the build material composition during 3D printing. The build material composition
(Continued)

includes a semi-crystalline thermoplastic polymer having a surface energy density greater than 41 mN/m. The fusing agent includes an energy absorber to absorb electromagnetic radiation to coalesce the semi-crystalline thermoplastic polymer in the at least the portion.

12 Claims, 14 Drawing Sheets

(51) Int. Cl.
| | |
|---|---|
| B29C 64/194 | (2017.01) |
| B29C 64/264 | (2017.01) |
| B29K 75/00 | (2006.01) |
| B33Y 10/00 | (2015.01) |
| B33Y 40/10 | (2020.01) |
| B33Y 70/00 | (2020.01) |
| B33Y 70/10 | (2020.01) |
| B33Y 80/00 | (2015.01) |
| C08F 14/26 | (2006.01) |
| C08G 77/46 | (2006.01) |
| C08L 27/18 | (2006.01) |
| C08L 77/00 | (2006.01) |
| C09D 11/037 | (2014.01) |
| C09D 11/101 | (2014.01) |
| C09D 11/102 | (2014.01) |
| C09D 11/106 | (2014.01) |
| C09D 11/322 | (2014.01) |
| C09D 11/38 | (2014.01) |

(52) U.S. Cl.
CPC .......... *B29C 64/264* (2017.08); *B33Y 10/00* (2014.12); *B33Y 40/10* (2020.01); *B33Y 70/00* (2014.12); *C08F 14/26* (2013.01); *C08G 77/46* (2013.01); *C08L 27/18* (2013.01); *C08L 77/00* (2013.01); *C09D 11/037* (2013.01); *C09D 11/101* (2013.01); *C09D 11/102* (2013.01); *C09D 11/106* (2013.01); *C09D 11/322* (2013.01); *C09D 11/38* (2013.01); *B29K 2075/00* (2013.01); *B29K 2995/0021* (2013.01); *B29K 2995/004* (2013.01); *B33Y 70/10* (2020.01); *B33Y 80/00* (2014.12); *C08L 2205/06* (2013.01)

(56) References Cited

U.S. PATENT DOCUMENTS

| | | | |
|---|---|---|---|
| 5,958,547 | A | 9/1999 | Fukunishi |
| 6,057,414 | A | 5/2000 | Razavi |
| 8,258,203 | B2 | 9/2012 | Held et al. |
| 9,327,452 | B2 | 5/2016 | Mark et al. |
| 2009/0258984 | A1 | 10/2009 | Sandford et al. |
| 2010/0323119 | A1* | 12/2010 | Berthelot .................. C08J 7/123 427/407.1 |
| 2012/0116003 | A1 | 5/2012 | Brothers et al. |
| 2013/0072614 | A1* | 3/2013 | Lindstrom ........... C09D 11/324 524/388 |
| 2015/0232654 | A1 | 8/2015 | Sugihara et al. |
| 2016/0271874 | A1 | 9/2016 | Tsai |
| 2016/0289481 | A1 | 10/2016 | Otake |
| 2016/0312037 | A1 | 10/2016 | Zhao et al. |
| 2017/0028632 | A1 | 2/2017 | Cox et al. |
| 2017/0190929 | A1 | 7/2017 | Li |
| 2017/0197366 | A1 | 7/2017 | Abbott, Jr. |
| 2017/0225396 | A1 | 8/2017 | Tom et al. |
| 2017/0253702 | A1 | 9/2017 | Ma et al. |
| 2017/0274594 | A1 | 9/2017 | Ng et al. |
| 2017/0304894 | A1 | 10/2017 | Buller |
| 2017/0312983 | A1* | 11/2017 | Birecki ................ B29C 64/112 |
| 2018/0055968 | A1* | 3/2018 | Desai ...................... A61L 15/44 |
| 2018/0332370 | A1 | 11/2018 | Satosh |
| 2019/0022928 | A1 | 1/2019 | Bartow et al. |
| 2020/0079966 | A1 | 3/2020 | Holt et al. |
| 2020/0308401 | A1* | 10/2020 | Frangov ................... C08J 3/128 |
| 2021/0115224 | A1 | 4/2021 | Kato et al. |

FOREIGN PATENT DOCUMENTS

| | | | | |
|---|---|---|---|---|
| CN | 103709917 | B | 5/2016 | |
| CN | 106796392 | A | 5/2017 | |
| DE | 60215355 | T2 | 8/2007 | |
| DE | 102007026006 | A1 * | 4/2008 | ........ B29C 67/0081 |
| GB | 1426157 | A | 2/1976 | |
| JP | 2011178044 | A | 9/2011 | |
| WO | WO-2004024407 | A1 * | 3/2004 | .......... C04B 41/009 |
| WO | WO-2015100243 | A1 | 7/2015 | |
| WO | WO-2015167520 | A1 | 11/2015 | |
| WO | 2016/053305 | A1 | 4/2016 | |
| WO | WO-2016053312 | A1 | 4/2016 | |
| WO | WO-2016072966 | A1 | 5/2016 | |
| WO | WO-2016099445 | A1 | 6/2016 | |
| WO | 2016/171724 | A1 | 10/2016 | |
| WO | 2016/175748 | A1 | 11/2016 | |
| WO | 2017/018984 | A1 | 2/2017 | |
| WO | WO-2017018985 | A1 | 2/2017 | |
| WO | WO-2017069752 | A1 | 4/2017 | |
| WO | WO-2017069778 | A1 * | 4/2017 | .......... B29C 64/112 |
| WO | WO-2017074397 | A1 | 5/2017 | |
| WO | WO-2017127561 | A1 | 7/2017 | |
| WO | WO-2017131757 | A1 | 8/2017 | |
| WO | WO-2017196328 | A1 | 11/2017 | |
| WO | WO-2017196330 | A1 * | 11/2017 | .......... B29C 64/112 |
| WO | WO-2018022034 | A1 | 2/2018 | |
| WO | WO-2012058278 | A3 | 7/2024 | |

OTHER PUBLICATIONS

M.T. Sprackling, Liquids and Solids. Chapter 7: Surface Effects, London, England: Routledge & Kenan Paul, 1985. (Year: 1985).*

Marchand-Brynaert et al. ("Surface functionalization of poly (ethylene terephthalate) film and membrane by controlled wet chemistry : chemical characterization of carboxylated surfaces", Journal of Colloid and Interface Science, 173, 1, p. 236-244, 1995) (Year: 1995).*

Polymer Database, "Surface Tensions of Solid Polymers", Oct. 19, 2016—see PDF attachment of http://polymerdatabase.com/polymer%20physics/sigma.html from Office Action mailed Nov. 30, 2022 (Year: 2016).*

Saraf et al. "Comparison of three methods for generating superhydrophobic, superoleophobic nylon nonwoven surfaces" J Mater Sci (2011) 46:5751-5760 (Year: 2011).*

Polymer Database ("Surface Tensions of Solid Polymers", http://polymerdatabase.com/polymer%20physics/sigma.html, Oct. 19, 2016 (Year: 2016).*

Shen et al. ("Characterization and cytocompatibility of surface modified polyamide66" J. Biomed Mater Res Part B:Appl Biomater 91B: 897-904, 2009) (Year: 2009).*

Relyon Plasma (Polyethylene (PE); https://www.relyon-plasma.com/glossary/polyethylene/?lang=en) (Year: 2021).*

Junkar, Ita et al. 'The role of crystalinity on polymer interaction with oxygen plasma.' Plasma Processes and Polymers, 2009, vol. 6, pp. 667-675.

Wang, Mian et al., Cold atmospheric plasma (CAP) surface . . . , Sep. 22, 2016, Acta Biomaterialia.

Bart, C., et al., "Determination of Surface Energy Using Different Approaches", Ghent University Faculty of Pharmacy, 2008-2009, pp. 1-55.

* cited by examiner

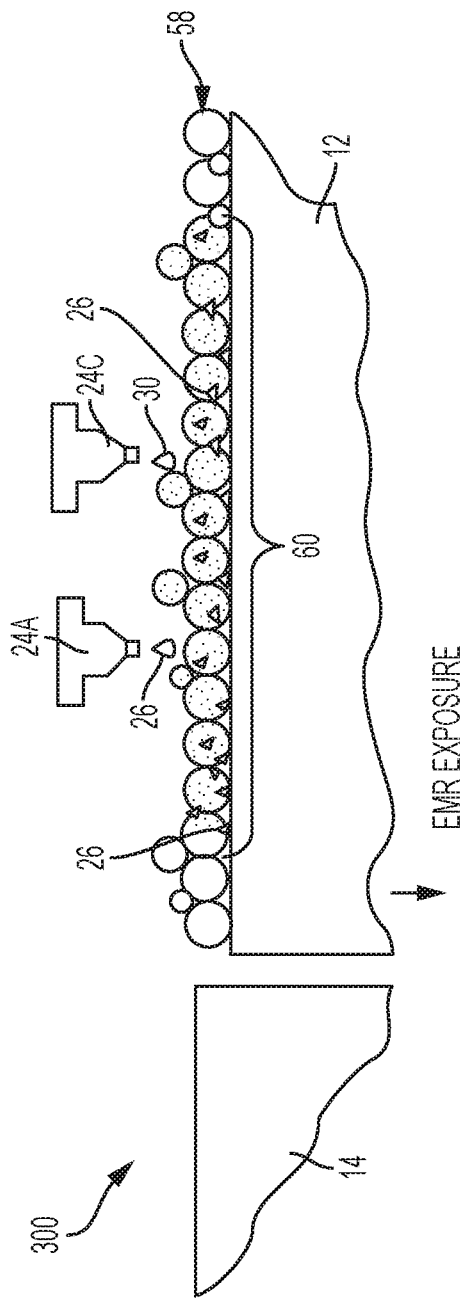
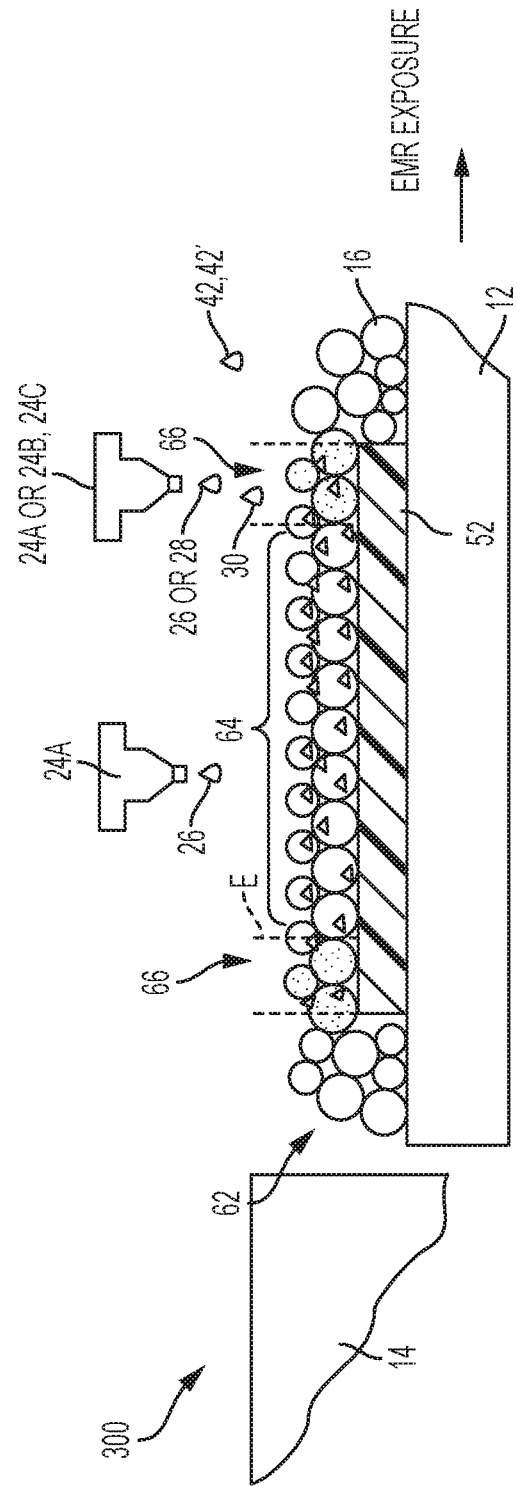

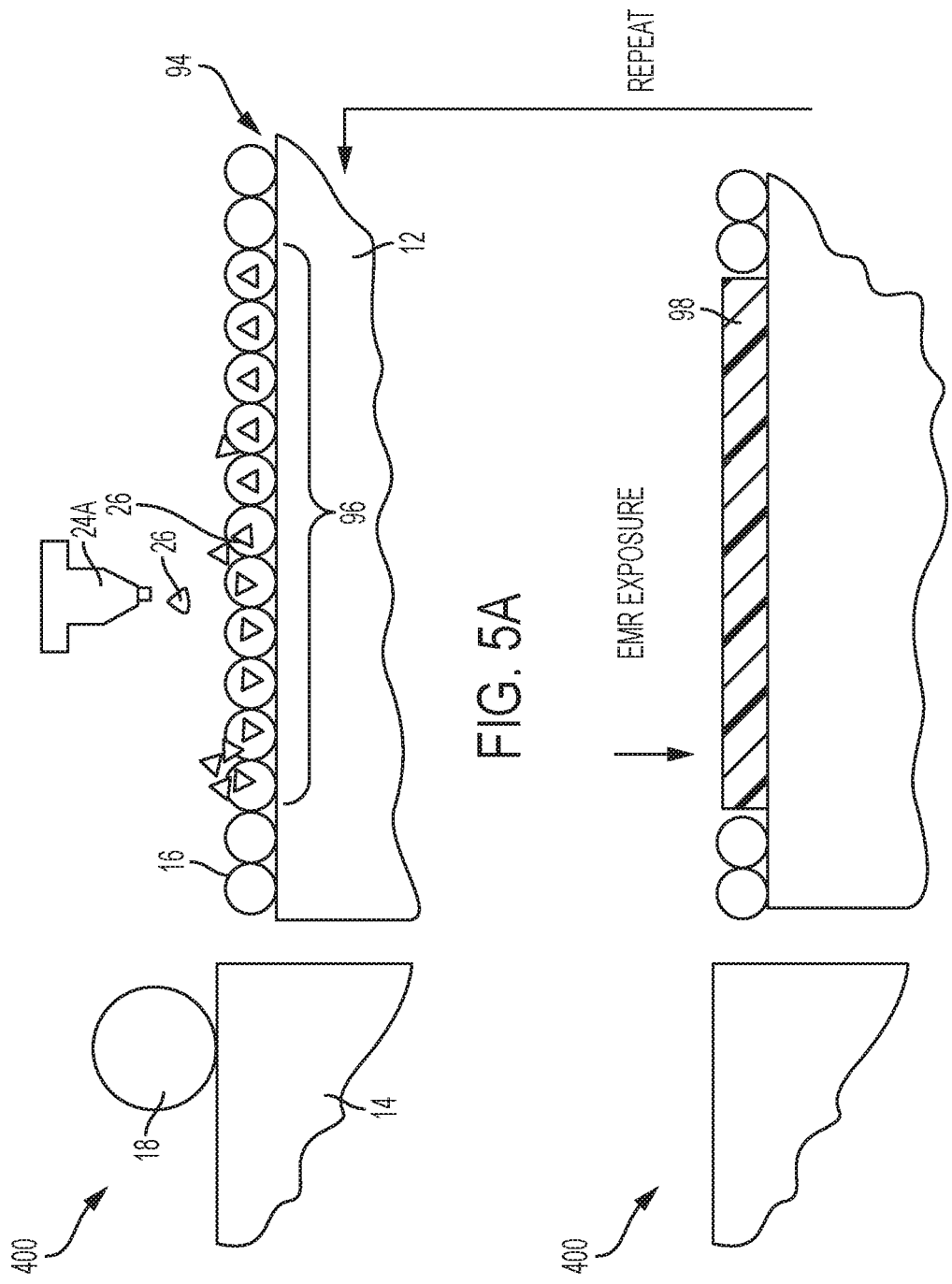

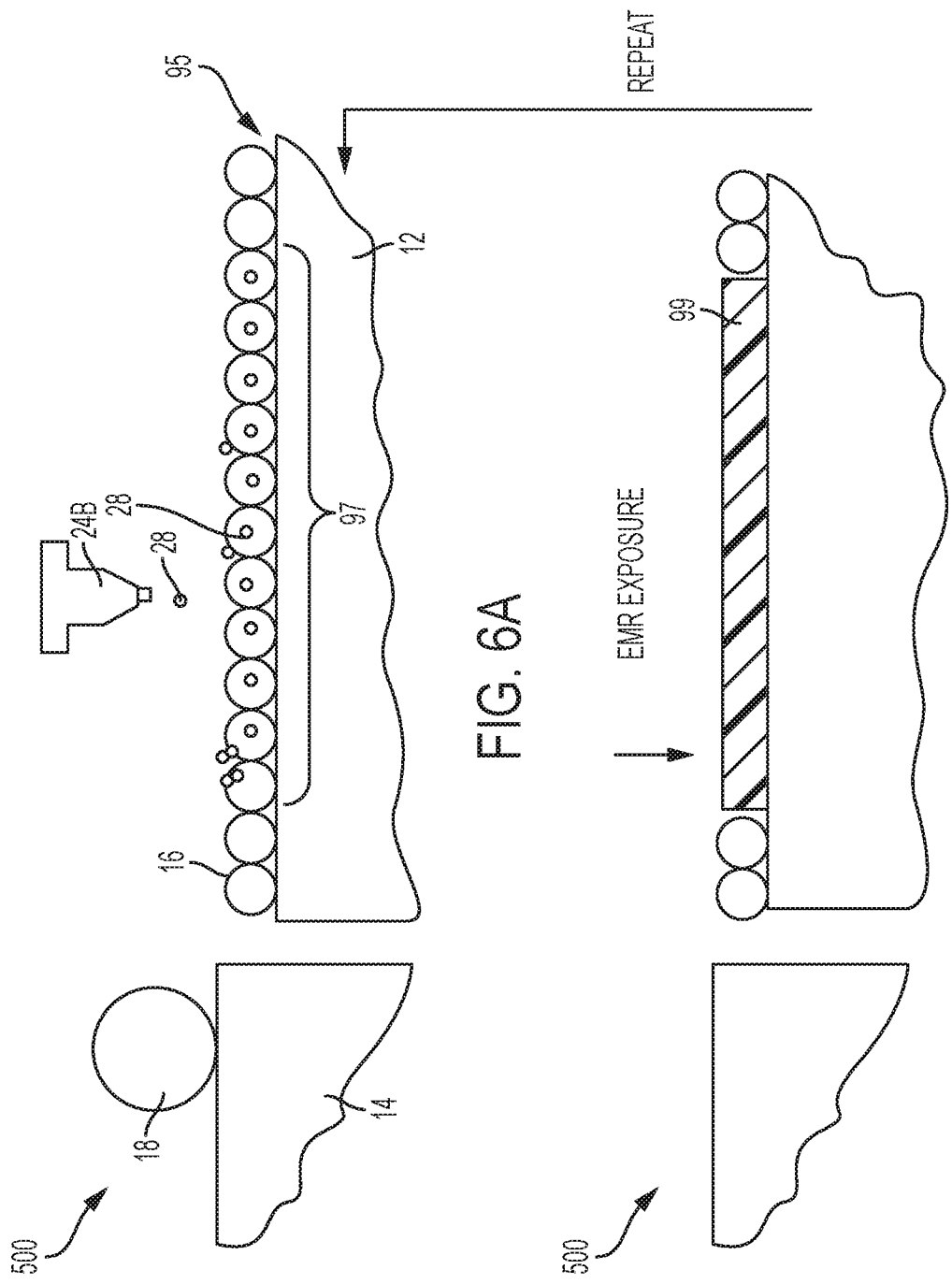

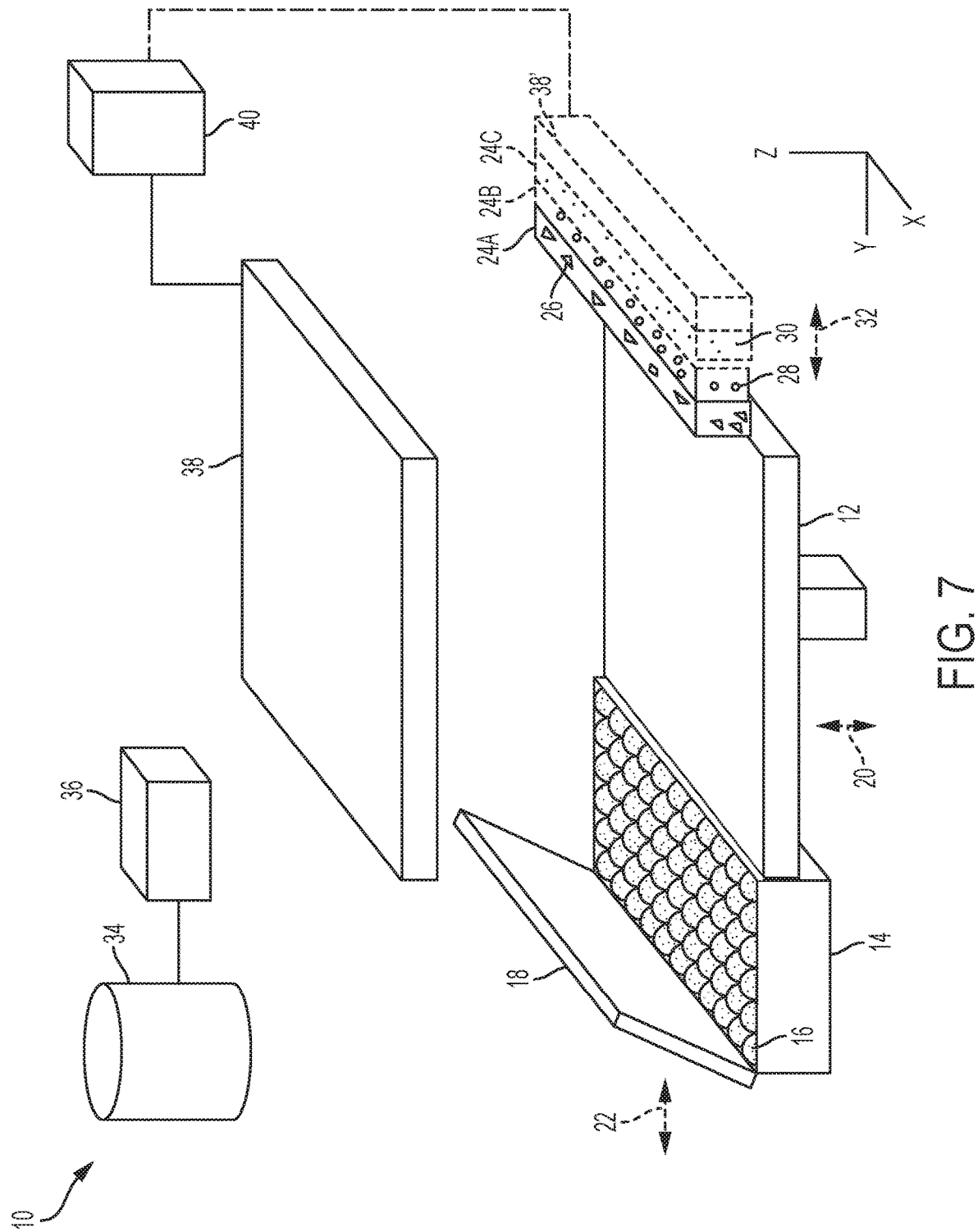

THREE-DIMENSIONAL PRINTING

CROSS-REFERENCE TO RELATED APPLICATIONS

This application claims priority to International Patent Application Number PCT/US2018/044635, filed Jul. 31, 2018, which itself claims priority to International Patent Application Number PCT/US2017/063935, filed Nov. 30, 2017, both of which are incorporated by reference herein in their entireties.

BACKGROUND

Three-dimensional (3D) printing may be an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of material (which, in some examples, may include build material, binder and/or other printing liquid(s), or combinations thereof). This is unlike traditional machining processes, which often rely upon the removal of material to create the final part. Some 3D printing methods use chemical binders or adhesives to bind build materials together. Other 3D printing methods involve at least partial curing, thermal merging/fusing, melting, sintering, etc. of the build material, and the mechanism for material coalescence may depend upon the type of build material used. For some materials, at least partial melting may be accomplished using heat-assisted extrusion, and for some other materials (e.g., polymerizable materials), curing or fusing may be accomplished using, for example, ultra-violet light or infrared light.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIGS. 4A through 4G are schematic views depicting the formation of a part using an example of the 3D printing methods disclosed herein;

FIGS. 5A through 5C are schematic views depicting the formation of a part using another example of the 3D printing methods disclosed herein;

FIGS. 6A and 6B are schematic views depicting the formation of a part using still another example of the 3D printing methods disclosed herein;

FIG. 7 is a simplified isometric and schematic view of an example of a 3D printing system disclosed herein;

DETAILED DESCRIPTION

Figure 1:
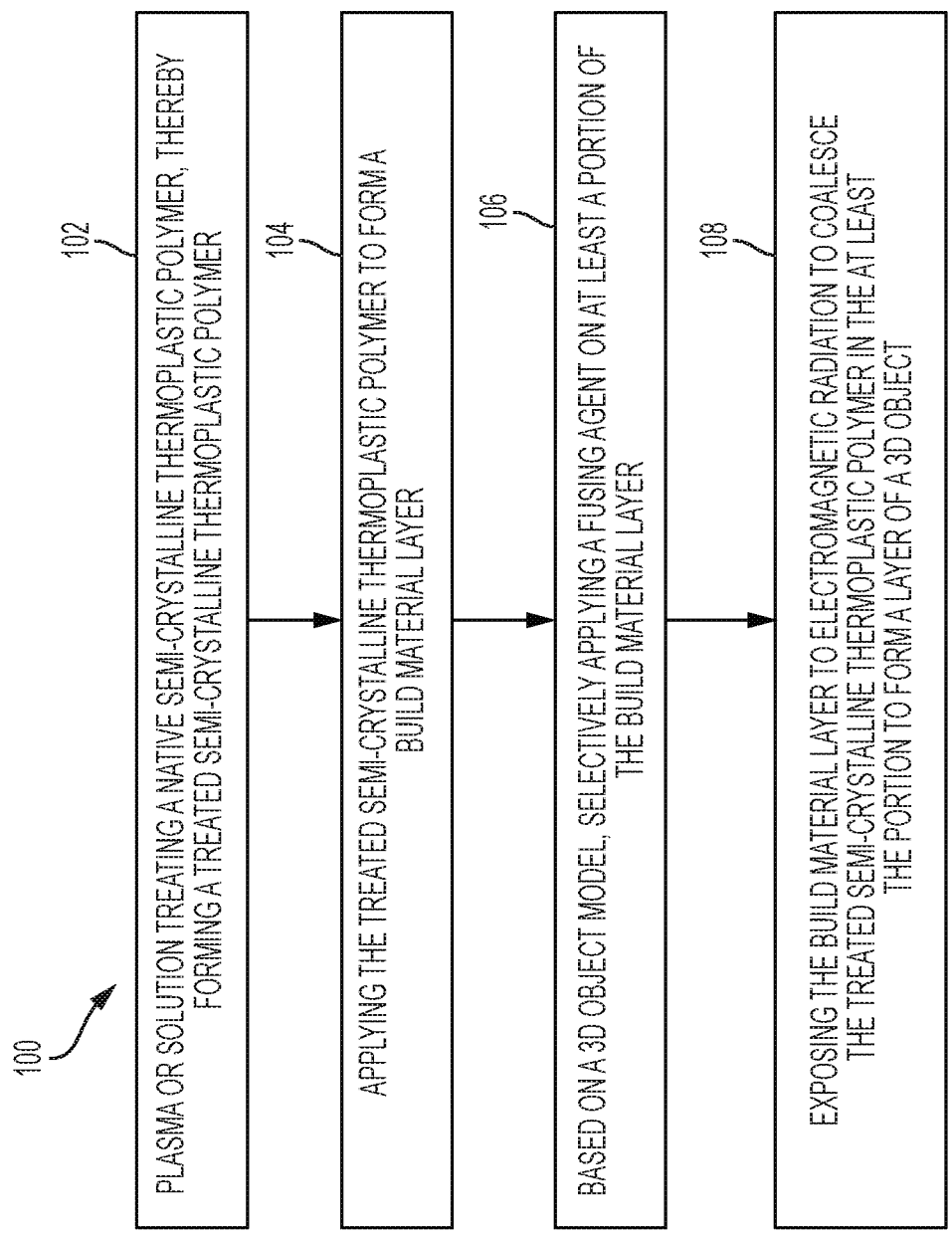
FIG. 1 is a flow diagram illustrating an example of a method for 3D printing.

Some examples of three-dimensional (3D) printing may utilize a fusing agent (including an energy absorber) to pattern polymeric build material. In these examples, an entire layer of the polymeric build material is exposed to radiation, but the patterned region (which, in some instances, is less than the entire layer) of the polymeric build material is coalesced/fused and hardened to become a layer of a 3D object. In the patterned region, the fusing agent is capable of at least partially penetrating into voids between the polymeric build material particles, and is also capable of spreading onto the exterior surface of the polymeric build material particles. This fusing agent is capable of absorbing radiation and converting the absorbed radiation to thermal energy, which in turn coalesces/fuses the polymeric build material that is in contact with the fusing agent. Coalescing/fusing causes the polymeric build material to join or blend to form a single entity (i.e., the layer of the 3D object). Coalescing/fusing may involve at least partial thermal merging, melting, binding, and/or some other mechanism that coalesces the polymeric build material to form the layer of the 3D object.

In these examples of 3D printing, the polymeric build material, the fusing agent, the radiation exposure process, etc., may be selected so that the patterned build material is able to coalesce/fuse to form a mechanically strong 3D object, while the non-patterned build material remains non-coalesced/non-fused when exposed to the radiation. Some polymeric build materials, which may be used in other fabrication methods (e.g., injection molding, selective laser sintering (SLS), selective laser melting (SLM), etc.), may be incompatible with the fusing agent and/or the radiation exposure process. For example, some polymeric build materials may be unable to sufficiently coalesce/fuse to form a mechanically strong and/or aesthetically pleasing 3D object when patterned with the fusing agent and exposed to the radiation. It has been found that melted particles of some polymeric build materials do not sufficiently wet each other and/or are as or more wettable to adjacent non-melted (e.g., powder) particles than to adjacent melted particles. Insufficient wetting among melted particles can lead to non-uniform coalescence. A higher affinity of the melted particle to non-melted particles can cause the melted material to absorb adjacent powder particles. Both of these phenomena can lead to shape defects, such as part edge buckling and/or a wrinkled surface appearance (e.g., mechanical distortion).

Build Material Compositions

Disclosed herein is a build material composition that includes a semi-crystalline thermoplastic polymer having a surface energy density greater than 41 mN/m (millinewton per meter). In some examples, this surface energy density may be achieved by plasma treating or solution treating native semi-crystalline thermoplastic polymer. It is contemplated that other surface treatment techniques may be used to alter the surface energy density of the native semi-crystalline thermoplastic polymer and form the example semi-crystalline thermoplastic polymer disclosed herein.

As used herein, the phrase "native semi-crystalline thermoplastic polymer" means a semi-crystalline thermoplastic polymer that has not been exposed to a plasma treatment, solution treatment, or to some other surface treatment that increases its surface energy density. As an example, the surface energy density of a native semi-crystalline thermoplastic polymer may be lower than 41 nM/m. Examples of native semi-crystalline thermoplastic polymers include a polyamide, a polyolefin, a polyurethane, and a combination thereof.

Also as used herein, the phrase "semi-crystalline thermoplastic polymer having a surface energy density greater than 41 mN/m" refers to a native semi-crystalline thermoplastic polymer that has been exposed to a plasma treatment, solution treatment, or to some other surface treatment that increases its surface energy density. As such, this semi-crystalline thermoplastic polymer has a surface energy density that is increased relative to its native semi-crystalline thermoplastic polymer. As examples, the plasma, solution, or other surface treatment may increase the surface energy density of the native semi-crystalline thermoplastic polymer by about 3 mN/m, by about 3.5 mN/m, by about 3.85 mN/m, or by about 5 mN/m. The semi-crystalline thermoplastic polymer having the surface energy density greater than 41 mN/m polymer may be referred to herein as the "high surface energy density polymer," the "surface treated polymer," or the "treated polymer."

Examples of the high surface energy density polymer selected from the group consisting of a surface treated polyamide, a surface treated polyolefin, a surface treated polyurethane, and a combination thereof. In other examples, the high surface energy density polymer is a surface treated polyamide (PA), such as surface treated polyamide 11 (PA 11/nylon 11), surface treated polyamide 12 (PA 12/nylon 12), surface treated polyamide 12-GB (PA 12-GB/nylon 12-GB), surface treated polyamide 12-$TiO_2$ (PA 12-$TiO_2$/nylon 12-$TiO_2$), surface treated polyamide 6 (PA 6/nylon 6), surface treated polyamide 13 (PA 13/nylon 13), surface treated polyamide 6,13 (PA 6,13/nylon 6,13), surface treated polyamide 8 (PA 8/nylon 8), surface treated polyamide 9 (PA 9/nylon 9), surface treated polyamide 66 (PA 66/nylon 66), surface treated polyamide 612 (PA 612/nylon 612), surface treated polyamide 812 (PA 812/nylon 812), surface treated polyamide 912 (PA 912/nylon 912), etc. In still other examples, the semi-crystalline thermoplastic polymer is surface treated polyamide 12 or surface treated polyamide 12-$TiO_2$. It is to be understood that surface treated polyamide 12-GB refers to a surface treated polyamide 12 including glass beads or another form of glass disclosed herein (mixed therewith or encapsulated therein, e.g., at a weight ratio of the glass to the surface treated polyamide 12 within the ranges set forth herein). It is also to be understood that surface treated polyamide 12-$TiO_2$ refers to a surface treated polyamides 12 including titanium dioxide as a whitener and/or filler (mixed therewith at a wt % within the ranges set forth herein).

In the examples disclosed herein, the plasma, solution, or other surface treatment renders the surface of the treated polymer more hydrophilic than its native semi-crystalline thermoplastic polymer. The increased hydrophilicity may be due to the incorporation of oxygen at the surface of the polymer. In some examples, the treated polymer has a surface oxygen content that is increased relative its native semi-crystalline thermoplastic polymer. The introduction of oxygen at the surface of the polymer results in the formation of carbon-oxygen bonds, which have a greater polarity than the initial carbon-hydrogen bonds of the native semi-crystalline thermoplastic polymer. As such, the treated polymer also has more polar elements than its native semi-crystalline thermoplastic polymer.

It has been found that these polar elements contribute to the increased surface energy density of the treated polymer. As such, the treated semi-crystalline thermoplastic polymer may have a percentage of its surface energy density contributed by polar elements that is greater than the percentage of surface energy density contributed by polar elements of its native semi-crystalline thermoplastic polymer. In some examples, the polar elements of the treated polymer contribute at least 5% of the surface energy density. In one of these examples, the polar elements of the high surface energy semi-crystalline thermoplastic polymer contribute at least 10% of the surface energy density. In another of these examples, the polar elements of the high surface energy semi-crystalline thermoplastic polymer contribute at least 25% of the surface energy density. In still another of these examples, the polar elements of the high surface energy semi-crystalline thermoplastic polymer contribute at least 40% of the surface energy density. In still another of these examples, the polar elements of the high surface energy semi-crystalline thermoplastic polymer contribute a percentage of the surface energy density ranging from 5% to about 40%.

The amount of oxygen (and thus the amount of polar elements at the surface and the increase in hydrophilicity) that is introduced to the native semi-crystalline thermoplastic polymer, and the surface energy density increase of the native semi-crystalline thermoplastic polymer may depend upon the gas or liquid used in the surface treatment and the length of time that the native semi-crystalline thermoplastic polymer is exposed to the surface treatment. Examples of oxygen-introducing gases suitable for the plasma treatment include oxygen, carbon dioxide, ammonia, and combinations thereof. Plasma exposure time may range from about 3 minutes to about 80 minutes. Examples of oxygen-introducing liquids suitable for the solution treatment include an oxidizer, such as sodium hypochlorite (10 wt %) or hydrogen peroxide (10 wt %-35 wt %), etc. Solution exposure time may range from about 1 minute to about 10 minutes.

As an example, when native polyamide 12 is plasma treated in oxygen gas for different time periods, the semi-crystalline thermoplastic polymer is a surface treated polyamide 12 and the surface energy density ranges from about 43 mN/m to about 46 mN/m. In one example, when the semi-crystalline thermoplastic polymer is polyamide 12 treated with oxygen gas for about 60 minutes, the surface energy density is about 43.5 mN/m. In another example, when the semi-crystalline thermoplastic polymer is polyamide 12 treated with oxygen gas for about 40 minutes, the surface energy density is about 44 mN/m. In yet another example, when the semi-crystalline thermoplastic polymer is a polyamide 12 treated with oxygen gas for about 80 minutes, the surface energy density is about 44.35 mN/m. In still another example, when the semi-crystalline thermoplastic polymer is a polyamide 12 treated with oxygen gas for about 3 minutes, the surface energy density is about 45.5 mN/m. Similar changes to the surface energy density may be obtained when performing solution treatment for different time periods.

It has been found that that the semi-crystalline thermoplastic polymers having the surface energy density disclosed herein are compatible with the 3D printing methods disclosed herein, which utilize agent(s) and energy exposure. In one aspect, it has been found that the high surface energy density polymers are compatible with mechanical parts of commercially available 3D printers (e.g., in terms of spreadability). In another aspect, it has been found that the high surface energy density polymers are compatible with at least some of the agents used in the 3D printing methods disclosed herein (e.g., in terms of agent wettability). In still another aspect, it has been found that the high surface energy density polymers are compatible with the energy exposure process (e.g., in terms of improved melted polymer wettability, faster crystallization rates, and smaller spherulites compared to the native polymer). The compatibility of the high surface energy density polymers with the different aspects of the 3D printing process disclosed herein leads to the formation of mechanically strong 3D objects that are also aesthetically pleasing. The parts formed with the high surface energy density polymers are believed to be more uniformly coalesced than similar parts formed with the native semi-crystalline thermoplastic polymer, which leads to shape retention and smoother surfaces.

It has been found that the high surface energy density polymers disclosed herein may be consolidated about 4.5 times faster than the native semi-crystalline thermoplastic polymers. Consolidation may be defined in terms of "tap density" (also known as "tapped density"), which refers to an increased bulk density of a powder sample that is attained after mechanically tapping a container containing the powder sample. The tap density may be characterized in terms a compaction characteristic, i.e., the number taps to yield consolidation of the powder. In the examples disclosed herein, the bulk density of the high surface energy semi-crystalline thermoplastic polymers is lower than the bulk density of the native semi-crystalline thermoplastic polymer, even at full tapped consolidation. It is believed that the surface treatment contributes to the decrease in the bulk density after full tapped consolidation of the semi-crystalline thermoplastic polymer. As an example, plasma treatment may decrease the bulk density after full tapped consolidation of the native powder by about 0.045 g/m L.

Full tapped consolidation may be achieved by mechanically tapping a container containing a polymer sample until there is substantially no change in the bulk density (e.g., after an inflection point, the change in the slope of the curve ranges from 7E-6 to 1E-5). In an example, the bulk density after full tapped consolidation may be measured or determined using a high-quality tap density instrument that utilizes Hall Sensor detection. It is to be understood, however, that any other tap density instrument may be used. In one example of this type of instrument, the measurement is done in a metallic tube to avoid the accumulation of electric charges during the measurement, and all parts of the instrument are connected to the earth. The diameter and the length of the tube may vary depending upon the powder being tested. To obtain a reproducible and spatially homogeneous initial packing, a narrower and bottomless tube can be inserted into the measurement tube. Afterward, the initialization tube is filled with the granular material and is removed upward at a low and constant velocity (e.g., v=1 mm/s), leaving the grains to rearrange themselves in the measurement tube. Then, a light (e.g., 11.5 g aluminum) hollow cylinder is gently placed on the top of the pile to keep it flat during the compaction process. To apply a tap on the packing, the tube goes up to a predetermined height (e.g., Z=3 mm) and experiences a free fall over the same height. After each tap, a distance sensor measures the position of the hollow cylinder. From this distance, the height h and the volume V of the pile are computed. As the introduced mass of powder is known, the bulk density evolution as a function of the tap number n is calculated. The bulk density is the ratio between the mass and the volume of the powder. A compaction curve presents the evolution of the bulk density as a function of the number of taps. From this curve, the bulk density after full tapped consolidation can be determined.

In some examples, the surface treated polymer has a bulk density after full tapped consolidation of 0.48 g/mL or less. In an example, the surface treated polymer has a bulk density after full tapped consolidation ranging from about 0.44 g/mL to 0.48 g/mL. In another example, the surface treated polymer has a bulk density after full tapped consolidation ranging from about 0.44 g/mL to about 0.46 g/mL.

Due, at least in part, to the consolidation characteristics of the surface treated semi-crystalline thermoplastic polymers disclosed herein, these polymers exhibit suitable flow and can be transported in existing 3D printers that use hoppers, vane paddles, spreading, and pneumatic transport.

The lower bulk density may also indicate a larger average void volume. It has been found that the average void volume of the surface treated polymers may be larger than the average void volume of the native semi-crystalline thermoplastic polymers. When the average void volume is larger, the flow and/or penetration of liquids applied on the semi-crystalline thermoplastic polymers may be improved. For example, the flow of the fusing agent through the larger voids may be faster. For another example, the penetration of the fusing agent into a layer of the semi-crystalline thermoplastic polymer may be more uniform throughout the layer. When the average void volume is larger, the degassing of vapor and/or gases from the surface treated polymers may also be improved. For example, when the surface treated polymer reaches its melting temperature, any water vapor evaporated from the vehicle of the fusing agent applied thereon may be able to degas more efficiently from the coalescing/fusing surface treated polymer.

Moreover, the incorporation of polar elements at the surface of the treated semi-crystalline thermoplastic polymer contributes to the increased surface energy density and hydrophilicity, and thus improves the wettability of the surface treated polymer to at least some agents (e.g., fusing agent, anti-coalescing agent, detailing agent, coloring agent, etc.). For example, the fusing agent, detailing agent, and coloring agent may penetrate farther and/or faster into a layer of the high surface energy semi-crystalline thermoplastic polymer. For another example, the ability of the anti-coalescing agent to discretely coat the individual high surface energy semi-crystalline thermoplastic polymer particles may be enhanced.

In addition to improved wetting at the surface by externally applied agents, it has unexpectedly been found that these surface treated semi-crystalline thermoplastic polymers may have improved coalescence when compared to their native polymers. While not being bound to any theory, it is believed that the melted form of the surface treated polymer has greater wettability to itself (i.e., to other melted surface treated polymer) than the melted form of the native polymer has to itself. Also not being bound to any theory, it is further believed that the melted form of the surface treated polymer has greater wettability to itself than to the non-melted polymer (i.e., the non-patterned build material particles that do not undergo melting). As such, the melted surface treated polymer disclosed herein preferentially merges with other melted surface treated polymer, and thus the coalescence is improved and the embedding of non-melted polymer particles is reduced or eliminated. In turn, the object is more likely to maintain its formed boundary and thus its intended shape. As a result, the surface finish quality of the 3D object may also be improved. For example, the formation of wrinkles on the surface of the 3D object may be reduced or eliminated.

The surface treated semi-crystalline thermoplastic polymers may have faster crystallization rates compared to the native polymer. The crystallization rate refers to the time it takes from full melt to full crystallization. In an example, the crystallization rate is within 380 seconds. In another example, the crystallization rate of a plasma treated polyamide 12 is about 360 seconds. Moreover, the melted and crystallized surface treated semi-crystalline thermoplastic polymers may have smaller spherulites compared to the melted and crystallized native polymer. In an example, the spherulites of the melted and crystallized surface treated semi-crystalline thermoplastic polymers have a size ranging from about 2 µm to about 10 µm. Both of these quantitative characteristics are illustrative of the improved wettability of the melted form of the surface treat polymer with itself and of the improved coalescence.

In some examples, the surface treated semi-crystalline thermoplastic polymer is further modified with a functional group selected from the group consisting of an amine, a urethane, an epoxy, a carboxyl, a silane, and a combination thereof. The surface treated polymer may be modified with a functional group, for example, to improve the color of the semi-crystalline thermoplastic polymer (and thus, the 3D objects to be printed) and/or to modify the mechanical properties of the 3D objects to be printed.

Modification with additional functional group(s) may take place during the plasma treatment process, or during the solution treatment process. A compound (in the gas phase) with the desired functional group is introduced in place of oxygen during the plasma treatment process. As examples, $NH_3$ may be used to produce amines; urea, ethyl carbamate, or some other carbamic acid derivative may be used to produce urethane groups; epoxide-containing monomers, such as glycidyl methacrylate, may be used for epoxy functionalization; $CO_2$ may be used to produce carboxyl groups; and a silane coupling agent, such as APTES, may be used to introduce silane groups. In any example, it will depend on what type of functional group is desired (e.g., the type of silane, epoxy, etc.). The selection of the compound may also depend on vapor pressures, reactivity, sterics, etc. that may be involved in the plasma process.

It is to be understood that the surface energy density of the surface treated polymer may be altered with the additional functionalization. However, the functional group(s) may be selected so that the surface energy density remains within the ranges set forth herein.

In some examples, the surface treated polymer may be in the form of a powder. In other examples, the surface treated polymer may be in the form of a powder-like material, which includes, for example, short fibers having a length that is greater than its width. In some examples, the powder or powder-like material may be formed from, or may include, short fibers that may, for example, have been cut into short lengths from long strands or threads of material.

The surface treated polymer may be made up of similarly sized particles and/or differently sized particles. In an example, the average particle size of the surface treated polymer ranges from about 2 µm to about 200 µm. In another example, the average particle size of the surface treated polymer ranges from about 10 µm to about 110 µm. In still another example, the average particle size of the surface treated polymer ranges from about 20 µm to about 100 µm. The term "average particle size", as used herein, may refer to a number-weighted mean diameter or a volume-weighted mean diameter of a particle distribution.

The surface treated semi-crystalline thermoplastic polymer may have a wide processing window of greater than 5° C., which can be defined by the temperature range between the melting point and the re-crystallization temperature. In some examples, the surface treated polymer may have a melting point ranging from about 225° C. to about 250° C., from about 155° C. to about 215° C., about 160° C. to about 200° C., from about 170° C. to about 190° C., or from about 182° C. to about 189° C. In some other examples, the surface treated polymer may have a melting range within the range of from about 130° C. to about 250° C. In an example (e.g., when the surface treated polymer is a polyamide), the surface treated polymer may have a melting point ranging from about 180° C. to about 190° C. In another example (e.g., when the surface treated polymer is a polypropylene), the surface treated polymer may have a melting point of about 160° C. In still another example (e.g., when the surface treated polymer is a polyurethane), the surface treated polymer may have a melting range of from about 130° C. to about 180° C. or a melting range of from about 175° C. to about 210° C.

In some examples, the surface treated polymer does not substantially absorb radiation having a wavelength within the range of 400 nm to 1400 nm. In other examples, the surface treated polymer does not substantially absorb radiation having a wavelength within the range of 800 nm to 1400 nm. In still other examples, the surface treated polymer does not substantially absorb radiation having a wavelength within the range of 400 nm to 1200 nm. In these examples, the surface treated polymer may be considered to reflect the wavelengths at which the surface treated polymer does not substantially absorb radiation. The phrase "does not substantially absorb" means that the absorptivity of the surface treated semi-crystalline thermoplastic polymer at a particular wavelength is 25% or less (e.g., 20%, 10%, 5%, etc.).

As mentioned above, the build material composition disclosed herein includes the semi-crystalline thermoplastic polymer having surface energy density greater than 41 mN/m. In some examples, the build material composition consists of this high surface energy density (or surface treated) polymer with no other components. In other examples, the build material composition may include additional components, such as glass, a filler, an antioxidant, a whitener, an antistatic agent, a flow aid, or a combination thereof. While several examples of these additives are provided, it is to be understood that these additives are selected to be thermally stable (i.e., will not decompose) at the 3D printing temperatures.

In some examples, the surface treated polymer may also include glass therein (e.g., surface treated polyamide 12-GB). In some of these examples, the glass may be dry blended with the surface treated polymer. In others of these examples, the glass may be encapsulated by the surface treated polymer. When the glass is encapsulated by the surface treated polymer, the surface treated polymer may form a continuous coating (i.e., none of the glass is exposed) or a substantially continuous coating (i.e., 5% or less of the glass is exposed) on the glass.

Whether the glass is dry blended with the surface treated polymer or is encapsulated by the surface treated polymer may depend, in part, on (i) the characteristics of the glass, and (ii) the 3D printer with which the build material composition is to be used. As an example, when the glass includes glass fibers and/or crushed glass, the glass may be encapsulated by the surface treated polymer. As another example, when segregation of dry blended surface treated polymer and glass may occur and cause damage to the 3D printer in which the build material composition is to be used, the glass may be encapsulated by the surface treated polymer.

When the glass is dry blended with the surface treated polymer, the average particle size of the glass may range from about 5 µm to about 100 µm.

When the glass is encapsulated by the surface treated polymer, the average particle size of the glass (prior to being coated) may range from about 5 µm to about 100 µm or from about 30 µm to about 50 µm. The average particle size of the encapsulated material (i.e., the glass coated with the surface treated polymer) may depend upon the size of the glass prior to coating and the thickness of the surface treated polymer that is applied to the glass. In an example, the average particle size of the encapsulated build material may range from about 10 µm to about 200 µm. In another example, the average particle size of the encapsulated build material may range from about 20 µm to about 120 µm.

The weight ratio of the glass to the surface treated polymer (e.g., surface treated polyamide 12) may range from about 5:95 to about 60:40. In some examples, the weight ratio of the glass to the surface treated polymer may range from about 10:90 to about 60:40; or from about 20:80 to about 60:40; or from about 40:60 to about 60:40; or from about 5:95 to about 40:60; or from about 5:95 to about 50:50. In some instances, additives (e.g., antioxidant(s), whitener(s), charging agent(s), flow aid(s), etc.) may be included with the surface treated polymer and glass. In these instances, the weight of the surface treated polymer, for the purpose of determining the weight ratio of the glass to the surface treated polymer, may include the weight of the additives in addition to the weight of the polymer. In other instances, the weight of the surface treated polymer, for the purpose of determining the weight ratio of the glass to the surface treated polymer, includes the weight of the polymer alone (whether or not additives are included in the build material composition). The weight ratio of the glass to the surface treated polymer may depend, in part, on the desired properties of the 3D object to be formed, the glass used, the surface treated polymer used, and/or the additives included in the surface treated polymer.

In one example, the glass may be selected from the group consisting of solid glass beads, hollow glass beads, porous glass beads, glass fibers, crushed glass, and a combination thereof. In another example, the glass may be selected from the group consisting of soda lime glass ($Na_2O/CaO/SiO_2$), borosilicate glass, phosphate glass, fused quartz, and a combination thereof. In still another example, the glass may be selected from the group consisting of soda lime glass, borosilicate glass, and a combination thereof. In yet other examples, the glass may be any type of non-crystalline silicate glass.

In some examples, a surface of the glass may be modified with a functional group selected from the group consisting of an acrylate functional silane, a methacrylate functional silane, an epoxy functional silane, an ester functional silane, an amino functional silane, and a combination thereof. Examples of the glass modified with such functional groups and/or such functional groups that may be used to modify the glass are available from Potters Industries, LLC (e.g., an epoxy functional silane or an amino functional silane), Gelest, Inc. (e.g., an acrylate functional silane or a methacrylate functional silane), Sigma-Aldrich (e.g., an ester functional silane), etc. In an example, the surface of the glass is modified with an amino functional silane. In another example, the surface of the glass may be modified with an epoxy functional silane. In other examples, a surface of the glass is not modified with any functional group.

In some examples, the surface treated polymer may include titanium dioxide therein (e.g., surface treated polyamide 12-$TiO_2$). In these examples, the titanium dioxide may be used as a whitener and/or filler. In an example, the titanium dioxide may be included in the build material composition in an amount ranging from greater than 0 wt % to about 10 wt %, based on the total weight of the build material composition.

Filler(s) may be added to the build material composition to modify the properties of the 3D parts to be printed. Examples of suitable fillers include alumina, silica, talc, and a combination thereof. In an example, the filler may be included in the build material composition in an amount ranging from about 1 wt % to about 60 wt %, based on the total weight of the build material composition.

Antioxidant(s) may be added to the build material composition to prevent or slow molecular weight decreases of the surface treated polymer and/or may prevent or slow discoloration (e.g., yellowing) of the surface treated polymer by preventing or slowing oxidation of the surface treated polymer. In some examples, the antioxidant may discolor upon reacting with oxygen, and this discoloration may contribute to the discoloration of the build material composition. The antioxidant may be selected to minimize this discoloration. In some examples, the antioxidant may be a radical scavenger. In these examples, the antioxidant may include IRGANOX® 1098 (benzenepropanamide, N,N'-1, 6-hexanediylbis(3,5-bis(1,1-dimethylethyl)-4-hydroxy)), IRGANOX® 254 (a mixture of 40% triethylene glycol bis(3-tert-butyl-4-hydroxy-5-methylphenyl), polyvinyl alcohol and deionized water), and/or other sterically hindered phenols. In other examples, the antioxidant may include a phosphite and/or an organic sulfide (e.g., a thioester). The antioxidant may be in the form of fine particles (e.g., having an average particle size of 5 µm or less) that are dry blended with the surface treated polymer. In an example, the antioxidant may be included in the build material composition in an amount ranging from about 0.01 wt % to about 5 wt %, based on the total weight of the build material composition. In other examples, the antioxidant may be included in the build material composition in an amount ranging from about 0.01 wt % to about 2 wt % or from about 0.2 wt % to about 1 wt %, based on the total weight of the build material composition.

Whitener(s) may be added to the build material composition to improve visibility. Examples of suitable whiteners include titanium dioxide ($TiO_2$), zinc oxide (ZnO), calcium carbonate ($CaCO_3$), zirconium dioxide ($ZrO_2$), aluminum oxide ($Al_2O_3$), silicon dioxide ($SiO_2$), boron nitride (BN), and combinations thereof. In some examples, a stilbene derivative may be used as the whitener and a brightener. In these examples, the temperature(s) of the 3D printing process may be selected so that the stilbene derivative remains stable (i.e., the 3D printing temperature does not thermally decompose the stilbene derivative). In an example, any example of the whitener may be included in the build material composition in an amount ranging from greater than 0 wt % to about 10 wt %, based on the total weight of the build material composition.

Antistatic agent(s) may be added to the build material composition to suppress tribo-charging. Examples of suitable antistatic agents include aliphatic amines (which may be ethoxylated), aliphatic amides, quaternary ammonium salts (e.g., behentrimonium chloride or cocamidopropyl betaine), esters of phosphoric acid, polyethylene glycolesters, or polyols. Some suitable commercially available antistatic agents include HOSTASTAT® FA 38 (natural based ethoxylated alkylamine), HOSTASTAT® FE2 (fatty acid ester), and HOSTASTAT® HS 1 (alkane sulfonate), each of which is available from Clariant Int. Ltd.). In an example, the antistatic agent is added in an amount ranging from greater than 0 wt % to less than 5 wt %, based upon the total weight of the build material composition.

Flow aid(s) may be added to improve the coating flowability of the build material composition. Flow aids may be particularly beneficial when the build material composition has an average particle size less than 25 μm. The flow aid improves the flowability of the build material composition by reducing the friction, the lateral drag, and the tribocharge buildup (by increasing the particle conductivity). Examples of suitable flow aids include aluminum oxide ($Al_2O_3$), tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminum silicate (E555), calcium aluminosilicate (E556), bentonite (E558), aluminum silicate (E559), stearic acid (E570), and polydimethylsiloxane (E900). In an example, the flow aid is added in an amount ranging from greater than 0 wt % to less than 5 wt %, based upon the total weight of the build material composition.

In some examples, the build material composition disclosed herein may be reused/recycled. After a print cycle, some of the build material composition disclosed herein remains non-coalesced/non-fused, and can be reclaimed and used again. This reclaimed build material is referred to as the recycled build material composition. The recycled build material composition may be exposed to 2, 4, 6, 8, 10, or more build cycles (i.e., heating to a temperature ranging from about 50° C. to about 205° C. and then cooling), and reclaimed after each cycle. Between cycles, the recycled build material composition may be mixed with at least some fresh (i.e., not previously used in a 3D printing process) build material composition. In some examples, the weight ratio of the recycled build material composition to the fresh build material composition may be 90:10, 80:20, 70:30, 60:40, 50:50, or 40:60. The weight ratio of the recycled build material composition to the fresh build material composition may depend, in part, on the stability of the build material composition, the discoloration of the recycled build material composition (as compared to the build material composition), the desired aesthetics for the 3D object being formed, the thermal decomposition of the recycled build material composition (as compared to the build material composition), and/or the desired mechanical properties of the 3D object being formed.

3D Printing Kits and Compositions

The build material composition described herein may be part of a 3D printing kit and/or a 3D printing composition.

In an example, the three-dimensional (3D) printing kit or composition, comprises: a build material composition including a semi-crystalline thermoplastic polymer having a surface energy density greater than 41 mN/m; and a fusing agent to be applied to at least a portion of the build material composition during 3D printing, the fusing agent including an energy absorber to absorb electromagnetic radiation to coalesce the semi-crystalline thermoplastic polymer in the at least the portion.

In another example, the three-dimensional (3D) printing kit or composition, comprises: a build material composition including a semi-crystalline thermoplastic polymer, wherein a surface of the semi-crystalline thermoplastic polymer is modified with a functional group selected from the group consisting of an amine, a urethane, an epoxy, a carboxyl, a silane, and a combination thereof, and wherein a surface energy density of the semi-crystalline thermoplastic polymer is greater than 41 mN/m; and a fusing agent to be applied to at least a portion of the build material composition during 3D printing, the fusing agent including an energy absorber to absorb electromagnetic radiation to coalesce the semi-crystalline thermoplastic polymer in the at least the portion.

In some examples, the 3D printing kit or composition consists of the build material composition and the fusing agent with no other components. In other examples, the kit or composition includes additional components, such as another fusing agent, a coloring agent, an anti-coalescing, a detailing agent, or a combination thereof. The components of the kit may be maintained separately until used together in examples of the 3D printing method disclosed herein.

Any example of the build material composition may be used in the examples of the 3D printing kit or composition. As mentioned above, the build material composition includes at least the surface treated semi-crystalline thermoplastic polymer, and may additionally include the glass, the filler, the antioxidant, the whitener (e.g., titanium dioxide), the antistatic agent, the flow aid, or combinations thereof.

In an example of the 3D printing kit or composition, polar elements of the semi-crystalline thermoplastic polymer contribute at least 5% of the surface energy density. In another example of the 3D printing kit or composition, the semi-crystalline thermoplastic polymer has a surface oxygen content that is increased relative to its native semi-crystalline thermoplastic polymer. In still another example of the 3D printing kit or composition, the semi-crystalline thermoplastic polymer has a bulk density after full tapped consolidation of 0.48 g/mL or less. In yet another example of the 3D printing kit or composition, the semi-crystalline thermoplastic polymer is plasma-treated. In yet another example of the 3D printing kit or composition, the semi-crystalline thermoplastic polymer has an average particle size ranging from about 2 μm to about 200 μm.

The fusing agent includes at least the energy absorber. Example compositions of the fusing agent (e.g., example compositions of the core fusing and example compositions of the primer fusing agent) are described below. In some examples, the fusing agent is a core fusing agent and the energy absorber has absorption at least at wavelengths ranging from 400 nm to 780 nm; or the fusing agent is a primer fusing agent and the energy absorber has absorption at wavelengths ranging from 800 nm to 4000 nm and has transparency at wavelengths ranging from 400 nm to 780 nm. In some of these examples, the fusing agent is the core fusing agent and the energy absorber further has absorption at wavelengths ranging from 800 nm to 4000 nm. In some of these examples, the kit or composition includes both the core fusing agent and the primer fusing agent. In some of these examples, the fusing agent is the core fusing agent and the energy absorber is carbon black; and/or the fusing agent is the primer fusing agent and the energy absorber is an inorganic pigment selected from the group consisting of lanthanum hexaboride, tungsten bronzes, indium tin oxide, aluminum zinc oxide, ruthenium oxide, silver, gold, platinum, iron pyroxenes, modified iron phosphates ($A_xFe_yPO_4$), modified copper pyrophosphates ($A_xCu_yP_2O_7$), and combinations thereof.

In some examples, the 3D printing kit or composition further comprises a coloring agent selected from the group consisting of a black agent, a cyan agent, a magenta agent, and a yellow agent; a detailing agent including a surfactant, a co-solvent, and water; or an anti-coalescing agent; or any combination of the coloring agent, the detailing agent, and the anti-coalescing agent.

In some of these examples, the 3D printing kit or composition includes the coloring agent. In an example, the 3D printing kit may include multiple coloring agents. For example, the 3D printing kit may include a coloring agent for each desired color (e.g., black, cyan, magenta, yellow, etc.). Any of the example compositions of the coloring agent described below may be used in the examples of the 3D printing kit.

In some others of these examples, the 3D printing kit or composition includes the detailing agent. Any of the example compositions of the detailing agent described below may be used in the examples of the 3D printing kit.

In some others of these examples, the 3D printing kit or composition includes the anti-coalescing agent. Any of the example compositions of the anti-coalescing agent described below may be used in the examples of the 3D printing kit.

As used herein, "material set" or "kit" may, in some instances, be synonymous with "composition." Further, "material set" and "kit" are understood to be compositions comprising one or more components where the different components in the compositions are each contained in one or more containers, separately or in any combination, prior to and during printing but these components can be combined together during printing. The containers can be any type of a vessel, box, or receptacle made of any material.

Fusing Agents

In the examples of the 3D printing kit, the 3D printing composition, the 3D printing methods, and the 3D printing system disclosed herein, a fusing agent may be used.

Some examples of the fusing agent have substantial absorption (e.g., 80%) at least in the visible region (400 nm-780 nm). These examples of the fusing agent are referred to as the core fusing agent, or, in some instances, the black fusing agent. As described herein, the energy absorber in the core fusing agent may also absorb energy in the infrared region (e.g., 800 nm to 4000 nm). This absorption generates heat suitable for coalescing/fusing during 3D printing, which leads to 3D objects (or 3D objects regions) having mechanical integrity and relatively uniform mechanical properties (e.g., strength, elongation at break, etc.). This absorption, however, also results in strongly colored, e.g., black, 3D objects (or 3D objects regions). In these examples of the fusing agent, the energy absorber may be referred to as the active material.

Other examples of the fusing agent include an energy absorber having absorption at wavelengths ranging from 800 nm to 4000 nm and having transparency at wavelengths ranging from 400 nm to 780 nm. These examples of the fusing agent are referred to as the primer fusing agent, or, in some instances, the low tint fusing agent. This absorption and transparency allows the primer fusing agent to absorb enough radiation to coalesce/fuse the build material composition in contact therewith while causing the 3D objects (or 3D objects regions) to be white or slightly colored.

As used herein "absorption" means that at least 80% of radiation having wavelengths within the specified range is absorbed. Also used herein, "transparency" means that 25% or less of radiation having wavelengths within the specified range is absorbed.

Core Fusing Agents

Some examples of the core fusing agent are dispersions including an energy absorber (i.e., an active material). In some examples, the active material may be an infrared light absorbing colorant. In an example, the active material is a near-infrared light absorber. Any near-infrared colorants, e.g., those produced by Fabricolor, Eastman Kodak, or BASF, Yamamoto, may be used in the core fusing agent. As one example, the core fusing agent may be a printing liquid formulation including carbon black as the active material. Examples of this printing liquid formulation are commercially known as CM997A, 516458, C18928, C93848, C93808, or the like, all of which are available from HP Inc.

As another example, the core fusing agent may be a printing liquid formulation including near-infrared absorbing dyes as the active material. Examples of this printing liquid formulation are described in U.S. Pat. No. 9,133,344, incorporated herein by reference in its entirety. Some examples of the near-infrared absorbing dye are water-soluble near-infrared absorbing dyes selected from the group consisting of:

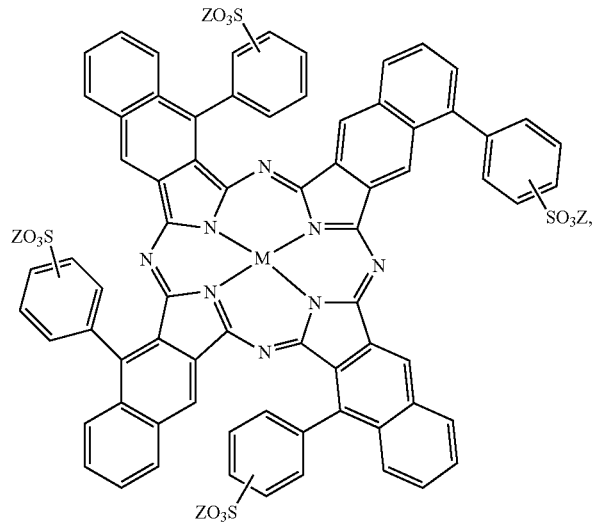

-continued
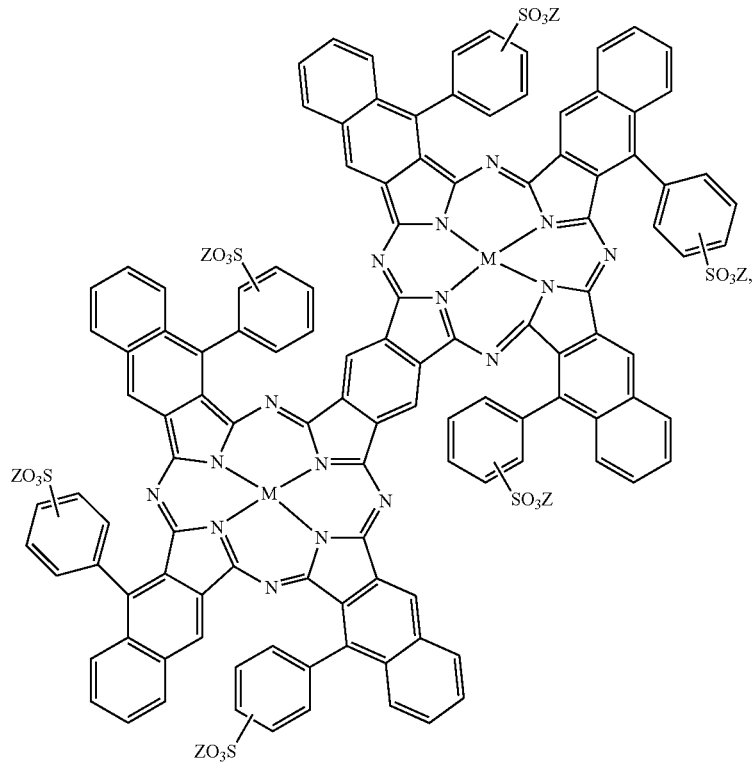
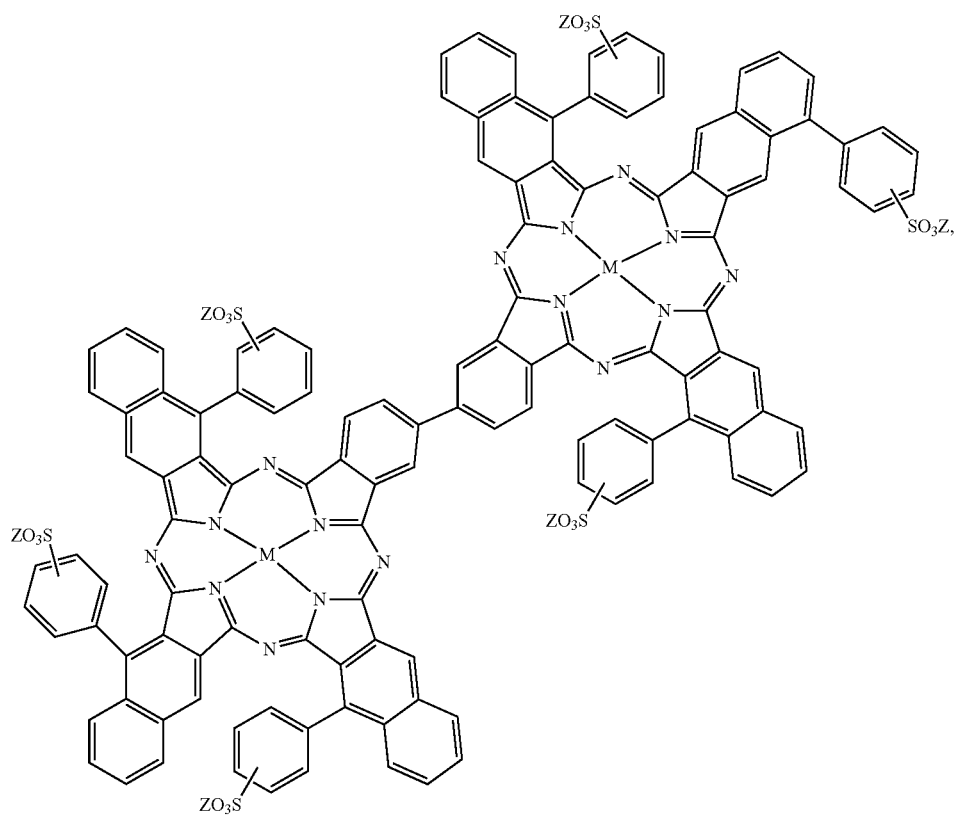

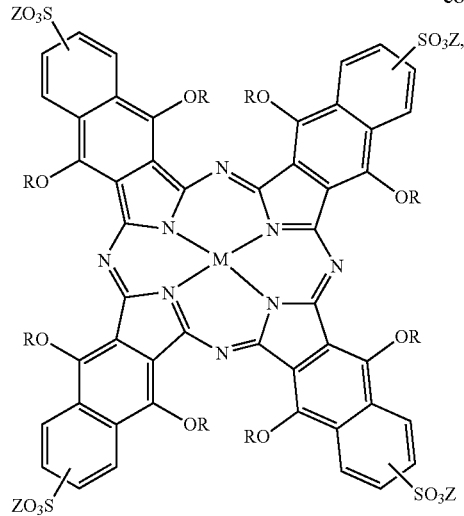

and mixtures thereof. In the above formulations, M can be a divalent metal atom (e.g., copper, etc.) or can have OSO$_3$Na axial groups filling any unfilled valencies if the metal is more than divalent (e.g., indium, etc.), R can be hydrogen or any C$_1$-C$_8$ alkyl group (including substituted alkyl and unsubstituted alkyl), and Z can be a counterion such that the overall charge of the near-infrared absorbing dye is neutral. For example, the counterion can be sodium, lithium, potassium, NH$_4^+$, etc.

Some other examples of the near-infrared absorbing dye are hydrophobic near-infrared absorbing dyes selected from the group consisting of:

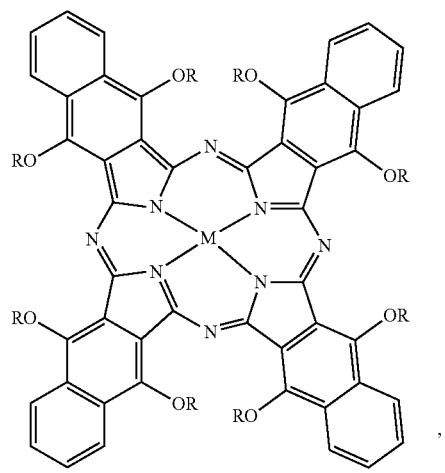

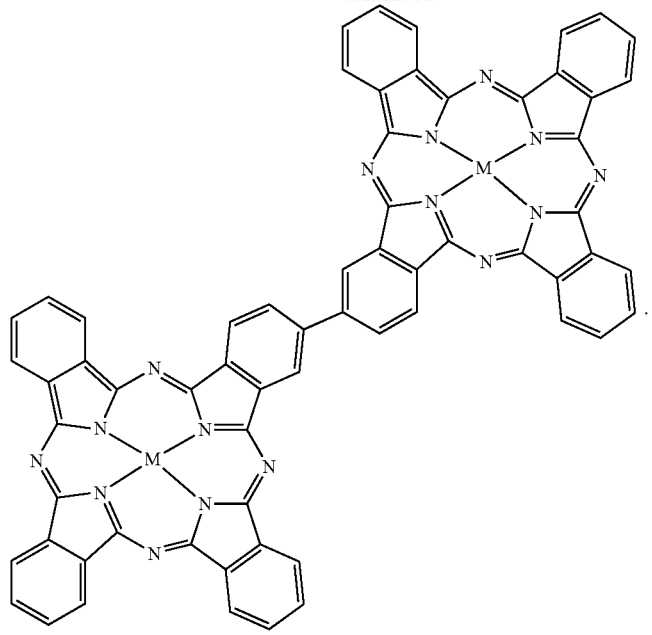

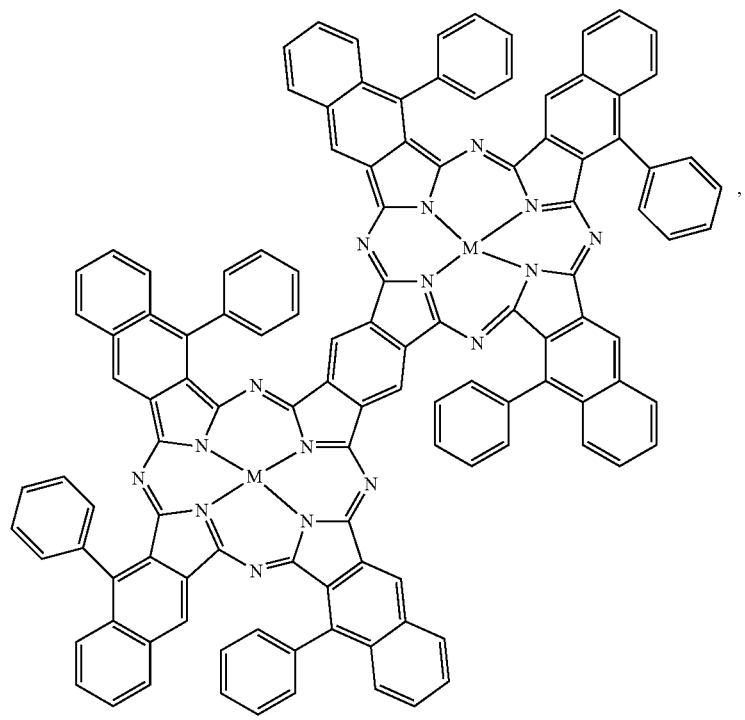

and mixtures thereof. For the hydrophobic near-infrared absorbing dyes, M can be a divalent metal atom (e.g., copper, etc.) or can include a metal that has Cl, Br, or OR' (R'=H, CH$_3$, COCH$_3$, COCH$_2$COOCH$_3$, COCH$_2$COCH$_3$) axial groups filling any unfilled valencies if the metal is more than divalent, and R can be hydrogen or any C$_1$-C$_8$ alkyl group (including substituted alkyl and unsubstituted alkyl).

Other near-infrared absorbing dyes or pigments may be used. Some examples include anthroquinone dyes or pigments, metal dithiolene dyes or pigments, cyanine dyes or pigments, perylenediimide dyes or pigments, croconium dyes or pigments, pyrilium or thiopyrilium dyes or pigments, boron-dipyrromethene dyes or pigments, or aza-boron-dipyrromethene dyes or pigments.

Anthroquinone dyes or pigments and metal (e.g., nickel) dithiolene dyes or pigments may have the following structures, respectively:

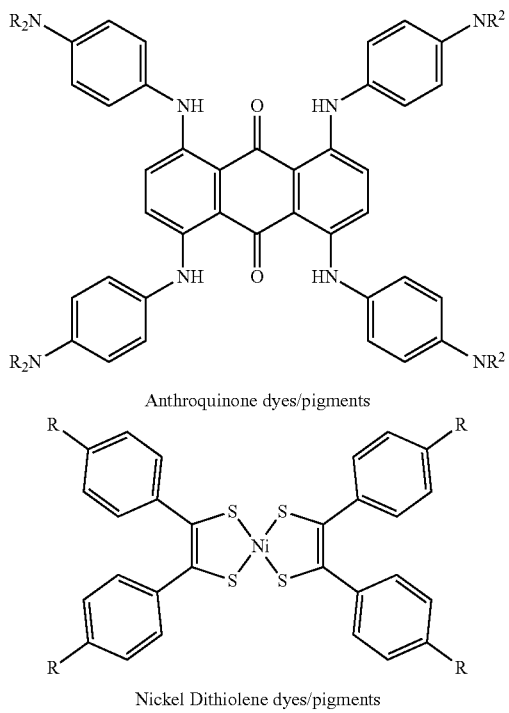

Anthroquinone dyes/pigments

Nickel Dithiolene dyes/pigments where R in the anthroquinone dyes or pigments may be hydrogen or any $C_1$-$C_8$ alkyl group (including substituted alkyl and unsubstituted alkyl), and R in the dithiolene may be hydrogen, COOH, $SO_3$, $NH_2$, any $C_1$-$C_8$ alkyl group (including substituted alkyl and unsubstituted alkyl), or the like.

Cyanine dyes or pigments and perylenediimide dyes or pigments may have the following structures, respectively:

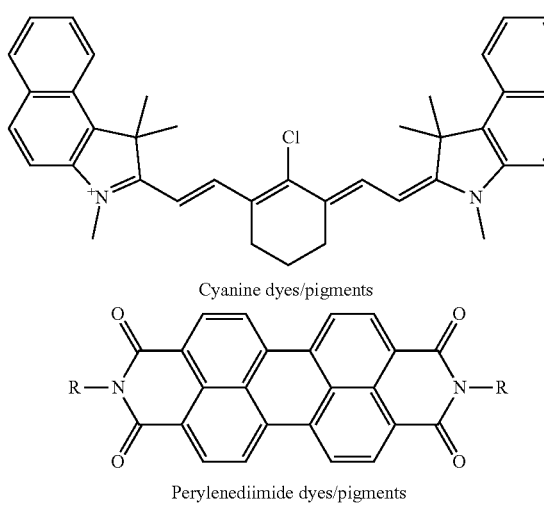

Cyanine dyes/pigments

Perylenediimide dyes/pigments where R in the perylenediimide dyes or pigments may be hydrogen or any $C_1$-$C_8$ alkyl group (including substituted alkyl and unsubstituted alkyl).

Croconium dyes or pigments and pyrilium or thiopyrilium dyes or pigments may have the following structures, respectively:

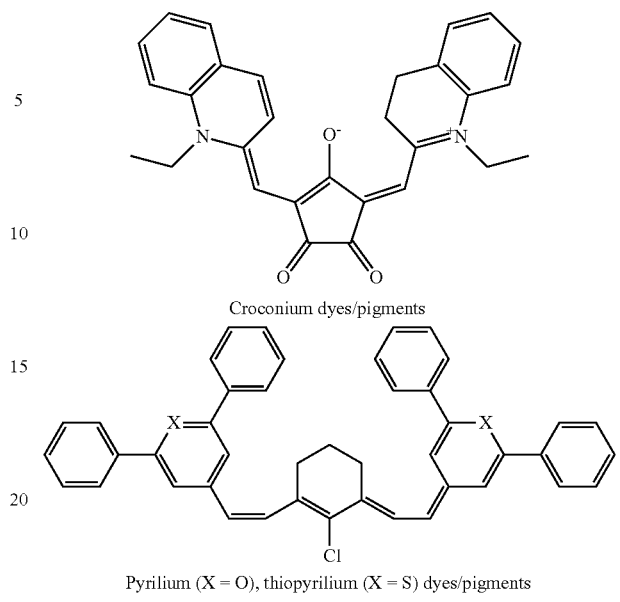

Croconium dyes/pigments

Pyrilium (X = O), thiopyrilium (X = S) dyes/pigments

Boron-dipyrromethene dyes or pigments and aza-boron-dipyrromethene dyes or pigments may have the following structures, respectively:

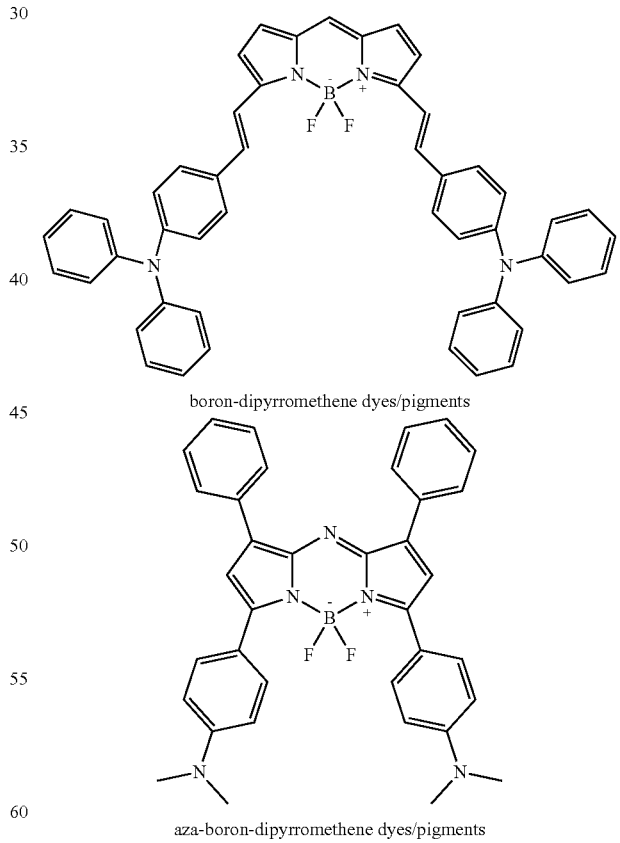

boron-dipyrromethene dyes/pigments aza-boron-dipyrromethene dyes/pigments

The amount of the active material that is present in the core fusing agent ranges from greater than 0 wt % to about 40 wt % based on the total weight of the core fusing agent. In other examples, the amount of the active material in the core fusing agent ranges from about 0.3 wt % to 30 wt %, from about 1 wt % to about 20 wt %, from about 1.0 wt % up to about 10.0 wt %, or from greater than 4.0 wt % up to about 15.0 wt %. It is believed that these active material loadings provide a balance between the core fusing agent having jetting reliability and heat and/or radiation absorbance efficiency.

Primer Fusing Agents

Some examples of the primer fusing agent are dispersions including the energy absorber that has absorption at wavelengths ranging from 800 nm to 4000 nm and transparency at wavelengths ranging from 400 nm to 780 nm. The absorption of this energy absorber is the result of plasmonic resonance effects. Electrons associated with the atoms of the energy absorber may be collectively excited by radiation, which results in collective oscillation of the electrons. The wavelengths that can excite and oscillate these electrons collectively are dependent on the number of electrons present in the energy absorber particles, which in turn is dependent on the size of the energy absorber particles. The amount of energy that can collectively oscillate the particle's electrons is low enough that very small particles (e.g., 1-100 nm) may absorb radiation with wavelengths several times (e.g., from 8 to 800 or more times) the size of the particles. The use of these particles allows the primer fusing agent to be inkjet jettable as well as electromagnetically selective (e.g., having absorption at wavelengths ranging from 800 nm to 4000 nm and transparency at wavelengths ranging from 400 nm to 780 nm).

In an example, the energy absorber of the primer fusing agent has an average particle diameter (e.g., volume-weighted mean diameter) ranging from greater than 0 nm to less than 220 nm. In another example, the energy absorber has an average particle diameter ranging from greater than 0 nm to 120 nm. In a still another example, the energy absorber has an average particle diameter ranging from about 10 nm to about 200 nm.

In an example, the energy absorber of the primer fusing agent is an inorganic pigment. Examples of suitable inorganic pigments include lanthanum hexaboride ($LaB_6$), tungsten bronzes ($A_xWO_3$), indium tin oxide ($In_2O_3:SnO_2$, ITO), antimony tin oxide ($Sb_2O_3:SnO_2$, ATO), titanium nitride (TiN), aluminum zinc oxide (AZO), ruthenium oxide ($RuO_2$), silver (Ag), gold (Au), platinum (Pt), iron pyroxenes ($A_xFe_ySi_2O_6$ wherein A is Ca or Mg, x=1.5-1.9, and y=0.1-0.5), modified iron phosphates ($A_xFe_yPO_4$), modified copper phosphates ($A_xCu_yPO_z$), and modified copper pyrophosphates ($A_xCu_yP_2O_7$). Tungsten bronzes may be alkali doped tungsten oxides. Examples of suitable alkali dopants (i.e., A in $A_xWO_3$) may be cesium, sodium, potassium, or rubidium. In an example, the alkali doped tungsten oxide may be doped in an amount ranging from greater than 0 mol % to about 0.33 mol % based on the total mol % of the alkali doped tungsten oxide. Suitable modified iron phosphates ($A_xFe_yPO$) may include copper iron phosphate (A=Cu, x=0.1-0.5, and y=0.5-0.9), magnesium iron phosphate (A=Mg, x=0.1-0.5, and y=0.5-0.9), and zinc iron phosphate (A=Zn, x=0.1-0.5, and y=0.5-0.9). For the modified iron phosphates, it is to be understood that the number of phosphates may change based on the charge balance with the cations. Suitable modified copper pyrophosphates ($A_xCu_yP_2O_7$) include iron copper pyrophosphate (A=Fe, x=0-2, and y=0-2), magnesium copper pyrophosphate (A=Mg, x=0-2, and y=0-2), and zinc copper pyrophosphate (A=Zn, x=0-2, and y=0-2). Combinations of the inorganic pigments may also be used.

The amount of the energy absorber that is present in the primer fusing agent ranges from greater than 0 wt % to about 40 wt % based on the total weight of the primer fusing agent. In other examples, the amount of the energy absorber in the primer fusing agent ranges from about 0.3 wt % to 30 wt %, from about 1 wt % to about 20 wt %, from about 1.0 wt % up to about 10.0 wt %, or from greater than 4.0 wt % up to about 15.0 wt %. It is believed that these energy absorber loadings provide a balance between the primer fusing agent having jetting reliability and heat and/or radiation absorbance efficiency.

The energy absorber of the primer fusing agent may, in some instances, be dispersed with a dispersant. As such, the dispersant helps to uniformly distribute the energy absorber throughout the primer fusing agent. Examples of suitable dispersants include polymer or small molecule dispersants, charged groups attached to the energy absorber surface, or other suitable dispersants. Some specific examples of suitable dispersants include a water-soluble acrylic acid polymer (e.g., CARBOSPERSE® K7028 available from Lubrizol), water-soluble styrene-acrylic acid copolymers/resins (e.g., JONCRYL® 296, JONCRYL® 671, JONCRYL® 678, JONCRYL® 680, JONCRYL® 683, JONCRYL® 690, etc. available from BASF Corp.), a high molecular weight block copolymer with pigment affinic groups (e.g., DISPERBYK®-190 available BYK Additives and Instruments), or water-soluble styrene-maleic anhydride copolymers/resins.

Whether a single dispersant is used or a combination of dispersants is used, the total amount of dispersant(s) in the primer fusing agent may range from about 10 wt % to about 200 wt % based on the weight of the energy absorber in the primer fusing agent.

A silane coupling agent may also be added to the primer fusing agent to help bond the organic and inorganic materials. Examples of suitable silane coupling agents include the SILQUEST® A series manufactured by Momentive.

Whether a single silane coupling agent is used or a combination of silane coupling agents is used, the total amount of silane coupling agent(s) in the primer fusing agent may range from about 0.1 wt % to about 50 wt % based on the weight of the energy absorber in the primer fusing agent. In an example, the total amount of silane coupling agent(s) in the primer fusing agent ranges from about 1 wt % to about 30 wt % based on the weight of the energy absorber. In another example, the total amount of silane coupling agent(s) in the primer fusing agent ranges from about 2.5 wt % to about 25 wt % based on the weight of the energy absorber.

One example of the primer fusing agent includes cesium tungsten oxide (CTO) nanoparticles as the energy absorber. The CTO nanoparticles have a formula of $Cs_xWO_3$, where $0<x<1$. The cesium tungsten oxide nanoparticles may give the primer fusing agent a light blue color. The strength of the color may depend, at least in part, on the amount of the CTO nanoparticles in the primer fusing agent. When it is desirable to form an outer white layer on the 3D object, less of the CTO nanoparticles may be used in the primer fusing agent in order to achieve the white color. In an example, the CTO nanoparticles may be present in the primer fusing agent in an amount ranging from about 1 wt % to about 20 wt % (based on the total weight of the primer fusing agent).

The average particle size (e.g., volume-weighted mean diameter) of the CTO nanoparticles may range from about 1 nm to about 40 nm. In some examples, the average particle size of the CTO nanoparticles may range from about 1 nm to about 15 nm or from about 1 nm to about 10 nm. The upper end of the particle size range (e.g., from about 30 nm to about 40 nm) may be less desirable, as these particles may be more difficult to stabilize.

This example of the primer fusing agent may also include a zwitterionic stabilizer. The zwitterionic stabilizer may improve the stabilization of this example of the primer fusing agent. While the zwitterionic stabilizer has an overall neutral charge, at least one area of the molecule has a positive charge (e.g., amino groups) and at least one other area of the molecule has a negative charge. The CTO nanoparticles may have a slight negative charge. The zwitterionic stabilizer molecules may orient around the slightly negative CTO nanoparticles with the positive area of the zwitterionic stabilizer molecules closest to the CTO nanoparticles and the negative area of the zwitterionic stabilizer molecules furthest away from the CTO nanoparticles. Then, the negative charge of the negative area of the zwitterionic stabilizer molecules may repel CTO nanoparticles from each other. The zwitterionic stabilizer molecules may form a protective layer around the CTO nanoparticles, and prevent them from coming into direct contact with each other and/or increase the distance between the particle surfaces (e.g., by a distance ranging from about 1 nm to about 2 nm). Thus, the zwitterionic stabilizer may prevent the CTO nanoparticles from agglomerating and/or settling in the primer fusing agent.

Examples of suitable zwitterionic stabilizers include $C_2$ to $C_8$ betaines, $C_2$ to $C_8$ aminocarboxylic acids having a solubility of at least 10 g in 100 g of water, taurine, and combinations thereof. Examples of the $C_2$ to $C_8$ aminocarboxylic acids include beta-alanine, gamma-aminobutyric acid, glycine, and combinations thereof.

The zwitterionic stabilizer may be present in the primer fusing agent in an amount ranging from about 2 wt % to about 35 wt % (based on the total weight of the primer fusing agent). When the zwitterionic stabilizer is the $C_2$ to $C_8$ betaine, the $C_2$ to $C_8$ betaine may be present in an amount ranging from about 8 wt % to about 35 wt % of the total weight of the primer fusing agent. When the zwitterionic stabilizer is the $C_2$ to $C_8$ aminocarboxylic acid, the $C_2$ to $C_8$ aminocarboxylic acid may be present in an amount ranging from about 2 wt % to about 20 wt % of the total weight of the primer fusing agent. When the zwitterionic stabilizer is taurine, taurine may be present in an amount ranging from about 2 wt % to about 35 wt % of the total weight of the primer fusing agent.

In this example, the weight ratio of the CTO nanoparticles to the zwitterionic stabilizer may range from 1:10 to 10:1; or the weight ratio of the CTO nanoparticles to the zwitterionic stabilizer may be 1:1.

Fusing Agent Vehicles

As used herein, "FA vehicle" may refer to the liquid in which the energy absorber is dispersed or dissolved to form the fusing agent (e.g., the core fusing agent or the primer fusing agent). A wide variety of FA vehicles, including aqueous and non-aqueous vehicles, may be used in the fusing agent. In some examples, the FA vehicle may include water alone or a non-aqueous solvent alone with no other components. In other examples, the FA vehicle may include other components, depending, in part, upon the applicator that is to be used to dispense the fusing agent. Examples of other suitable fusing agent components include co-solvent(s), humectant(s), surfactant(s), antimicrobial agent(s), anti-kogation agent(s), and/or chelating agent(s).

The solvent of the fusing agent may be water or a non-aqueous solvent (e.g., ethanol, acetone, n-methyl pyrrolidone, aliphatic hydrocarbons, etc.). In some examples, the fusing agent consists of the energy absorber and the solvent (without other components). In these examples, the solvent makes up the balance of the fusing agent.

Classes of organic co-solvents that may be used in a water-based fusing agent include aliphatic alcohols, aromatic alcohols, diols, glycol ethers, polyglycol ethers, 2-pyrrolidones, caprolactams, formamides, acetamides, glycols, and long chain alcohols. Examples of these co-solvents include primary aliphatic alcohols, secondary aliphatic alcohols, 1,2-alcohols, 1,3-alcohols, 1,5-alcohols, 1,6-hexanediol or other diols (e.g., 1,5-pentanediol, 2-methyl-1,3-propanediol, etc.), ethylene glycol alkyl ethers, propylene glycol alkyl ethers, higher homologs ($C_6$-$C_{12}$) of polyethylene glycol alkyl ethers, triethylene glycol, tetraethylene glycol, tripropylene glycol methyl ether, N-alkyl caprolactams, unsubstituted caprolactams, both substituted and unsubstituted formamides, both substituted and unsubstituted acetamides, and the like. Other examples of organic co-solvents include dimethyl sulfoxide (DMSO), isopropyl alcohol, ethanol, pentanol, acetone, or the like.

Other examples of suitable co-solvents include water-soluble high-boiling point solvents, which have a boiling point of at least 120° C., or higher. Some examples of high-boiling point solvents include 2-pyrrolidone (i.e., 2-pyrrolidinone, boiling point of about 245° C.), 1-methyl-2-pyrrolidone (boiling point of about 203° C.), N-(2-hydroxyethyl)-2-pyrrolidone (boiling point of about 140° C.), 2-methyl-1,3-propanediol (boiling point of about 212° C.), and combinations thereof.

The co-solvent(s) may be present in the fusing agent in a total amount ranging from about 1 wt % to about 50 wt % based upon the total weight of the fusing agent, depending upon the jetting architecture of the applicator. In an example, the total amount of the co-solvent(s) present in the fusing agent is 25 wt % based on the total weight of the fusing agent.

The co-solvent(s) of the fusing agent may depend, in part, upon the jetting technology that is to be used to dispense the fusing agent. For example, if thermal inkjet printheads are to be used, water and/or ethanol and/or other longer chain alcohols (e.g., pentanol) may be the solvent (i.e., makes up 35 wt % or more of the fusing agent) or co-solvents. For another example, if piezoelectric inkjet printheads are to be used, water may make up from about 25 wt % to about 30 wt % of the fusing agent, and the solvent (i.e., 35 wt % or more of the fusing agent) may be ethanol, isopropanol, acetone, etc. The co-solvent(s) of the fusing agent may also depend, in part, upon the build material composition that is being used with the fusing agent. For a hydrophobic powder (such as the polyamides disclosed herein), the FA vehicle may include a higher solvent content in order to improve the flow of the fusing agent into the build material composition.

The FA vehicle may also include humectant(s). In an example, the total amount of the humectant(s) present in the fusing agent ranges from about 3 wt % to about 10 wt %, based on the total weight of the fusing agent. An example of a suitable humectant is ethoxylated glycerin having the following formula:

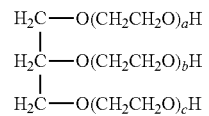

in which the total of a+b+c ranges from about 5 to about 60, or in other examples, from about 20 to about 30. An example of the ethoxylated glycerin is LIPON IC® EG-1 (LEG-1, glycereth-26, a+b+c=26, available from Lipo Chemicals).

In some examples, the FA vehicle includes surfactant(s) to improve the jettability of the fusing agent. Examples of suitable surfactants include a self-emulsifiable, non-ionic wetting agent based on acetylenic diol chemistry (e.g., SURFYNOL® SEF from Air Products and Chemicals, Inc.), a non-ionic fluorosurfactant (e.g., CAPSTONE® fluorosurfactants, such as CAPSTONE® FS-35, from Chemours), and combinations thereof. In other examples, the surfactant is an ethoxylated low-foam wetting agent (e.g., SURFYNOL® 440 or SURFYNOL® CT-111 from Air Products and Chemical Inc.) or an ethoxylated wetting agent and molecular defoamer (e.g., SURFYNOL® 420 from Air Products and Chemical Inc.). Still other suitable surfactants include non-ionic wetting agents and molecular defoamers (e.g., SURFYNOL® 104E from Air Products and Chemical Inc.) or water-soluble, non-ionic surfactants (e.g., TERGITOL™ TMN-6, TERGITOL™ 15-S-7, or TERGITOL™ 15-S-9 (a secondary alcohol ethoxylate) from The Dow Chemical Company or TEGO® Wet 510 (polyether siloxane) available from Evonik Industries).

Whether a single surfactant is used or a combination of surfactants is used, the total amount of surfactant(s) in the fusing agent may range from about 0.01 wt % to about 10 wt % based on the total weight of the fusing agent. In an example, the total amount of surfactant(s) in the fusing agent may be about 3 wt % based on the total weight of the fusing agent.

An anti-kogation agent may be included in the fusing agent that is to be jetted using thermal inkjet printing. Kogation refers to the deposit of dried printing liquid (e.g., fusing agent) on a heating element of a thermal inkjet printhead. Anti-kogation agent(s) is/are included to assist in preventing the buildup of kogation. Examples of suitable anti-kogation agents include oleth-3-phosphate (e.g., commercially available as CRODAFOS™ O3A or CRODAFOS™ N-3 acid from Croda), or a combination of oleth-3-phosphate and a low molecular weight (e.g., <5,000) polyacrylic acid polymer (e.g., commercially available as CARBOSPERSE™ K-7028 Polyacrylate from Lubrizol).

Whether a single anti-kogation agent is used or a combination of anti-kogation agents is used, the total amount of anti-kogation agent(s) in the fusing agent may range from greater than 0.20 wt % to about 0.65 wt % based on the total weight of the fusing agent. In an example, the oleth-3-phosphate is included in an amount ranging from about 0.20 wt % to about 0.60 wt %, and the low molecular weight polyacrylic acid polymer is included in an amount ranging from about 0.005 wt % to about 0.03 wt %.

The FA vehicle may also include antimicrobial agent(s). Suitable antimicrobial agents include biocides and fungicides. Example antimicrobial agents may include the NUOSEPT™ (Troy Corp.), UCARCIDE™ (Dow Chemical Co.), ACTICIDE® B20 (Thor Chemicals), ACTICIDE® M20 (Thor Chemicals), ACTICIDE® MBL (blends of 2-methyl-4-isothiazolin-3-one (MIT), 1,2-benzisothiazolin-3-one (BIT) and Bronopol) (Thor Chemicals), AXIDE™ (Planet Chemical), NIPACIDE™ (Clariant), blends of 5-chloro-2-methyl-4-isothiazolin-3-one (CIT or CMIT) and MIT under the tradename KATHON™ (Dow Chemical Co.), and combinations thereof. Examples of suitable biocides include an aqueous solution of 1,2-benzisothiazolin-3-one (e.g., PROXEL® GXL from Arch Chemicals, Inc.), quaternary ammonium compounds (e.g., BARDAC® 2250 and 2280, BARQUAT® 50-65B, and CARBOQUAT® 250-T, all from Lonza Ltd. Corp.), and an aqueous solution of methylisothiazolone (e.g., KORDEK® MLX from Dow Chemical Co.).

In an example, the fusing agent may include a total amount of antimicrobial agents that ranges from about 0.05 wt % to about 1 wt %. In an example, the antimicrobial agent(s) is/are a biocide(s) and is/are present in the fusing agent in an amount of about 0.25 wt % (based on the total weight of the fusing agent).

Chelating agents (or sequestering agents) may be included in the FA vehicle to eliminate the deleterious effects of heavy metal impurities. Examples of chelating agents include disodium ethylenediaminetetraacetic acid (EDTA-Na), ethylene diamine tetra acetic acid (EDTA), and methylglycinediacetic acid (e.g., TRILON® M from BASF Corp.).

Whether a single chelating agent is used or a combination of chelating agents is used, the total amount of chelating agent(s) in the fusing agent may range from greater than 0 wt % to about 2 wt % based on the total weight of the fusing agent. In an example, the chelating agent(s) is/are present in the fusing agent in an amount of about 0.04 wt % (based on the total weight of the fusing agent).

Coloring Agents

In the examples of the 3D printing kit, the 3D printing composition, the 3D printing methods, and the 3D printing system disclosed herein, a coloring agent may be used. The coloring agent may include a colorant, a co-solvent, and a balance of water. In some examples, the coloring agent consists of these components, and no other components. In some other examples, the coloring agent may further include a binder (e.g., an acrylic latex binder, which may be a copolymer of any two or more of styrene, acrylic acid, methacrylic acid, methyl methacrylate, ethyl methacrylate, and butyl methacrylate) and/or a buffer. In still other examples, the coloring agent may further include additional components, such as dispersant(s), humectant(s), surfactant(s), anti-kogation agent(s), antimicrobial agent(s), and/or chelating agent(s) (each of which is described above in reference to the fusing agent).

The coloring agent may be a black agent, a cyan agent, a magenta agent, or a yellow agent. As such, the colorant may be a black colorant, a cyan colorant, a magenta colorant, a yellow colorant, or a combination of colorants that together achieve a black, cyan, magenta, or yellow color.

In some instances, the colorant of the coloring agent may be transparent to infrared wavelengths. In other instances, the colorant of the coloring agent may not be completely transparent to infrared wavelengths, but does not absorb enough radiation to sufficiently heat the build material composition in contact therewith. In an example, the colorant absorbs less than 10% of radiation having wavelengths in a range of 650 nm to 2500 nm. In another example, the colorant absorbs less than 20% of radiation having wavelengths in a range of 650 nm to 4000 nm.

The colorant of the coloring agent is also capable of absorbing radiation with wavelengths of 650 nm or less. As such, the colorant absorbs at least some wavelengths within the visible spectrum, but absorbs little or no wavelengths within the near-infrared spectrum. This is in contrast to at least some examples of the energy absorber in the fusing agent, which absorbs wavelengths within the near-infrared spectrum and/or the infrared spectrum (e.g., the fusing agent absorbs 80% or more of radiation with wavelengths within the near-infrared spectrum and/or the infrared spectrum). As such, the colorant in the coloring agent will not substantially absorb the fusing radiation, and thus will not initiate coalescing/fusing of the build material composition in contact therewith when the build material composition is exposed to the fusing radiation.

Examples of IR transparent colorants include acid yellow 23 (AY 23), AY17, acid red 52 (AR 52), AR 289, and reactive red 180 (RR 180). Examples of colorants that absorb some visible wavelengths and some IR wavelengths include cyan colorants, such as direct blue 199 (DB 199) and pigment blue 15:3 (PB 15:3).

In other examples, the colorant may be any azo dye having sodium or potassium counter ion(s) or any diazo (i.e., double azo) dye having sodium or potassium counter ion(s).

Examples of black dyes may include tetrasodium (6Z)-4-acetamido-5-oxo-6-[[7-sulfonato-4-(4-sulfonatophenyl)azo-1-naphthyl]hydrazono]naphthalene-1,7-disulfonate with a chemical structure of:

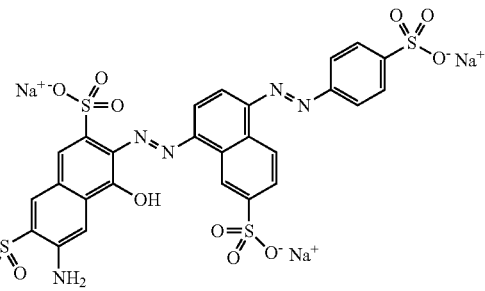

(commercially available as Food Black 2); tetrasodium (6E)-4-amino-5-oxo-3-[[4-(2-sulfonatooxyethylsulfonyl)phenyl]diazenyl]-6-[[4-(2-sulfonatooxyethylsulfonyl)phenyl]hydrazinylidene]naphthalene-2,7-disulfonate with a chemical structure of:

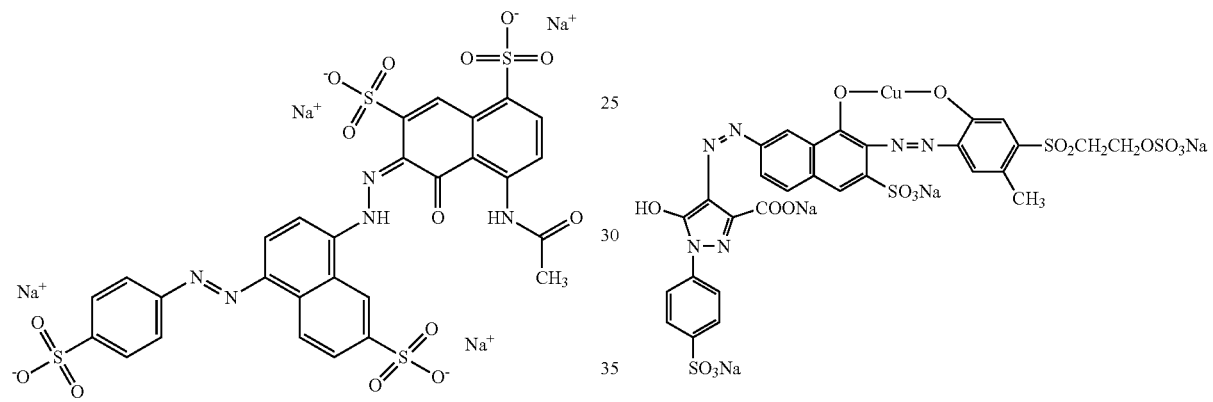

(commercially available as Food Black 1); tetrasodium 6-amino-4-hydroxy-3-[[7-sulfonato-4-[(4-sulfonatophenyl)azo]-1-naphthyl]azo]naphthalene-2,7-disulfonate with a chemical structure of:

(commercially available as Reactive Black 31); tetrasodium (6E)-4-amino-5-oxo-3-[[4-(2-sulfonatooxyethylsulfonyl)phenyl]diazenyl]-6-[[4-(2-sulfonatooxyethylsulfonyl)phenyl]hydrazinylidene]naphthalene-2,7-disulfonate with a chemical structure of:

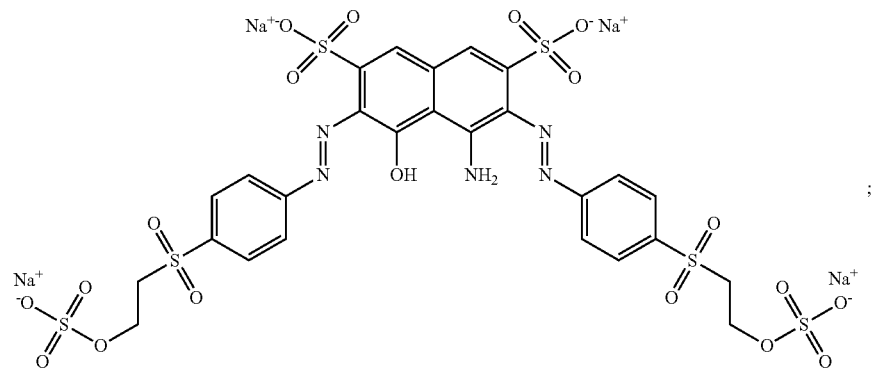 [SMILES: [Na+] ; Nc1c(/N=N/c2ccc(S(=O)(=O)CCOS(=O)(=O)[O-])cc2)c(S(=O)(=O)[O-])cc2cc(S(=O)(=O)[O-])c(/N=N/c3ccc(S(=O)(=O)CCOS(=O)(=O)[O-])cc3)c(O)c12 ; [Na+] ; [Na+] ; [Na+]]

;

and combinations thereof. Some other commercially available examples of black dyes include multipurpose black azo-dye based liquids, such as PRO-JET® Fast Black 1 (made available by Fujifilm Holdings), and black azo-dye based liquids with enhanced water fastness, such as PRO-JET® Fast Black 2 (made available by Fujifilm Holdings).

Examples of cyan dyes include ethyl-[4-[[4-[ethyl-[(3-sulfophenyl) methyl] amino] phenyl]-(2-sulfophenyl) ethylidene]-1-cyclohexa-2,5-dienylidene]-[(3-sulfophenyl) methyl] azanium with a chemical structure of:

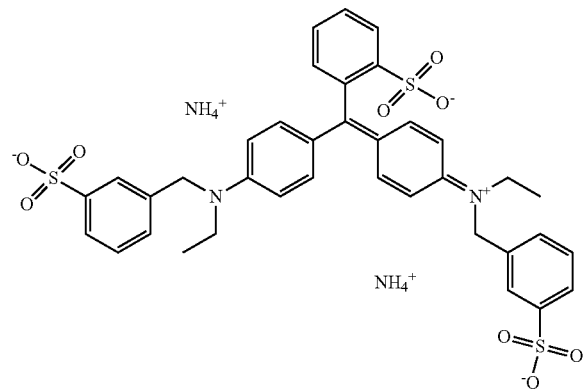

(commercially available as Acid Blue 9, where the counter ion may alternatively be sodium counter ions or potassium counter ions); sodium 4-[(E)-{4-[benzyl(ethyl)amino]phenyl}{(4E)-4-[benzyl(ethyl)iminio]cyclohexa-2,5-dien-1-ylidene}methyl]benzene-1,3-disulfonate with a chemical structure of:

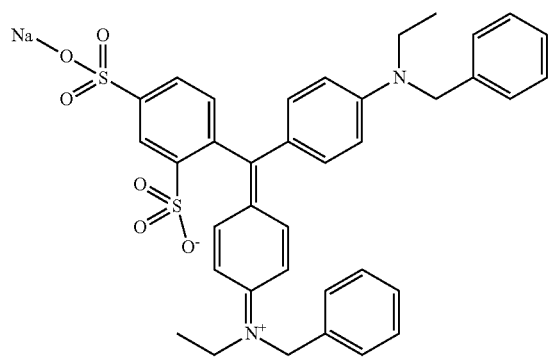

(commercially available as Acid Blue 7); and a phthalocyanine with a chemical structure of:

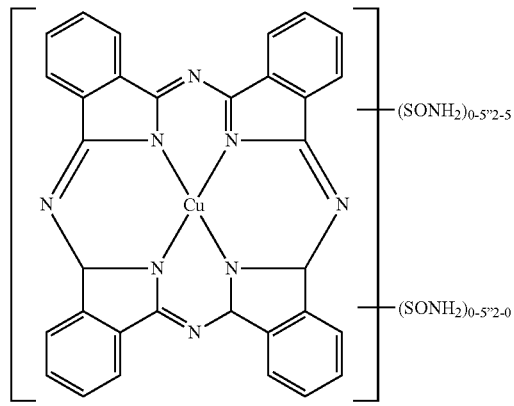

(commercially available as Direct Blue 199); and combinations thereof.

An example of the pigment based coloring agent may include from about 1 wt % to about 10 wt % of pigment(s), from about 10 wt % to about 30 wt % of co-solvent(s), from about 1 wt % to about 10 wt % of dispersant(s), from about 0.1 wt % to about 5 wt % of binder(s), from 0.01 wt % to about 1 wt % of anti-kogation agent(s), from about 0.05 wt % to about 0.1 wt % antimicrobial agent(s), and a balance of water. An example of the dye based coloring agent may include from about 1 wt % to about 7 wt % of dye(s), from about 10 wt % to about 30 wt % of co-solvent(s), from about 1 wt % to about 7 wt % of dispersant(s), from about 0.05 wt % to about 0.1 wt % antimicrobial agent(s), from 0.05 wt % to about 0.1 wt % of chelating agent(s), from about 0.005 wt % to about 0.2 wt % of buffer(s), and a balance of water.

Some examples of the coloring agent include a set of cyan, magenta, and yellow agents, such as C1893A (cyan), C1984A (magenta), and C1985A (yellow); or C4801A (cyan), C4802A (magenta), and C4803A (yellow); all of which are available from HP Inc. Other commercially available coloring agents include C9384A (printhead HP 72), C9383A (printhead HP 72), C4901A (printhead HP 940), and C4900A (printhead HP 940).

Detailing Agents

In the examples of the 3D printing kit, the 3D printing composition, the 3D printing methods, and the 3D printing system disclosed herein a detailing agent may be used. The detailing agent may include a surfactant, a co-solvent, and a balance of water. In some examples, the detailing agent consists of these components, and no other components. In some other examples, the detailing agent may further include additional components, such as humectant(s), anti-kogation agent(s), antimicrobial agent(s), and/or chelating agent(s) (each of which is described above in reference to the fusing agent).

The surfactant(s) that may be used in the detailing agent include any of the surfactants listed above in reference to the fusing agent. The total amount of surfactant(s) in the detailing agent may range from about 0.10 wt % to about 5.00 wt % with respect to the total weight of the detailing agent.

The co-solvent(s) that may be used in the detailing agent include any of the co-solvents listed above in reference to the fusing agent. The total amount of co-solvent(s) in the detailing agent may range from about 1.00 wt % to about 20.00 wt % with respect to the total weight of the detailing agent. Similar to the fusing agent, the co-solvent(s) of the detailing agent may depend, in part upon the jetting technology that is to be used to dispense the detailing agent. For example, if thermal inkjet printheads are to be used, water and/or ethanol and/or other longer chain alcohols (e.g., pentanol) may make up 35 wt % or more of the detailing agent. For another example, if piezoelectric inkjet printheads are to be used, water may make up from about 25 wt % to about 30 wt % of the detailing agent, and 35 wt % or more of the detailing agent may be ethanol, isopropanol, acetone, etc.

The balance of the detailing agent is water. As such, the amount of water may vary depending upon the amounts of the other components that are included.

While the example detailing agent described herein does not include a colorant, it is to be understood that any of the colorants described for the coloring agent (i.e., transparent to infrared wavelengths) may be used in the detailing agent. As one example, it may be desirable to add color to the detailing agent when the detailing agent is applied to the edge of a colored part. Color in the detailing agent may be desirable when used at a part edge because some of the colorant may become embedded in the build material that fuses/coalesces at the edge.

Anti-Coalescing Agents

In the examples of the 3D printing kit, the 3D printing composition, the 3D printing methods, and the 3D printing system disclosed herein an anti-coalescing agent may be used. The anti-coalescing agent may be used to negatively pattern portions of the build material composition (which includes the surface treated polymer) that are not to become part of the final 3D object but that may be exposed to thermal energy bled or transferred from portions of the build material that are to become part of the final 3D object. As used herein, "negatively pattern" refers to the application of liquid(s) (e.g., the anti-coalescing agent) to portion(s) of the build material that are not to become part of the final 3D object. In some examples, the anti-coalescing agent may be used to negatively pattern i) portions that surround the build material that is to become part of the final 3D object, ii) features, such as apertures, notches, cut-outs, or other areas where the build material is not supposed to fuse, or iii) a combination thereof.

When the anti-coalescing agent is applied, the anti-coalescing polymer forms a polymeric coating on the surfaces of the build material particles and in the voids between the build material particles. As such, the negatively patterning of the build material with the anti-coalescing agent defines a removable build material portion that contains build material with altered surface properties which prevent the build material from coalescing with other build material during 3D printing. It has been found that the surface treated polymer disclosed herein improves the wettability of the anti-coalescing agent on the surface treated polymer. In particular, a lower loading of the anti-coalescing agent may be used to effectively and discretely coat the surface treated polymer.

The anti-coalescing agent includes a vehicle and an anti-coalescing polymer dispersed in the vehicle (e.g., a co-solvent; a surfactant; a humectant; and water). In some examples, the anti-coalescing agent consists of these components, and no other components.

The anti-coalescing polymer may be any polymer capable of coating the surface treated polymer and capable of preventing the surface treated polymer from coalescing (e.g., fusing, thermally merging, etc.) during electromagnetic radiation exposure of a 3D printing process. In an example, the anti-coalescing polymer has a mean particle size ranging from about 50 nm to about 195 nm.

In some examples, the anti-coalescing polymer is a perfluorinated polymer. It has been found that perfluorinated polymers are capable of both forming a coating on the surface treated polymer and of keeping the surface treated polymer from coalescing when heated to a temperature that would otherwise cause the material to coalesce. In one of these examples, the perfluorinated polymer is selected from the group consisting of a perfluoroalkoxy alkane, poly (tetrafluoroethylene), a perfluorinated polyether, fluorinated ethylene propylene, and combinations thereof. Examples of a perfluoroalkoxy alkane have a chemical structure of:

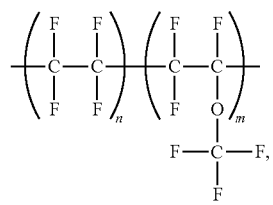

where n is greater than 5 and less than 100,000 and m is greater than 5 and less than 100,000. Examples of a poly (tetrafluoroethylene) have a chemical structure of:

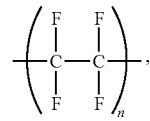

where n is greater than 5 and less than 100,000. An example of poly(tetrafluoroethylene) includes TEFLON® (available from E. I. du Pont de Nemours and Company). Examples of a perfluorinated polyether have a chemical structure of:

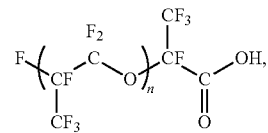

where n is greater than 5 and less than 100,000. In some examples of the perfluorinated polyether, n ranges from 10 to 60. Examples of a perfluorinated polyether include KRY-TOX™ lubricants (available from The Chemours Company). Examples of fluorinated ethylene propylene have a chemical structure of:

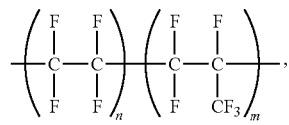

where n is greater than 5 and less than 100,000 and m is greater than 5 and less than 100,000.

In an example, the anti-coalescing polymer is included in the anti-coalescing agent in an amount ranging from about 2 wt % to about 30 wt %, based on the total weight of the anti-coalescing agent. In another example, the anti-coalescing polymer is included in the anti-coalescing agent in an amount ranging from about 3 wt % to about 10 wt %, based on the total weight of the anti-coalescing agent.

The co-solvent(s) that may be used in the anti-coalescing agent include any of the co-solvents listed above in reference to the fusing agent. In an example, the total amount of the co-solvent(s) present in the anti-coalescing agent ranges from about 10 wt % to about 20 wt %, based on the total weight of the anti-coalescing agent. The co-solvent amount may be varied depending upon the jetting technology used.

The surfactant(s) that may be used in the anti-coalescing agent may be a blend of non-ionic surfactant(s) and anionic surfactant(s). As one example, the blend includes three different non-ionic surfactants and one anionic surfactant. For example, the surfactants include a first non-ionic surfactant having a first hydrophilic chain length; a second non-ionic surfactant having a second hydrophilic chain length that is different than the first hydrophilic chain length; a third non-ionic surfactant, wherein the third non-ionic surfactant is selected from the group consisting of a polyether siloxane and an alkoxylated alcohol; and an anionic surfactant. More specifically, the first non-ionic surfactant may be TERGITOL™ TMN-6 (available from The Dow Chemical Company), the second non-ionic surfactant may be TERGITOL™ 15-S-30 (which has a higher HLB number and a longer hydrophilic chain length than TERGITOL™ TMN-6), the third non-ionic surfactant is a polyether siloxane (e.g., TEGO® Wet 270 or TEGO® Wet 280, available from Evonik) or an alkoxylated alcohol (e.g., TEGO® Wet 510 available from Evonik), and anionic surfactant may be alkyldiphenyloxide disulfonate (e.g., the DOWFAX™ series, such a 2A1, 3B2, 8390, C6L, C10L, and 30599).

In some examples, the first non-ionic surfactant may be present in an amount ranging from about 0.1 wt % to about 1 wt %; the second non-ionic surfactant may be present in an amount ranging from about 0.1 wt % to about 1 wt %; the third non-ionic surfactant may be present in an amount ranging from about 0.1 wt % to about 1 wt %; and/or the anionic surfactant may be present in an amount ranging from about 0.1 wt % to about 1 wt % (based on the total weight of the anti-coalescing agent). The total amount of surfactant(s) in the anti-coalescing agent may range from about 0.25 wt % to about 3 wt % with respect to the total weight of the anti-coalescing agent.

The co-solvent(s) that may be used in the anti-coalescing agent include any of the co-solvents listed above in reference to the fusing agent. In an example, the total amount of the co-solvent(s) present in the anti-coalescing agent ranges from about 10 wt % to about 20 wt %, based on the total weight of the anti-coalescing agent.

The humectant that may be used in the anti-coalescing agent includes any of the humectants listed above in reference to the fusing agent. In an example, the total amount of the humectant present in the anti-coalescing agent ranges from about 3 wt % to about 10 wt %, based on the total weight of the anti-coalescing agent.

In an example, the anti-coalescing agent has a surface tension ranging from about 20 dynes/cm to about 28 dynes/cm.

Printing Methods and Methods of Use

Figure 2:
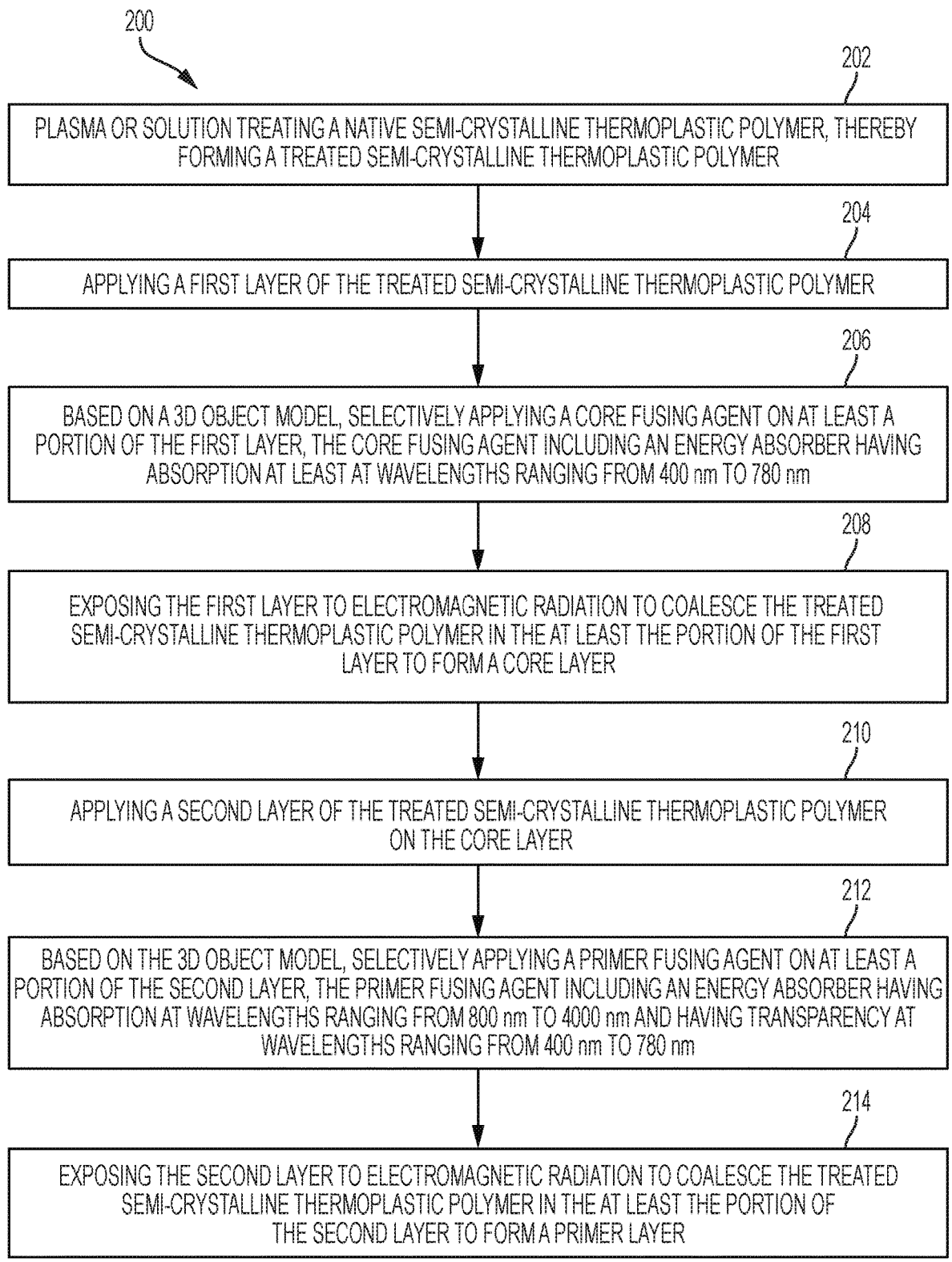
FIG. 2 is a flow diagram illustrating another example of a method for 3D printing.

Referring now to FIGS. 1 and 2, examples of a method 100 for using the 3D printing kit and a method 200 for 3D printing are depicted. The examples of the methods 100, 200 may use examples of the 3D printing kit and/or composition disclosed herein. Additionally, the examples of the methods 100, 200 may be used to print 3D objects that exhibit a white color, a cyan color, a magenta color, a yellow color, a black color, or a combination thereof.

As shown in FIG. 1, the method 100 for using the three-dimensional (3D) printing kit comprises: plasma or solution treating a native semi-crystalline thermoplastic polymer, thereby forming a treated semi-crystalline thermoplastic polymer (reference numeral 102); applying the treated semi-crystalline thermoplastic polymer to form a build material layer (reference numeral 104); based on a 3D object model, selectively applying a fusing agent on at least a portion of the build material layer (reference numeral 106); and exposing the build material layer to electromagnetic radiation to coalesce the treated semi-crystalline thermoplastic polymer in the at least the portion to form a layer of a 3D object (reference numeral 108).

As shown in FIG. 2, the method 200 for three-dimensional (3D) printing comprises: plasma or solution treating a native semi-crystalline thermoplastic polymer, thereby forming a treated semi-crystalline thermoplastic polymer (reference numeral 202); applying a first layer of the treated semi-crystalline thermoplastic polymer (reference numeral 204); based on a 3D object model, selectively applying a core fusing agent on at least a portion of the first layer, the core fusing agent including an energy absorber having absorption at least at wavelengths ranging from 400 nm to 780 nm (reference numeral 206); exposing the first layer to electromagnetic radiation to coalesce the treated semi-crystalline thermoplastic polymer in the at least the portion of the first layer to form a core layer (reference numeral 208); applying a second layer of the treated semi-crystalline thermoplastic polymer on the core layer (reference numeral 210); based on the 3D object model, selectively applying a primer fusing agent on at least a portion of the second layer, the primer fusing agent including an energy absorber having absorption at wavelengths ranging from 800 nm to 4000 nm and having transparency at wavelengths ranging from 400 nm to 780 nm (reference numeral 212); and exposing the second layer to electromagnetic radiation to coalesce the treated semi-crystalline thermoplastic polymer in the at least the portion of the second layer to form a primer layer (reference numeral 214).

Figure 3:
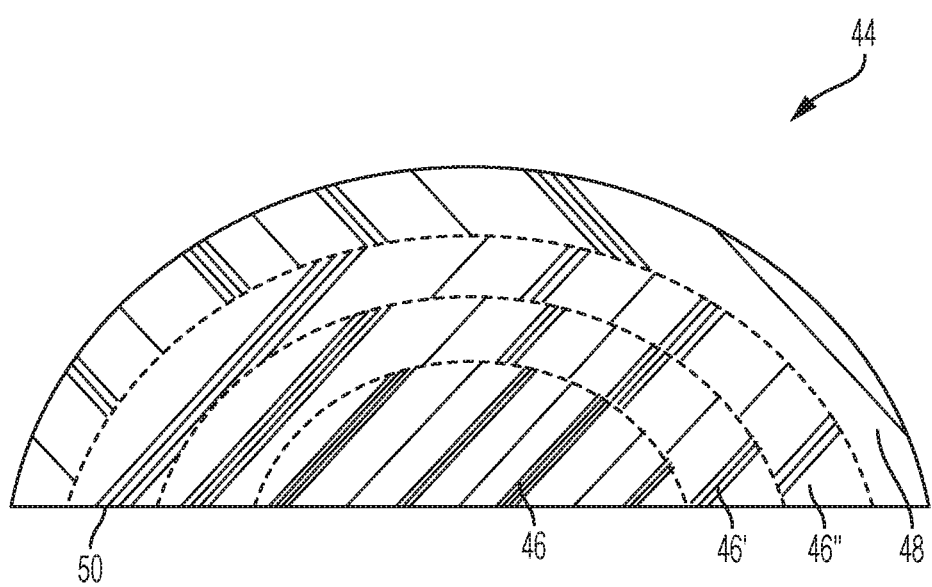
FIG. 3 is a cross-sectional view of an example of a part formed using an example of the 3D printing methods disclosed herein.

The methods 100, 200 may be used to form an object 44 as shown in FIG. 3, which includes several core layers 46, 46', 46" and an outer white layer 48 (also referred to herein as a primer layer). The core layers 46, 46', 46" are sequentially formed by selectively patterning respective build material layers with the core fusing agent 28 and exposing each patterned layer to electromagnetic radiation. The core layers 46, 46', 46" may be black or a dark color due to the absorber in the core fusing agent 28. The outer white layer 48 is formed by applying a build material layer on the outermost core layer 46", patterning it with the primer fusing agent 26, and exposing it to electromagnetic radiation. Since the primer fusing agent 26 has no or low tint, the white color of the plasma-treated build material composition 16 is visible, and thus gives the outer white layer 48 its white appearance. The outer white layer 48 provides the object 44 with a white (or slightly tinted) exterior surface. As such, the outer white layer 48 optically isolates the black core layer(s) 46, 46', 46" that it covers.

In the example object 44 shown in FIG. 3, the outer white layer 48 does not completely surround the object 44, but rather may be formed on the outer surface(s) of the core layer 46" that will be visible. For example, in FIG. 3, the surface 50 of the object 44 may not be visible when the object 44 is in use, and thus it may not be desirable to form the outer white layer 48 on this surface 50.

It is to be understood that the methods 100, 200 may include additional processing to form the object 44 with an outer colored layer (not shown in FIG. 3) on at least a portion of the outer white layer 48, or to form another object 44' (shown in FIG. 4G) which has the core layer(s) 46 completely encapsulated by a primer layer (including primer layer portions 48', 48", 48''', which are referred to herein respectively as primer layers 48, 48', 48") and an outer colored layer (including colored layer portions 52, 52', 52", which are referred to herein as colored layers 52, 52', 52").

The method 300 to form the object 44' will now be discussed in reference to FIGS. 4A through 4G. It is to be understood that the method 300 may be an example of the method 100 and/or the method 200.

Prior to execution of any of the methods 100, 200, 300 disclosed herein or as part of the methods 100, 200, 300 a controller 36 (see, e.g., FIG. 7) may access data stored in a data store 34 (see, e.g., FIG. 7) pertaining to a 3D object 44' that is to be printed. For example, the controller 36 may determine the number of layers of the plasma-treated build material composition 16 that are to be formed, the locations at which the fusing agent(s) 26, 28 from the applicator(s) 24A, 24B is/are to be deposited on each of the respective layers, etc.

While not shown, some examples of the methods 100, 200, 300 include plasma treating a native semi-crystalline thermoplastic polymer, thereby forming a plasma-treated semi-crystalline thermoplastic polymer.

The plasma treatment may be performed in a chamber with a controlled vacuum plasma. In some examples, the plasma treating involves a gas selected from the group consisting of nitrogen ($N_2$), oxygen ($O_2$), carbon dioxide ($CO_2$), ammonia ($NH_3$), and a combination thereof. In one example, the plasma treating involves a gas selected from the group consisting of oxygen, carbon dioxide, ammonia, and a combination thereof. In another example, the build material composition is treated with an oxygen plasma (i.e., the plasma treating involves oxygen gas). In still another example, the build material composition is treated with a carbon dioxide plasma (i.e., the plasma treating involves carbon dioxide gas). When the carbon dioxide plasma is used, oxidation of the native polymer may be reduced (as compared to the oxidation of the build material composition when other plasma treatments are used).

In some examples, the plasma treating of the native polymer is accomplished for a time period ranging from about 3 minutes to about 80 minutes.

Also while not shown, other examples of the methods 100, 200, 300 include solution treating a native semi-crystalline thermoplastic polymer, thereby forming a solution-treated semi-crystalline thermoplastic polymer.

The solution treatment may be performed in an oxidizing solution, such as sodium hypochlorite (10 wt %) or hydrogen peroxide (10 wt %-35 wt %), etc. Solution exposure time may range from about 1 minute to about 10 minutes.

In some examples, the solution treating of the native polymer is accomplished for a time period ranging from about 3 minutes to about 80 minutes.

As described herein, the plasma or solution treating of the native semi-crystalline thermoplastic polymer increases the surface energy density of the treated polymer to greater than 41 mN/m. Also as described herein, the plasma or solution treating of the native semi-crystalline thermoplastic polymer increases polar elements of the treated polymer, as well as the surface energy density contribution by the polar elements. Also as described herein, the plasma or solution treating of the native semi-crystalline thermoplastic polymer increases the surface oxygen content and the hydrophilicity of the resulting treated polymer. The plasma or solution treatment also helps to improve the consolidation properties, etc.

The plasma or solution treatment forms the treated semi-crystalline thermoplastic polymer. It is to be understood that the treated polymer alone may make up the build material composition 16. It is also to be understood that the build material composition 16 may include the treated polymer and any of the additives (e.g., glass, the filler, the antioxidant, the whitener (e.g., titanium dioxide), the antistatic agent, the flow aid, or combinations thereof). In some instances, the native semi-crystalline thermoplastic polymer and the additives may be combined together and then the mixture may be exposed to the plasma or other surface treatment to form the build material composition.

In some examples, after the plasma or solution treating of the build material composition, the method further comprises reacting the treated semi-crystalline thermoplastic polymer with a functional agent to modify a surface of the plasma-treated semi-crystalline thermoplastic polymer with a functional group selected from the group consisting of an amine, a urethane, an epoxy, a carboxyl, a silane, and a combination thereof. The treated semi-crystalline thermoplastic polymer may be reacted with the desired functional group or with a precursor to the desired functional group.

In an example, the plasma or solution treating of the native polymer is accomplished outside of the 3D printer, right before printing. In another example, the plasma or solution treating of the native polymer is accomplished in-line with the applying of the plasma-treated build material composition 16. In this example, the native polymer may be plasma-treated or solution treated in the 3D printer right before the treated build material composition 16 is applied in the printing process. In this example, the plasma or solution treatment may be accomplished while the build material composition is in a build material supply 14 (see FIG. 7). For example, the build material supply 14 may be moved to a plasma-treatment station or a solution-treatment station of the 3D printer. In some instances, the plasma or solution treatment may be accomplished after any recycled build material composition 16 is mixed with native polymer.

Figure 4A:
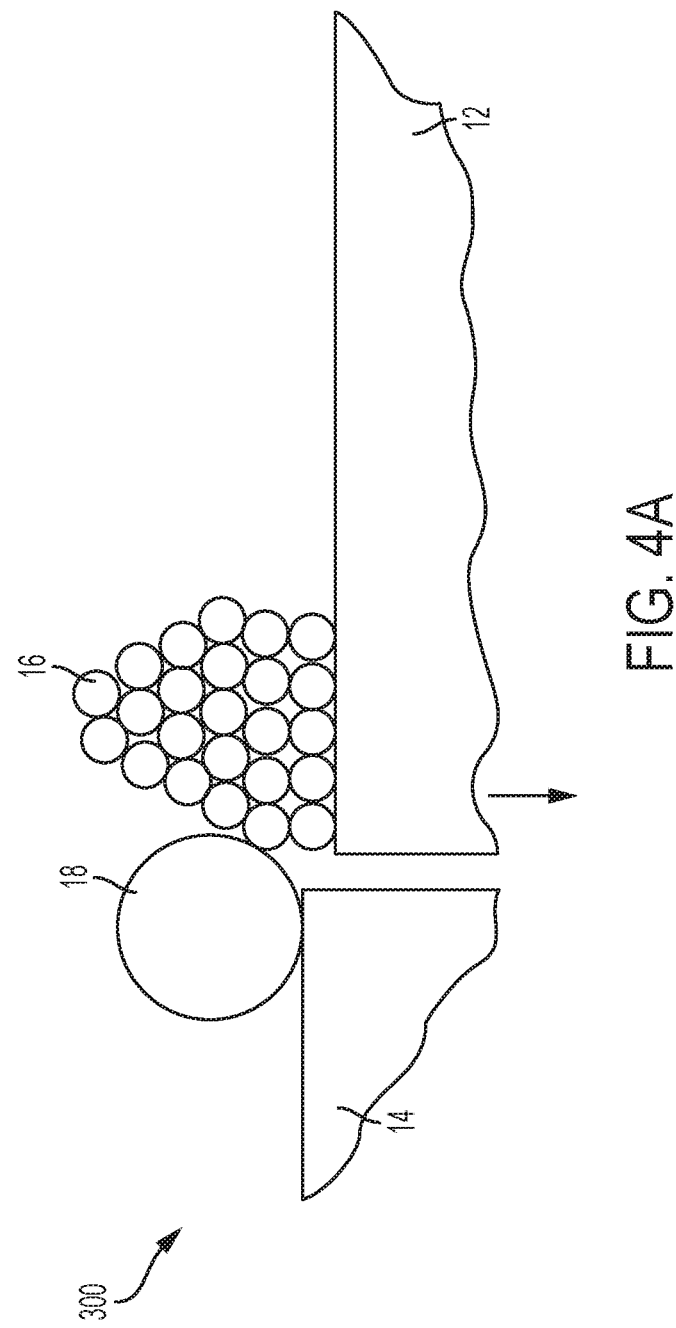

In FIGS. 4A and 4B, a layer 58 of the treated build material composition 16 is applied on the build area platform 12. In the example shown in FIGS. 4A and 4B, a printing system (e.g., the system 10 shown in FIG. 7) may be used to apply the treated build material composition 16. The printing system 10 may include a build area platform 12, a build material supply 14 containing the treated build material composition 16, and a build material distributor 18.

The build area platform 12 receives the treated build material composition 16 from the build material supply 14. The build area platform 12 may be moved in the directions as denoted by the arrow 20 (see FIG. 7), e.g., along the z-axis, so that the treated build material composition 16 may be delivered to the build area platform 12 or to a previously formed layer. In an example, when the treated build material composition 16 is to be delivered, the build area platform 12 may be programmed to advance (e.g., downward) enough so that the build material distributor 18 can push the treated build material composition 16 onto the build area platform 12 to form a substantially uniform layer of the treated build material composition 16 thereon. The build area platform 12 may also be returned to its original position, for example, when a new part is to be built.

The build material supply 14 may be a container, bed, or other surface that is to position the treated build material composition 16 between the build material distributor 18 and the build area platform 12. In some examples, the methods 100, 200, 300 further include heating the treated build material composition 16 in the build material supply 14 to a supply temperature ranging from about 25° C. to about 150° C. In these examples, the supply temperature may depend, in part, on the treated build material composition 16 used and/or the 3D printer used. As such, the range provided is one example, and higher or lower temperatures may be used. The heating of the treated build material composition 16 in the build material supply 14 may be accomplished by heating the build material supply 14 to the supply temperature.

The build material distributor 18 may be moved in the directions as denoted by the arrow 22 (see FIG. 7), e.g., along the y-axis, over the build material supply 14 and across the build area platform 12 to spread the layer 58 of the treated build material composition 16 over the build area platform 12. The build material distributor 18 may also be returned to a position adjacent to the build material supply 14 following the spreading of the treated build material composition 16. The build material distributor 18 may be a blade (e.g., a doctor blade), a roller, a combination of a roller and a blade, and/or any other device capable of spreading the treated build material composition 16 over the build area platform 12. For instance, the build material distributor 18 may be a counter-rotating roller. In some examples, the build material supply 14 or a portion of the build material supply 14 may translate along with the build material distributor 18 such that the treated build material composition 16 is delivered continuously to the material distributor 18 rather than being supplied from a single location at the side of the printing system 10 as depicted in FIG. 4A.

In FIG. 4A, the build material supply 14 may supply the treated build material composition 16 into a position so that it is ready to be spread onto the build area platform 12. The build material distributor 18 may spread the supplied treated build material composition 16 onto the build area platform 12. The controller 34 may process "control build material supply" data, and in response, control the build material supply 14 to appropriately position the particles of the treated build material composition 16, and may process "control spreader" data, and in response, control the build material distributor 18 to spread the supplied treated build material composition 16 over the build area platform 12 to form the layer 58 of treated build material composition 16 thereon. As shown in FIG. 4B, one build material layer 58 has been formed.

The layer 58 of the treated build material composition 16 has a substantially uniform thickness across the build area platform 12. In an example, the build material layer 58 has a thickness ranging from about 50 µm to about 120 µm. In another example, the thickness of the build material layer 58 ranges from about 30 µm to about 300 µm. It is to be understood that thinner or thicker layers may also be used. For example, the thickness of the build material layer 58 may range from about 20 µm to about 500 µm. The layer thickness may be about 2× (i.e., 2 times) the average diameter of the build material composition particles at a minimum for finer part definition. In some examples, the layer thickness may be about 1.2× the average diameter of the build material composition particles.

To form the object 44 shown in FIG. 3, this layer 58 of treated build material composition 16 would be patterned with the core fusing agent 28 (i.e., the core fusing agent 28 would be selectively dispensed on the layer 58 according to a pattern of a cross-section for the core layer 46), and then exposed to electromagnetic radiation to form the core layer 46. As used herein, the cross-section of the layer of the part to be formed refers to the cross-section that is parallel to the contact surface of the build area platform 12. As an example, if the core layer 46 is to be shaped like a cube or cylinder, the core fusing agent 28 will be deposited in a square pattern or a circular pattern (from a top view), respectively, on at least a portion of the layer 58 of the treated build material composition 16.

After the treated build material composition 16 has been applied, and prior to further processing, the build material layer 58 may be exposed to heating. Heating may be performed to pre-heat the treated build material composition 16. In an example, the heating temperature may be below the melting point of the surface treated polymer of the build material composition 16. In another example, the heating temperature may be below the lowest temperature in the melting range of the surface treated polymer of the build material composition 16. As such, the temperature selected will depend upon the surface treated polymer that is used.

As examples, the pre-heating temperature may range from about 5° C. to about 50° C. below the melting point of the surface treated polymer, or from about 5° C. to about 50° C. below the lowest temperature in the melting range of the surface treated polymer. In an example, the pre-heating temperature ranges from about 50° C. to about 205° C. In another example, the pre-heating temperature ranges from about 100° C. to about 205° C. In still another example, the pre-heating temperature ranges from about 100° C. to about 190° C. In yet another example, the methods 100, 200, 300 further include, prior to the selectively applying of the fusing agent 26, 28, pre-heating the treated build material composition 16 to a pre-heating temperature ranging from about 5° C. to about 50° C. below the melting point of the surface treated polymer, or from about 5° C. to about 50° C. below the lowest temperature in the melting range of the surface treated polymer. The low pre-heating temperature may enable the non-patterned treated build material composition 16 to be easily removed from the 3D object 44' after completion of the 3D object 44'. In these examples, the pre-heating temperature may depend, in part, on the treated build material composition 16 used. As such, the ranges provided are some examples, and higher or lower temperatures may be used.

Pre-heating the layer 58 of the treated build material composition 16 may be accomplished by using any suitable heat source that exposes all of the treated build material composition 16 on in the layer 58 to the heat. Examples of the heat source include a thermal heat source (e.g., a heater (not shown) integrated into the build area platform 12 (which may include sidewalls)) or the radiation source 38, 38' (see, e.g., FIG. 7).

After the layer 58 is formed, and in some instances is pre-heated, the primer fusing agent 26, and the coloring agent 30 are selectively applied on the same portion(s) 60 of the treated build material composition 16 in the layer 58.

As mentioned above, the primer fusing agent 26, includes an aqueous or non-aqueous vehicle and an energy absorber having absorption at wavelengths ranging from 800 nm to 4000 nm and transparency at wavelengths ranging from 400 nm to 780 nm dispersed therein. One specific example of the low tint or primer fusing agent 26 includes CTO nanoparticles as the energy absorber, a zwitterionic stabilizer, and an aqueous vehicle. Other example compositions of the primer fusing agent 26 are described above.

It is also to be understood that when an agent (e.g., the primer fusing agent 26, the core fusing agent 28, the coloring agent 30, the detailing agent 42, the anti-coalescing agent 42', etc.) is to be selectively applied to the treated build material composition 16, the agent 26, 28, 30, 42, 42' may be dispensed from an applicator 24A, 24B, 24C. The applicator(s) 24A, 24B, 24C may each be a thermal inkjet printhead, a piezoelectric printhead, a continuous inkjet printhead, etc., and the selective application of the agent(s) 26, 28, 30, 42 may be accomplished by thermal inkjet printing, piezo electric inkjet printing, continuous inkjet printing, etc. The controller 36 may process data, and in response, control the applicator(s) 24A, 24B, 24C (e.g., in the directions indicated by the arrow 32, see FIG. 7) to deposit the agent(s) 26, 28, 30, 42, 42' onto predetermined portion(s) of the treated build material composition 16. Throughout the method 300, a single applicator may be labeled with multiple reference numbers (24A, 24B and/or 24C), although it is to be understood that the applicators may be separate applicators or a single applicator with several individual cartridges for dispensing the respective agents 26, 28, 30, 42.

It is to be understood that the selective application of the primer fusing agent 26 may be accomplished in a single printing pass or in multiple printing passes. In some examples, the primer fusing agent 26 is selectively applied in a single printing pass. In an example of the methods 100, 200, 300, the flow of the primer fusing agent 26 on the treated build material composition 16 may be faster than the flow of the same amount of the primer fusing agent 26 on a non-treated (native) build material composition. In this example, the faster flow of the primer fusing agent 26 may enable the primer fusing agent 26 to be applied in a single printing pass. In some other examples, the primer fusing agent 26 is selectively applied in multiple printing passes. In one of these examples, the number of printing passes ranging from 2 to 4. In still other examples, 2 or 4 printing passes are used. It may be desirable to apply the primer fusing agent 26 in multiple printing passes to increase the amount of the energy absorber that is applied to the treated build material composition 16, to avoid liquid splashing, to avoid displacement of the treated build material composition 16, etc.

In an example of the methods 100, 200, 300, the penetration of the primer fusing agent 26 into the treated build material composition 16 may be more uniform than the penetration of the primer fusing agent 26 into a non-treated (native) build material composition. As such, the energy absorber of the primer fusing agent 26, and thus, the energy absorption may be more uniform throughout the treated build material composition 16. In another example of the methods 100, 200, 300, the primer fusing agent 26 may penetrate farther and/or faster into the treated build material composition 16 than the primer fusing agent 26 penetrates into a non-treated build material composition. As such, the energy absorber of the primer fusing agent 26, and thus, the energy absorption may penetrate farther into the treated build material composition 16.

The volume of the primer fusing agent 26 that is applied per unit of the treated build material composition 16 in the patterned portion 60 may be sufficient to absorb and convert enough electromagnetic radiation so that the treated build material composition 16 in the patterned portion 60 will coalesce/fuse. The volume of the primer fusing agent 26 that is applied per unit of the treated build material composition 16 may depend, at least in part, on the energy absorber used, the energy absorber loading in the primer fusing agent 26, and the treated build material composition 16 used.

When the desired color for the object 44' or a particular colored layer 52 (shown in FIG. 4C) of the object 44' is the color of the coloring agent 30, the primer fusing agent 26 is applied with the coloring agent 30, as shown in FIG. 4B. Since the primer fusing agent 26 is clear or slightly tinted, the color of the coloring agent 30 will be the color of the resulting colored layer 52, as the colorants of the coloring agent 30 become embedded throughout the coalesced/fused build material composition of the colored layer 52. The primer fusing agent 26 may be particularly suitable for obtaining lighter colors or white.

It is to be understood that the selective application of the coloring agent 30 may be accomplished in a single printing pass or in multiple printing passes. In some examples, the selectively applying of the coloring agent 30 is accomplished in a single printing pass. In an example of the methods 100, 200, 300, the flow of the coloring agent 30 on the treated build material composition 16 may be faster than the flow of the same amount of the coloring agent 30 on a non-treated (native) build material composition. In this example, the faster flow of the coloring agent 30 may enable the coloring agent 30 to be applied in a single printing pass. In some other examples, the selectively applying of the coloring agent 30 is accomplished in multiple printing passes. In one of these examples, the selectively applying of the coloring agent 30 is accomplished in a number of printing passes ranging from 2 to 4. It may be desirable to apply the coloring agent 30 in multiple printing passes to increase the amount of the colorant that is applied to the treated build material composition 16, to avoid liquid splashing, to avoid displacement of the treated build material composition 16, etc.

In an example of the methods 100, 200, 300, the penetration of the coloring agent 30 into the treated build material composition 16 may be more uniform than the penetration of the coloring agent 30 into a non-treated (native) build material composition. As such, the colorant of the coloring agent 30, and thus, the colored appearance may be more uniform throughout the treated build material composition 16. The coloring agent 30 may also penetrate farther and/or faster into the treated build material composition 16 than the coloring agent 30 penetrates into a non-treated (native) build material composition, which also improved color uniformity throughout the thickness of the layer 58, 52.

The primer fusing agent 26 and the coloring agent 30 are selectively applied in a pattern of a cross-section for the colored layer 52 that is to be formed. In the example shown in FIG. 4B, the portion 60 is adjacent to the portion 56 of the layer 58 to which the coloring agent 30 has been applied.

After the primer fusing agent 26 and the coloring agent 30 are selectively applied in the specific portion(s) 60 of the layer 58, the entire layer 58 of the treated build material composition 16 is exposed to electromagnetic radiation (shown as EMR Exposure in FIG. 4B, pointing toward FIG. 4C).

The electromagnetic radiation is emitted from the radiation source 38, 38' (FIG. 7). The length of time the electromagnetic radiation is applied for, or energy exposure time, may be dependent, for example, on one or more of: characteristics of the radiation source 38, 38'; characteristics of the treated build material composition 16; and/or characteristics of the primer fusing agent 26.

It is to be understood that the electromagnetic radiation exposure may be accomplished in a single radiation event or in multiple radiation events. In an example, the exposing of the treated build material composition 16 is accomplished in multiple radiation events. In a specific example, the number of radiation events ranges from 3 to 8. In still another specific example, the exposure of the treated build material composition 16 to electromagnetic radiation may be accomplished in 3 radiation events. It may be desirable to expose the treated build material composition 16 to electromagnetic radiation in multiple radiation events to counteract a cooling effect that may be brought on by the amount of the primer fusing agent 26 that is applied to the build material layer 58. Additionally, it may be desirable to expose the treated build material composition 16 to electromagnetic radiation in multiple radiation events to sufficiently elevate the temperature of the treated build material composition 16 in the portion(s) 60, without over heating the treated build material composition 16 in the non-patterned portion(s).

The primer fusing agent 26 enhances the absorption of the radiation, converts the absorbed radiation to thermal energy, and promotes the transfer of the thermal heat to the treated build material composition 16 in contact therewith. In an example, the primer fusing agent 26 sufficiently elevates the temperature of the treated build material composition 16 in the layer 58 to a temperature above the melting point of the treated semi-crystalline thermoplastic polymer, or within or above the melting range of the treated semi-crystalline thermoplastic polymer of the treated build material composition 16, allowing coalescing/fusing (e.g., thermal merging, melting, binding, etc.) of the treated build material composition 16 to take place. In an example of the methods 100, 200, 300, vapor and/or gases evaporated from the primer fusing agent 26, coloring agent 30, and/or detailing agent 42 may degas from the treated build material composition 16 better than from a non-treated (native) build material composition in the same conditions. The application of the electromagnetic radiation forms the colored layer 52, shown in FIG. 4C.

In some examples of the methods 100, 200, 300, the electromagnetic radiation has a wavelength ranging from 800 nm to 4000 nm, or from 800 nm to 1400 nm, or from 800 nm to 1200 nm. Radiation having wavelengths within the provided ranges may be absorbed (e.g., 80% or more of the applied radiation is absorbed) by the primer fusing agent 26 and may heat the treated build material composition 16 in contact therewith, and may not be substantially absorbed (e.g., 25% or less of the applied radiation is absorbed) by the non-patterned treated build material composition 16.

It is to be understood that portions of the treated build material composition 16 that do not have the primer fusing agent 26 applied thereto do not absorb enough radiation to coalesce/fuse. As such, these portions do not become part of the 3D object 44' that is ultimately formed. However, the generated thermal energy may propagate into the surrounding treated build material composition 16 that does not have primer fusing agent 26 applied thereto. The propagation of thermal energy may be inhibited from coalescing/fusing the non-patterned treated build material composition 16 in the layer 58, for example, when the detailing agent 42 or the anti-coalescing agent 42' is applied to the treated build material composition 16 in the layer 58 that are not exposed to the primer fusing agent 26.

Figure 4D:
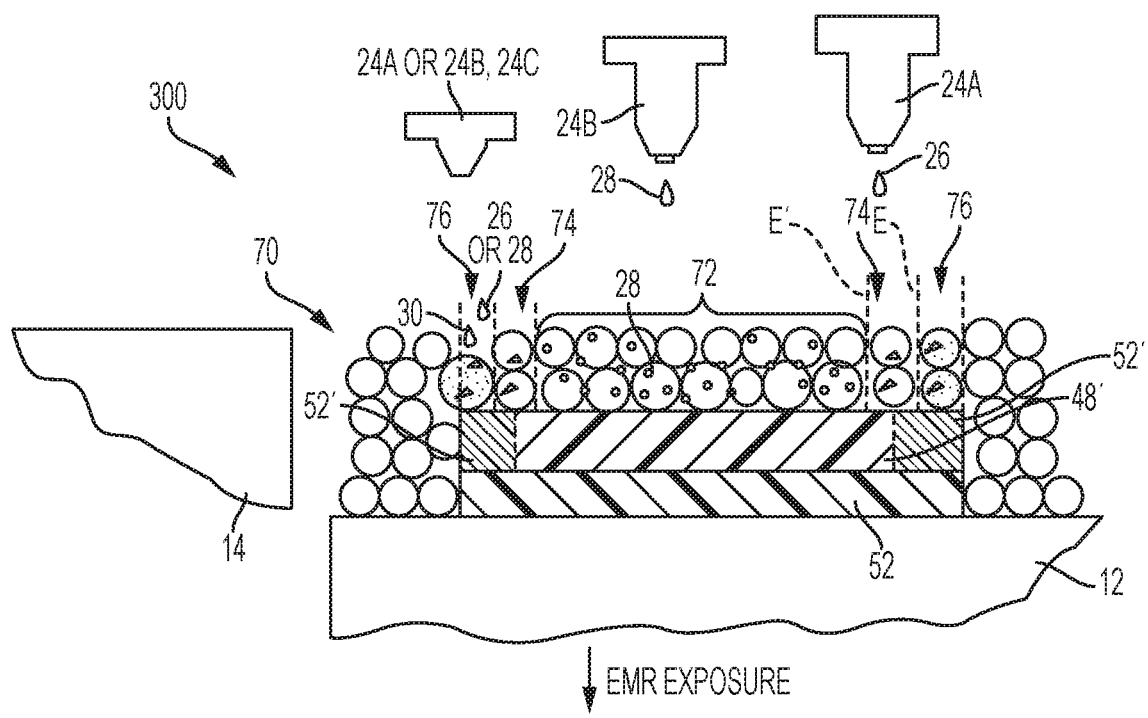
Figure 4E:
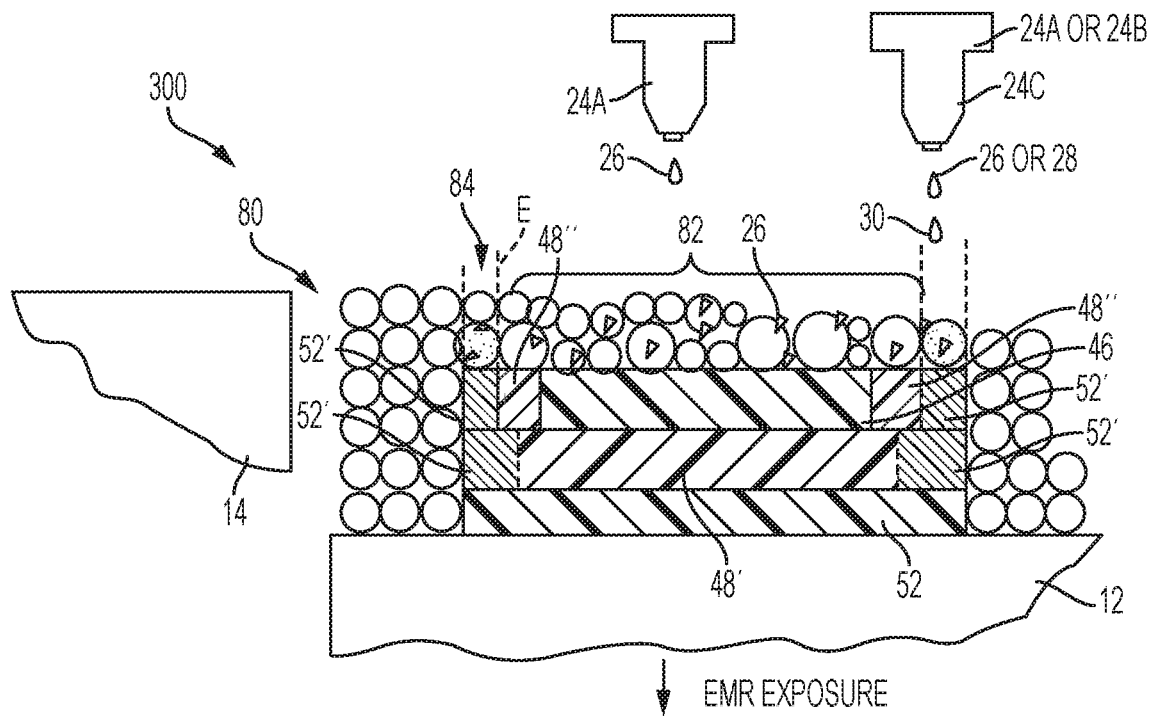
Figure 4F:
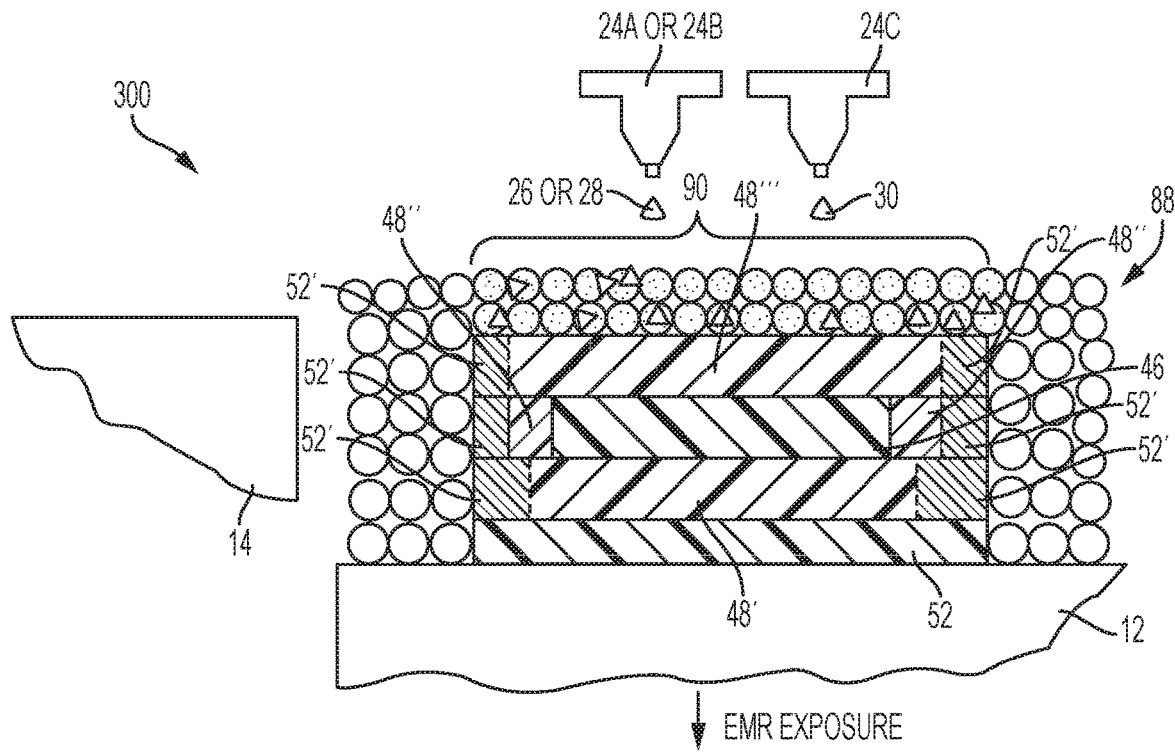
Figure 4G:
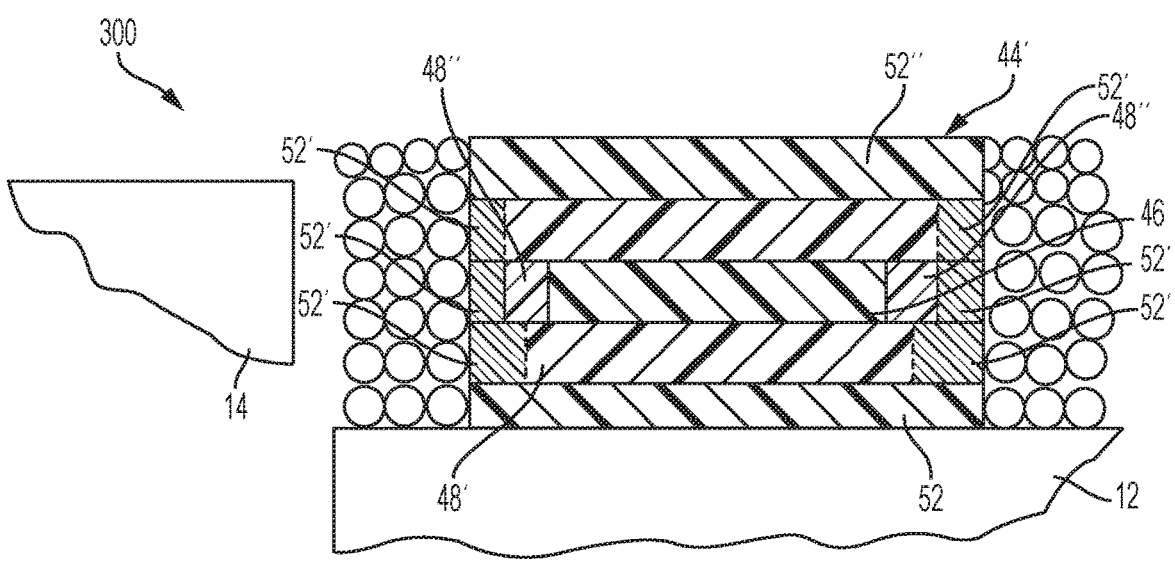

While a single colored layer 52 is shown, it is to be understood that several colored layers 52 may be sequentially formed in contact with one another so that a color region (thicker than one voxel) is built up around the core layer(s) 46 in the final object 44' (shown in FIG. 4G). The outermost colored layer 52 may form a one voxel deep shell, and the other colored layers may create the thicker color region. The levels of the primer fusing agent 26 and the coloring agent 30 may be higher in the outermost colored layer 52, compared to other colored layers positioned closer to the core layer(s) 46, in order to increase color saturation at the exterior of the formed object 44'.

FIG. 4C also illustrates yet another layer 62 of the treated build material composition 16, this time the layer 62 being applied to the colored layer 52 and to any non-coalesced/non-fused treated build material composition 16 of layer 58. The layer 62 may be applied in the same manner as the layer 58.

Prior to further processing, the layer 62 of the treated build material composition 16 may be exposed to pre-heating in the manner previously described.

After the layer 62 is formed, and in some instances is pre-heated, the primer fusing agent 26 is selectively applied on portion(s) 64 of the treated build material composition 16 in the layer 62. The portion(s) 64 of the layer 62 will form the primer layer 48', which is white, clear, or slightly tinted from the primer fusing agent 26. This primer layer 48' is positioned between the colored layer 52 and subsequently formed black core layer(s) 46 in the object 44' (see FIG. 4G). This primer layer 48' may be referred to as the initial layer or the first primer layer. The primer layer 48' optically isolates at least a portion of the black core layer(s) 46.

In the example shown in FIG. 4C, the portion 64 to which the primer fusing agent 26 is selectively applied is adjacent to part (but not all) of the already formed colored layer 52. Selectively applying the primer fusing agent 26 in this manner may be performed when it is desirable to form colored layer(s) 52' (shown in FIG. 4D) along the sides of the object 44' that is being formed. To form the colored layer(s) 52' along the sides of the object 44', the primer fusing agent 26 and the coloring agent 30 are selectively applied on other portion(s) 66 of the treated build material composition 16 in the layer 62. As an example, the portion(s) 66 may define the perimeter of that particular layer of the object 44' that is being formed, and may be outside of a perimeter or an edge boundary E (i.e., the outermost portions where the primer fusing agent 26 alone is selectively deposited in any build material layer) of the portion 64.

After the primer fusing agent 26 is applied on the portion(s) 64, and in some instances the primer fusing agent 26 and the coloring agent 30 are selectively applied on the portion(s) 66, the entire layer 62 of the treated build material composition 16 is exposed to electromagnetic radiation (shown as EMR Exposure between FIGS. 4C and 4D) in the manner previously described. Exposure to electromagnetic radiation forms the primer layer 48', as shown in FIG. 4D.

If the primer fusing agent 26 and the coloring agent 30 are selectively applied on the portion(s) 66, the EMR exposure will form colored layer(s) 52' at the outer edge(s). This exposure to electromagnetic radiation forms the colored layer(s) 52', as shown in FIG. 4D.

The width of the colored layer(s) 52' may be large enough to form the color region at this portion of the object 44'. The levels of the primer fusing agent 26, and the coloring agent 30 may be higher at the outermost edge of the colored layer(s) 52', compared to the innermost edge(s) of the colored layer(s) 52', in order to increase color saturation at the exterior of the formed object 44'.

FIG. 4D also illustrates yet another layer 70 of the treated build material composition 16, this time the layer 70 being applied to the primer layer 48', the colored layer(s) 52', and to any non-coalesced/non-fused treated build material composition 16 of layer 62. The layer 70 may be applied in the same manner as the layers 58, 62. In one example, the method 200 includes: applying a (first) layer 70 of the treated build material composition 16.

Prior to further processing, the layer 70 of the treated build material composition 16 may be exposed to pre-heating in the manner previously described.

After the layer 70 is formed, and in some instances is pre-heated, the core fusing agent 28 is selectively applied on portion(s) 72 of the treated build material composition 16 in the layer 70. In one example, the method 200 includes: based on a 3D object model, selectively applying a core fusing agent 28 on at least a portion 72 of the (first) layer 70, the core fusing agent 28 including an energy absorber having absorption at least at wavelengths ranging from 400 nm to 780 nm.

It is to be understood that the selective application of the core fusing agent 28 may be accomplished in a single printing pass or in multiple printing passes. In some examples, the selective application of the core fusing agent 28 is accomplished in a single printing pass. In an example of the methods 100, 200, 300, the flow of the core fusing agent 28 on the treated build material composition 16 may be faster than the flow of the same amount of the core fusing agent 28 on a non-treated (native) build material composition. In this example, the faster flow of the core fusing agent 28 may enable the core fusing agent 28 to be applied in a single printing pass. In some other examples, the selectively applying of the core fusing agent 28 is accomplished in multiple printing passes. In one of these examples, the core fusing agent 28 is selectively applied in a number of printing passes ranging from 2 to 4. In another of these examples, 2 printing passes or 4 printing passes are used. It may be desirable to apply the core fusing agent 28 in multiple printing passes to increase the amount of the energy absorber that is applied to the treated build material composition 16, to avoid liquid splashing, to avoid displacement of the treated build material composition 16, etc.

In an example of the methods 100, 200, 300, the penetration of the core fusing agent 28 into the treated build material composition 16 may be more uniform than the penetration of the core fusing agent 28 into a non-treated (native) build material composition. As such, the energy absorber of the core fusing agent 28, and thus, the energy absorption may be more uniform throughout the treated build material composition 16. In another example of the methods 100, 200, 300, the core fusing agent 28 may penetrate farther and/or faster into the treated build material composition 16 than the core fusing agent 28 penetrates into a non-treated build material composition. As such, the energy absorber of the core fusing agent 28, and thus, the energy absorption may penetrate farther into the treated build material composition 16.

The volume of the core fusing agent 28 that is applied per unit of the treated build material composition 16 in the patterned portion 72 may be sufficient to absorb and convert enough electromagnetic radiation so that the treated build material composition 16 in the patterned portion 72 will coalesce/fuse. The volume of the core fusing agent 28 that is applied per unit of the treated build material composition 16 may depend, at least in part, on the energy absorber used, the energy absorber loading in the core fusing agent 28, and the treated build material composition 16 used.

The portion(s) 72 of the layer 70 will form the core layer 46 (FIG. 4E), which may be black from the core fusing agent 28. While a single core layer 46 is shown, it is to be understood that several core layers 46 may be sequentially formed in contact with one another so that a core region (or part core) is built up, which makes up the bulk of the object 44'. Several core layers 46 may enhance the mechanical properties of the object 44'.

In the example shown in FIG. 4D, the portion 72 to which the core fusing agent 28 is selectively applied is adjacent to part (but not all) of the already formed primer layer 48'. Selectively applying the core fusing agent 28 in this manner may be performed when it is desirable to form colored layer(s) 52' (shown in FIG. 4E) along the sides of the object 44' that is being formed. Since the core layer 46 being formed may be black, it may also be desirable to form the primer layer 48" between the core layer 46 and the adjacent colored layer(s) 52'.

To form the primer layer 48" along the perimeter of the core layer 46, the primer fusing agent 26 is selectively applied on other (or second) portion(s) 74 of the treated build material composition 16 in the layer 70 that are immediately adjacent to the perimeter or edge boundary E' (i.e., the outermost portions where the core fusing agent 28 alone is selectively deposited in any build material layer) of the portion 72. The perimeter/edge boundary E' is thus defined by the core fusing agent 28. To form the colored layer(s) 52' along/adjacent to the perimeter of the primer layer 48", the primer fusing agent 26 and the coloring agent 30 are selectively applied on still other (or third) portion(s) 76 of the treated build material composition 16 in the layer 70 that are immediately adjacent to the perimeter or edge boundary E of the portion 74 (which is defined by the primer fusing agent 26).

After the layer 70 is patterned in a desirable manner with at least the core fusing agent 28, the entire layer 70 of the treated build material composition 16 is exposed to electromagnetic radiation (shown as EMR Exposure between FIGS. 4D and 4E) in the manner previously described, except that the wavelength range may be expanded to as low as 400 nm because some of the energy absorbers in the core fusing agent 28 can absorb visible light as well as infrared light. In one example, the method 200 includes: exposing the (first) layer 70 to electromagnetic radiation to fuse the treated build material composition 16 in the at least the portion 72 of the (first) layer 70 to form a core layer 46.

The core fusing agent 28 enhances the absorption of the radiation in portion 72, converts the absorbed radiation to thermal energy, and promotes the transfer of the thermal heat to the treated build material composition 16 in contact therewith. In an example, the core fusing agent 28 sufficiently elevates the temperature of the treated build material composition 16 in portion 72 to a temperature above the melting point of the treated semi-crystalline thermoplastic polymer, or within or above the melting range of the treated semi-crystalline thermoplastic polymer of the treated build material composition 16, allowing coalescing/fusing (e.g., thermal merging, melting, binding, etc.) of the treated build material composition 16 to take place. In example of the methods 100, 200, 300, vapor and/or gases evaporated from the core fusing agent 28 may degas from the treated build material composition 16 better than a non-treated (native) build material composition in the same conditions. Exposure to electromagnetic radiation forms the core layer 46, as shown in FIG. 4E.

If the primer fusing agent 26 is selectively applied on the portion(s) 74, and the primer fusing agent 26 and the coloring agent 30 are selectively applied on the portion(s) 76, the EMR exposure will also form primer layer(s) 48" and colored layer(s) 52' at the outer edge(s) of the core layer 46, as shown in FIG. 4E. The width of the primer layer(s) 48" may be large enough to optically isolate the black core layer 46.

FIG. 4E also illustrates yet another layer 80 of the treated build material composition 16, this time the layer 80 being applied to the core layer 46, the primer layer(s) 48''', the colored layer(s) 52', and to any non-coalesced/non-fused treated build material composition 16 of layer 70. The layer 80 may be applied in the same manner as the layers 58, 62, 70. In one example, the method 200 includes: applying a second layer 80 of the treated build material composition 16 on the core layer 46.

Prior to further processing, the layer 80 of the treated build material composition 16 may be exposed to pre-heating in the manner previously described.

After the layer 80 is formed, and in some instances is pre-heated, the primer fusing agent 26 is selectively applied on portion(s) 82 of the treated build material composition 16 in the layer 80. In one example, the method 200 includes: based on the 3D object model, selectively applying a primer fusing agent 26 on at least a portion 82 of the second layer 80, the primer fusing agent 26 including an energy absorber having absorption at wavelengths ranging from 800 nm to 4000 nm and having transparency at wavelengths ranging from 400 nm to 780 nm.

The portion(s) 82 of the layer 80 will form another primer layer 48'''', which is white or slightly tinted from the primer fusing agent 26. This primer layer 48'''' is positioned between the black core layer(s) 46 and subsequently formed colored layer(s) 52'' in the object 44' (see FIG. 4G). As such, the primer layer 48'''' optically isolates the black core layer(s) 46 at another end of the formed object 44'.

In the example shown in FIG. 4E, the portion 82 to which the primer fusing agent 26 is selectively applied is adjacent to the already formed core layer(s) 46 and primer layer(s) 48''. Selectively applying the primer fusing agent 26 in this manner may be performed when it is desirable to form colored layer(s) 52' (shown in FIG. 4F) along the sides of the object 44' that is being formed. To form the colored layer(s) 52' along the sides of the object 44', the primer fusing agent 26 and the coloring agent 30 are selectively applied on portion(s) 84 of the treated build material composition 16 in the layer 82. As an example, the portion(s) 84 may define the perimeter of that particular layer of the object 44' that is being formed, and may be outside of an edge boundary E of the portion 82.

After the primer fusing agent 26 is applied on the portion(s) 82, and in some instances the primer fusing agent 26 and the coloring agent 30, are selectively applied on the portion(s) 84, the entire layer 80 of the treated build material composition 16 is exposed to electromagnetic radiation (shown as EMR Exposure between FIGS. 4E and 4F) in the manner previously described. Exposure to electromagnetic radiation forms the primer layer 48'''', as shown in FIG. 4F. In one example, the method 200 includes: exposing the second layer 80 to electromagnetic radiation to fuse the treated build material composition 16 in the at least the portion 82 of the second layer 80 to form a primer layer 48''''.

If the primer fusing agent 26 and the coloring agent 30 are selectively applied on the portion(s) 84, the EMR exposure will form colored layer(s) 52' at the outer edge(s) of the primer layer 48''''. This exposure to electromagnetic radiation forms the colored layer(s) 52', as shown in FIG. 4F.

FIG. 4F also illustrates yet another layer 88 of the treated build material composition 16, this time the layer 88 being applied to the primer layer(s) 48'''' and the colored layer(s) 52' adjacent thereto, and to any non-coalesced/non-fused treated build material composition 16 of layer 80. The layer 88 may be applied in the same manner as the layers 58, 62, 70, 80.

Prior to further processing, the layer 88 of the treated build material composition 16 may be exposed to pre-heating in the manner previously described.

After the layer 88 is formed, and in some instances is pre-heated, the primer fusing agent 26 and the coloring agent 30 are selectively applied on the same portion(s) 90 of the treated build material composition 16 in the layer 88.

The primer fusing agent 26 and the coloring agent 30 are selectively applied in a pattern of a cross-section for the colored layer 52'' that is to be formed (shown in FIG. 4G). In the example shown in FIG. 4F, the portion 90 is adjacent to the primer layer 48'''' and the colored layer(s) 52' is adjacent to the primer layer 48''''.

When the desired color for the object 44' or a particular colored layer 52'' of the object 44' is the color of the coloring agent 30, the primer fusing agent 26 is applied with the coloring agent 30. Since the primer fusing agent 26 is clear or slightly tinted and the treated build material composition 16 is white, the color of the coloring agent 30 will be the color of the resulting colored layer 52'', as the colorants of the coloring agent 30 become embedded throughout the coalesced/fused build material composition of the colored layer 52''.

After the primer fusing agent 26 and the coloring agent 30 are selectively applied in the specific portion(s) 90 of the layer 88, the entire layer 88 of the treated build material composition 16 is exposed to electromagnetic radiation (shown as EMR Exposure between FIGS. 4F and 4G).

The electromagnetic radiation is emitted from the radiation source 38, 38' in the manner previously described, with wavelengths suitable for the primer fusing agent 26. Exposure to electromagnetic radiation forms the colored layer 52'', as shown in FIG. 4G, having colorants of the coloring agent 30 embedded therein.

While a single colored layer 52'' is shown, it is to be understood that several colored layers 52'' may be sequentially formed in contact with one another so that a color region (thicker than one voxel) is built up around the core layer(s) 46 in the final object 44'. The outermost colored layer 52'' may form a one voxel deep shell, and the other colored layers may create the thicker color region. The levels of the primer fusing agent 26 and the coloring agent 30 may be higher in the outermost colored layer 52'', compared to other colored layers positioned closer to the core layer(s) 46, in order to increase color saturation at the exterior of the formed object 44'.

Throughout the methods 100, 200, 300, the color of the coloring agent 30 that is applied will depend upon the desired color for the object 44' or at least the portion of the colored layer(s) 52, 52', 52'' to be formed. As examples, a black agent, a cyan agent, a magenta agent, or a yellow agent may be applied alone or in combination to achieve a variety of colors.

It is to be understood that the methods 100, 200, 300 may be modified so that the core fusing agent 28, rather than the primer fusing agent 26, is applied with the coloring agent 30 to form the colored layers 52, 52', 52''. The primer fusing agent 26 may be particularly suitable for obtaining lighter colors or white. When the desired color for colored layer 52 is a darker color or black, the core fusing agent 28 may be applied with the coloring agent 30.

It is to be further understood that the methods 100, 200, 300 may be modified so that the outer colored layers 52, 52', 52'' are not formed. In this modified form of the methods 100, 200, 300, the primer layer 48' would be formed first. In the resulting part, all of the primer layers 48', 48'', 48''' would be exposed/visible, and thus would form the exterior of the part. In this example, the primer layers 48', 48", 48'" would form an outer white layer which encapsulates the core layer(s) 46. When the methods 100, 200, 300 are modified in this manner, the part that is formed is white or slightly tinted (depending upon the color of the primer fusing agent 26).

Upon completion of the object 44', the object 44' may be cooled at a rate ranging from about greater than 0° C./minute to about 100° C./minute. In some examples, the object 44' is cooled at a rate ranging from about greater than 0° C./minute to about 40° C./minute. In some examples, the cooling of the object 44' may be accomplished by maintaining the object 44' in an environment having a temperature ranging from about 15° C. to 30° C. until the temperature of the 3D object 44' reaches the temperature of the environment.

The method 400 to form the object 44" will now be discussed in reference to FIGS. 5A through 5C. It is to be understood that the method 400 may be another example of the method 100.

In FIG. 5A, a layer 94 of the treated build material composition 16 is applied on the build area platform 12. The layer 94 may be applied in the same manner as described above.

The layer 94 of the treated build material composition 16 may be exposed to pre-heating in the manner described herein.

After the layer 94 is applied, and in some instances is pre-heated, the primer fusing agent 26 is selectively applied on portion(s) 96 of the treated build material composition 16 in the layer 94.

The portion(s) 96 of the layer 94 will form the first layer 98 of the 3D object 44" (FIG. 5C) being formed. As such, the primer fusing agent 26 is selectively dispensed on the layer 94 according to a pattern of a cross-section for the layer 98.

After the primer fusing agent 26 is applied on the portion(s) 96, the entire layer 94 of the treated build material composition 16 is exposed to electromagnetic radiation (shown as EMR Exposure between FIGS. 5A and 5B) in the manner previously described.

In this example, the primer fusing agent 26 sufficiently elevates the temperature of the treated build material composition 16 in portion 96 to a temperature above the melting point of the treated semi-crystalline thermoplastic polymer, or within or above the melting range of the treated semi-crystalline thermoplastic polymer of the treated build material composition 16, allowing coalescing/fusing (e.g., thermal merging, melting, binding, etc.) of the treated build material composition 16 to take place. Exposure to electromagnetic radiation forms the layer 98, as shown in FIG. 5B.

It is to be understood that portions of the treated build material composition 16 that do not have the primer fusing agent 26 applied thereto do not absorb enough energy to coalesce/fuse.

Figure 5C:
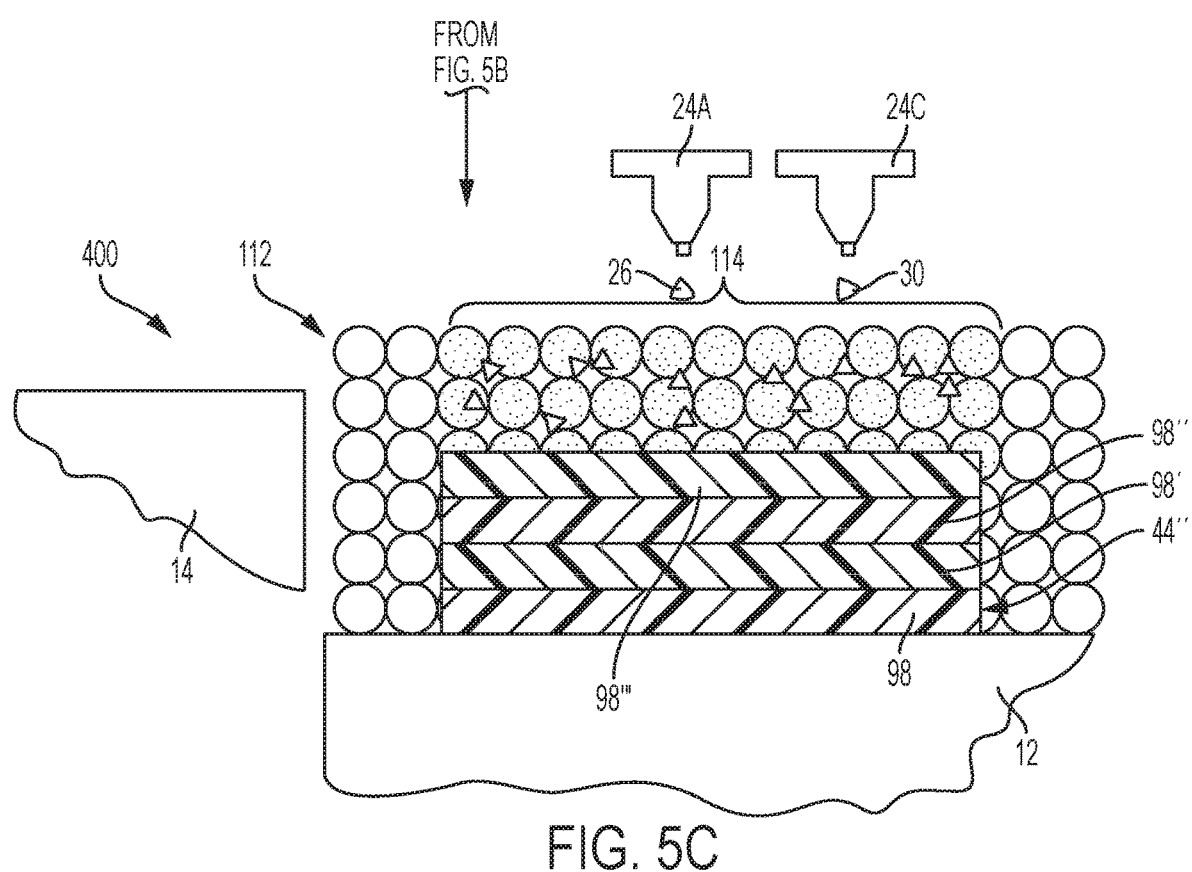

After the layer 98 is formed, additional layer(s) (e.g., 98', 98", 98'" shown in FIG. 5C) may be formed thereon to create an example of the 3D object 44" (shown in FIG. 5C). For example, to form the other layer 98', additional treated build material composition 16 may be applied on the layer 98. The primer fusing agent 26, is then selectively applied on at least a portion of the additional treated build material composition 16, according to a pattern of a cross-section for the layer (e.g., 98') which is being formed. After the primer fusing agent 26 is applied, the entire layer of the additional treated build material composition 16 is exposed to electromagnetic radiation in the manner previously described. The application of additional treated build material composition 16, the selective application of the primer fusing agent 26, and the electromagnetic radiation exposure may be repeated a predetermined number of cycles to form the object 44".

In the example shown in FIGS. 5A through 5C, color may be imparted to the entire object 44" by applying the coloring agent 30 with the primer fusing agent 26 in each of the portions of the respective build material layers that form layers 98, 98', 98", 98'".

The methods 100, 400 may end at the formation of object 44" or color may be imparted to the top surface of the object 44". This is shown in FIG. 5C.

To impart color, a final layer 112 of the treated build material composition 16 is applied to the object 44". As shown in FIG. 5C, this layer 112 is applied to the outermost layer 98'" of the object 44". Prior to further processing, the layer 112 may be exposed to pre-heating in the manner previously described.

After the layer 112 is formed, and in some instances is pre-heated, the primer fusing agent 26 and the coloring agent 30 are selectively applied on the same portion(s) 114 of the treated build material composition 16 in the layer 112. The primer fusing agent 26 and the coloring agent 30 are selectively applied in a pattern of a cross-section for the colored layer that is to be formed (not shown). The color of the coloring agent 30 that is applied will depend upon the desired color for the part.

After the primer fusing agent 26 and the coloring agent 30 are applied, the entire layer 112 of the treated build material composition 16 is exposed to electromagnetic radiation in the manner previously described. The primer fusing agent 26 sufficiently elevates the temperature of the treated build material composition 16 in the portion 114 of the layer 112 to a temperature above the melting point of the treated semi-crystalline thermoplastic polymer, or within or above the melting range of the treated semi-crystalline thermoplastic polymer of the treated build material composition 16, allowing coalescing/fusing (e.g., thermal merging, melting, binding, etc.) of the treated build material composition 16 (in contact with the primer fusing agent 26) to take place. Exposure to electromagnetic radiation forms the colored layer (not shown), having colorants of the coloring agent 30 embedded therein.

It is to be understood that several colored layers may be sequentially formed in contact with one another so that a color region (thicker than one voxel) is built up on the layers 98, 98', 98", 98'" in the final part. The outermost colored layer may form a one voxel deep shell, and the other colored layers may create the thicker color region. The levels of the primer fusing agent 26 and the coloring agent 30 may be higher in the outermost colored layer, as compared to other colored layers positioned closer to the layer 98'", in order to increase color saturation at the exterior of the formed object 44".

It is to be understood that the methods 100, 400 may also be modified similarly to the method 300 in order to form colored layers (e.g., 52 and 52') so that the part is completely encapsulated by colored layers.

Throughout the methods 100, 400, it is to be understood that vapor and/or gases evaporated from the primer fusing agent 26, coloring agent 30, detailing agent 42 and/or anti-coalescing agent 42' may degas from the treated build material composition 16 better than a non-treated (native) build material composition in the same conditions.

Upon completion of the object 44", the object 44" is cooled at a rate ranging from about greater than 0° C./minute to about 100° C./minute. In some examples, the object 44" is cooled at a rate ranging from about greater than 0°

C./minute to about 40° C./minute. The cooling of the object 44' may be accomplished in the manner described above.

Another example method 500 to form a 3D object will now be discussed in reference to FIGS. 6A and 6B. It is to be understood that the method 500 may be another example of the method 100.

In FIG. 6A, a layer 95 of the treated build material composition 16 is applied on the build area platform 12. The layer 95 may be applied in the same manner as described above.

The layer 95 of the treated build material composition 16 may be exposed to pre-heating in the manner described herein.

After the layer 95 is applied, and in some instances is pre-heated, the core fusing agent 28 is selectively applied on portion(s) 97 of the treated build material composition 16 in the layer 95. The portion(s) 97 of the layer 95 will form the first layer 99 of the 3D object being formed (not shown). As such, the core fusing agent 28 is selectively dispensed on the layer 95 according to a pattern of a cross-section for the layer 99.

After the core fusing agent 28 is applied on the portion(s) 97, the entire layer 95 of the treated build material composition 16 is exposed to electromagnetic radiation (shown as EMR Exposure between FIGS. 6A and 6B) in the manner previously described.

In this example, the core fusing agent 28 sufficiently elevates the temperature of the treated build material composition 16 in portion 97 to a temperature above the melting point of the treated semi-crystalline thermoplastic polymer, or within or above the melting range of the treated semi-crystalline thermoplastic polymer of the treated build material composition 16, allowing coalescing/fusing (e.g., thermal merging, melting, binding, etc.) of the treated build material composition 16 to take place. Exposure to electromagnetic radiation forms the layer 99, as shown in FIG. 6B.

It is to be understood that portions of the treated build material composition 16 that do not have the core fusing agent 28 applied thereto do not absorb enough energy to coalesce/fuse.

After the layer 99 is formed, additional layer(s) may be formed thereon to create an example of the 3D object. For example, to form another layer, additional treated build material composition 16 may be applied on the layer 99. The core fusing agent 28 is then selectively applied on at least a portion of the additional treated build material composition 16, according to a pattern of a cross-section for the layer which is being formed. After the core fusing agent 28 is applied, the entire layer of the additional treated build material composition 16 is exposed to electromagnetic radiation in the manner previously described. The application of additional treated build material composition 16, the selective application of the core fusing agent 28, and the electromagnetic radiation exposure may be repeated a predetermined number of cycles to form the part.

In the example shown in FIGS. 6A and 6B, color may be imparted to the entire object by applying the coloring agent 30 with the core fusing agent 28 in each of the portions of the respective build material layers that form layers of the part.

It is to be understood that the methods 100, 500 may also be modified similarly to the method 300 in order to form colored layers (e.g., 52, 52', 52") so that the part is completely encapsulated by colored layers.

In the methods 100, 500, it is to be understood that vapor and/or gases evaporated from the core fusing agent 28 may degas from the treated build material composition 16 better than a non-treated (native) build material composition in the same conditions.

Upon completion of the object, the object is cooled at a rate ranging from about greater than 0° C./minute to about 100° C./minute. In some examples, the object is cooled at a rate ranging from about greater than 0° C./minute to about 40° C./minute. The cooling of the object may be accomplished in the manner described above.

In any of the examples disclosed herein, when the 3D object 44, 44', 44" is complete, it may be removed from the build material platform 12, and any non-coalesced/non-fused treated build material composition 16 may be removed from the 3D object 44, 44', 44".

In any of the methods 100, 200, 300, 400, 500 disclosed herein, the non-patterned and non-coalesced/non-fused treated build material composition 16 may be reclaimed to be reused as build material in the printing of another 3D object. In some examples, the methods 100, 200, 300, 400, 500 may be accomplished in an air environment. As used herein, an "air environment" or an "environment containing air" refers to an environment that contains 20 vol % or more of oxygen.

Still further, in any of the methods 100, 200, 300, 400, 500 disclosed herein, the treated build material composition 16 that are not patterned with the fusing agent 26, 28 (and thus do not become part of the 3D object) may be negatively patterned with the anti-coalescing agent 42'. The anti-coalescing agent 42' has enhanced wettability on the treated build material composition 16, and thus a polymeric coating is able to form on the surfaces of the treated build material composition 16 and is present in at least some of the voids between the treated build material composition 16. The polymeric coating prevents the fusing or melting of the treated build material composition 16 to which it is applied, and forms a removal object adjacent to the formed 3D object. The removable object may be removed from the final 3D object by any suitable means, including lifting the final 3D object from the removable object. In some examples, the removable object may be broken into pieces and removed piecewise from the final 3D object. In some other examples, a removal tool may be used. In still other examples, the removable object may be removed from the final 3D object using a wet or a dry removal process. In an example, the wet removal process may include spraying the removable object with water or another liquid using wet removal tool(s), such as a hose and a sprayer, a spray gun, etc. In other examples, the wet removal process may include sonicating the removable object in a water bath or soaking the removable object in water or another liquid. In some examples, dry removal of the removable 46 from the final 3D object may be used. As an example, the removable object may be removed from the final 3D object by suction from a vacuum hose. Pieces of the removable object that remain in contact with the final 3D object may be removed by light bead blasting or cleaning with a brush and/or an air jet.

As a result of any of the methods 100, 200, 300, 400, 500, a three-dimensional printed article (or object 44, 44', 44") may be formed which includes a coalesced semi-crystalline thermoplastic polymer having an average crystal size ranging from about 2 μm to about 10 μm.

Still further, in any of the methods 100, 200, 300, 400, 500 disclosed herein, different shaped objects may be printed in different orientations within the printing system 10. As such, while the object 44, 44', 44" may be printed from the bottom of the object 44, 44', 44" to the top of the object 44, 44', 44", it may alternatively be printed starting with the top of the object 44, 44', 44" to the bottom of the object 44, 44', 44", or from a side of the object 44, 44', 44" to another side of the object, 44, 44', 44", or at any other orientation that is suitable or desired for the particular geometry of the part being formed. Moreover, the fusing agent(s) 26, 28 used for any particular layer or portion of a layer may depend, in part, on desired strength characteristics and/or aesthetics of the particular layer being formed.

Printing System

Referring now to FIG. 7, an example of a 3D printing system 10 is schematically depicted. It is to be understood that the 3D printing system 10 may include additional components (some of which are described herein) and that some of the components described herein may be removed and/or modified. Furthermore, components of the 3D printing system 10 depicted in FIG. 7 may not be drawn to scale and thus, the 3D printing system 10 may have a different size and/or configuration other than as shown therein.

In an example, the three-dimensional (3D) printing system 10, comprises: a supply 14 of a build material composition 16 including a semi-crystalline thermoplastic polymer having a surface energy density greater than 41 mN/m; a build material distributor 18; a supply of a fusing agent 26, 28; a first applicator 24A, 24B for selectively dispensing the fusing agent 26, 28; a source 38, 38' of electromagnetic radiation; a controller 36; and a non-transitory computer readable medium having stored thereon computer executable instructions to cause the controller 36 to: utilize the build material distributor 18 to dispense the build material composition 16; utilize the first applicator 24A, 24B to selectively dispense the fusing agent 26, 28 on at least a portion of the build material composition 16; and utilize the source 38, 38' of electromagnetic radiation to expose the build material composition 16 to radiation to coalesce/fuse the at least the portion of the build material composition 16.

Any example of the build material composition 16 (including the surface treated polymer) described above may be used in the examples of the system 10.

In some examples, the 3D printing system 10 may further include a supply of another fusing agent 26, 28; and another applicator 24A, 24B for selectively dispensing the other fusing agent 26, 28. In these examples, the computer executable instructions may further cause the controller 36 to utilize the other applicator 24A, 24B to selectively dispense the other fusing agent 26, 28.

In some other examples, the 3D printing system 10 may further include a supply of a coloring agent 30; and another applicator 24C for selectively dispensing the coloring agent 30. In these examples, the computer executable instructions may further cause the controller 36 to utilize the other applicator 24C to selectively dispense the coloring agent 30.

While not shown in FIG. 7, in still some other examples, the 3D printing system 10 may further include a supply of a detailing agent 42 and/or an anti-coalescing agent 42'; and another applicator for selectively dispensing the detailing agent 42 and/or an anti-coalescing agent 42'. In these examples, the computer executable instructions may further cause the controller 36 to utilize the other applicator to selectively dispense the detailing agent 42 and/or an anti-coalescing agent 42'.

As shown in FIG. 7, the printing system 10 includes the build area platform 12, the build material supply 14 containing the build material composition 16 including the high surface energy density semi-crystalline thermoplastic polymer disclosed herein, and the build material distributor 18.

As mentioned above, the build area platform 12 receives the build material composition 16 from the build material supply 14. The build area platform 12 may be integrated with the printing system 10 or may be a component that is separately insertable into the printing system 10. For example, the build area platform 12 may be a module that is available separately from the printing system 10. The build material platform 12 that is shown is one example, and could be replaced with another support member, such as a platen, a fabrication/print bed, a glass plate, or another build surface.

As also mentioned above, the build material supply 14 may be a container, bed, or other surface that is to position the build material composition 16 between the build material distributor 18 and the build area platform 12. In some examples, the build material supply 14 may include a surface upon which the build material composition 16 may be supplied, for instance, from a build material source (not shown) located above the build material supply 14. Examples of the build material source may include a hopper, an auger conveyer, or the like. Additionally, or alternatively, the build material supply 14 may include a mechanism (e.g., a delivery piston) to provide, e.g., move, the build material composition 16 from a storage location to a position to be spread onto the build area platform 12 or onto a previously formed layer of the 3D object. Another example of the mechanism for moving the build material composition 16 is a pneumatic conveying system.

As also mentioned above, the build material distributor 18 may be a blade (e.g., a doctor blade), a roller, a combination of a roller and a blade, and/or any other device capable of spreading the build material composition 16 over the build area platform 12 (e.g., a counter-rotating roller).

As shown in FIG. 7, the printing system 10 may include the applicator 24A, which may contain the fusing agent 26. As also shown, the printing system 10 may further include the applicator 24B, which may contain the fusing agent 28, and/or the applicator 24C, which may contain the coloring agent 30. While not shown, the printing system 10 may further include other applicators (which may contain the detailing agent 42 and/or an anti-coalescing agent 42').

The applicator(s) 24A, 24B, 24C may be scanned across the build area platform 12 in the directions indicated by the arrow 32, e.g., along the y-axis. The applicator(s) 24A, 24B, 24C may be, for instance, a thermal inkjet printhead, a piezoelectric printhead, a continuous inkjet printhead, etc., and may extend a width of the build area platform 12. While the each applicator 24A, 24B, 24C is shown in FIG. 7 as a single applicator, it is to be understood that each applicator 24A, 24B, 24C may include multiple applicators that span the width of the build area platform 12. Additionally, the applicators 24A, 24B, 24C may be positioned in multiple printbars. The applicator(s) 24A, 24B, 24C may also be scanned along the x-axis, for instance, in configurations in which the applicator(s) 24A, 24B, 24C do/does not span the width of the build area platform 12 to enable the applicator(s) 24A, 24B, 24C to deposit the respective agents 26, 28, 30, 42, 42' over a large area of the build material composition 16. The applicator(s) 24A, 24B, 24C may thus be attached to a moving XY stage or a translational carriage (neither of which is shown) that moves the applicator(s) 24A, 24B, 24C adjacent to the build area platform 12 in order to deposit the respective agents 26, 28, 30, 42, 42' in predetermined areas of the build material layer(s) that has/have been formed on the build area platform 12 in accordance with the methods 100, 200, 300, 400, 500 disclosed herein. The applicator(s) 24A, 24B, 24C may include a plurality of nozzles (not shown) through which the respective agents 26, 28, 30, 42, 42' are to be ejected.

The applicator(s) 24A, 24B, 24C may deliver drops of the respective agents 26, 28, 30, 42, 42' at a resolution ranging from about 300 dots per inch (DPI) to about 1200 DPI. In other examples, the applicator(s) 24A, 24B, 24C may deliver drops of the respective agents 26, 28, 30, 42, 42' at a higher or lower resolution. The drop velocity may range from about 10 m/s to about 24 m/s and the firing frequency may range from about 1 kHz to about 48 kHz. In one example, the volume of each drop may be on the order of about 3 picoliters (pL) to about 18 pL, although it is contemplated that a higher or lower drop volume may be used. In some examples, the applicator(s) 24A, 24B, 24C is/are able to deliver variable drop volumes of the respective agents 26, 28, 30, 42, 42'. One example of a suitable printhead has 600 DPI resolution and can deliver drop volumes ranging from about 6 pL to about 14 pL.

Each of the previously described physical elements may be operatively connected to a controller 36 of the printing system 10. The controller 36 may process print data that is based on a 3D object model of the 3D object/part to be generated. In response to data processing, the controller 36 may control the operations of the build area platform 12, the build material supply 14, the build material distributor 18, and the applicator(s) 24A, 24B, 24C. As an example, the controller 36 may control actuators (not shown) to control various operations of the 3D printing system 10 components. The controller 36 may be a computing device, a semiconductor-based microprocessor, a central processing unit (CPU), an application specific integrated circuit (ASIC), and/or another hardware device. Although not shown, the controller 36 may be connected to the 3D printing system 10 components via communication lines.

The controller 36 manipulates and transforms data, which may be represented as physical (electronic) quantities within the printer's registers and memories, in order to control the physical elements to create the 3D object. As such, the controller 36 is depicted as being in communication with a data store 34. The data store 34 may include data pertaining to a 3D object to be printed by the 3D printing system 10. The data for the selective delivery of the build material composition 16, the fusing agent 26, 28, etc. may be derived from a model of the 3D object to be formed. For instance, the data may include the locations on each build material layer that the first applicator 24A, 24B is to deposit the fusing agent 26, 28. In one example, the controller 36 may use the data to control the first applicator 24A, 24B to selectively apply the fusing agent 26, 28. The data store 34 may also include machine readable instructions (stored on a non-transitory computer readable medium) that are to cause the controller 36 to control the amount of build material composition 16 that is supplied by the build material supply 14, the movement of the build area platform 12, the movement of the build material distributor 18, the movement of the applicator(s) 24A, 24B, 24C, etc.

As shown in FIG. 7, the printing system 10 may also include a source 38, 38' of electromagnetic radiation. In some examples, the source 38 of electromagnetic radiation may be in a fixed position with respect to the build material platform 12. The source 38 in the fixed position may be a conductive heater or a radiative heater that is part of the printing system 10. These types of heaters may be placed below the build area platform 12 (e.g., conductive heating from below the platform 12) or may be placed above the build area platform 12 (e.g., radiative heating of the build material layer surface). In other examples, the source 38' of electromagnetic radiation may be positioned to apply radiation to the build material composition 16 immediately after the fusing agent 26, 28 has been applied thereto. In the example shown in FIG. 7, the source 38' of electromagnetic radiation is attached to the side of the applicators 24A, 24B, 24C which allows for patterning and heating/exposing to radiation in a single pass.

The source 38, 38' of electromagnetic radiation may emit radiation having wavelengths ranging from about 400 nm to about 4000 nm. As one example, the electromagnetic radiation may range from about 800 nm to about 1400 nm. As another example, the electromagnetic radiation may range from about 400 nm to about 1200 nm. As still another example, the electromagnetic radiation may be blackbody radiation with a maximum intensity at a wavelength of about 1100 nm. The source 38, 38' of electromagnetic radiation may be infrared (IR) or near-infrared light sources, such as IR or near-IR curing lamps, IR or near-IR light emitting diodes (LED), or lasers with the desirable IR or near-IR electromagnetic wavelengths.

The source 38, 38' of electromagnetic radiation may be operatively connected to a lamp/laser driver, an input/output temperature controller, and temperature sensors, which are collectively shown as radiation system components 40. The radiation system components 40 may operate together to control the source 38, 38' of electromagnetic radiation. The temperature recipe (e.g., radiation exposure rate) may be submitted to the input/output temperature controller. During heating, the temperature sensors may sense the temperature of the build material composition 16, and the temperature measurements may be transmitted to the input/output temperature controller. For example, a thermometer associated with the heated area can provide temperature feedback. The input/output temperature controller may adjust the source 38, 38' of electromagnetic radiation power set points based on any difference between the recipe and the real-time measurements. These power set points are sent to the lamp/laser drivers, which transmit appropriate lamp/laser voltages to the source 38, 38' of electromagnetic radiation. This is one example of the radiation system components 40, and it is to be understood that other radiation source control systems may be used. For example, the controller 36 may be configured to control the source 38, 38' of electromagnetic radiation.

While not shown, some examples of the printing system 10 may also include a plasma- or solution-treatment station. In an example, the build material supply 14 may be mobile, and may be moved into the plasma- or solution-treatment station. The plasma-treatment station may include controllers and a plasma chamber to pre-treat the native semi-crystalline thermoplastic polymers prior to printing. The solution treatment station may include a bath for treating the powder with a desirable solution.

Also while not shown, the printing system 10 may also include a cooling system. In an example, the build area platform 12 may be mobile, and may be moved into the cooling system. The cooling system may include controllers and a cooling mechanism to achieve cooling of the 3D object at the desirable cooling rate.

To further illustrate the present disclosure, examples are given herein. It is to be understood that these examples are provided for illustrative purposes and are not to be construed as limiting the scope of the present disclosure.

EXAMPLES

Example 1

Four examples of the build material composition disclosed herein were prepared. A comparative example of the build material composition was also prepared. Each build material composition (example and comparative) included a polyamide 12 (VESTOSINT® Z2723 available from Evonik Industries). The polyamide 12 had a melting point within the range of from 184° C. to 187° C., a D50 particle size (i.e., the median of the particle size distribution, where ½ the population is above this value and ½ is below this value) of 55 µm, and a bulk density of about 450 g/L. Each build material composition included less than 5 wt % of additives (i.e., antioxidant(s), whitener(s), antistatic agent(s), and flow aid(s)).

Each example build material composition was treated with an oxygen plasma (i.e., the plasma treating involved oxygen gas) in a laboratory plasma system. The first example build material composition was treated with the oxygen plasma for about 3 minutes; the second example build material composition was treated with the oxygen plasma for about 40 minutes; the third example build material composition was treated with the oxygen plasma for about 60 minutes; and the fourth example build material composition was treated with the oxygen plasma for about 80 minutes.

The comparative build material composition was not treated with the oxygen plasma.

Surface Energy Density and Contribution to Surface Energy Density by Polar Elements The surface energy density of each of the example build material compositions (including the plasma treated PA polymers) was measured, and the surface energy density of the comparative build material composition (including the non-treated comparative PA polymer) was measured. The contribution to the surface energy density by polar elements was also measured for each of the example build material compositions and the comparative build material composition.

Figure 8:
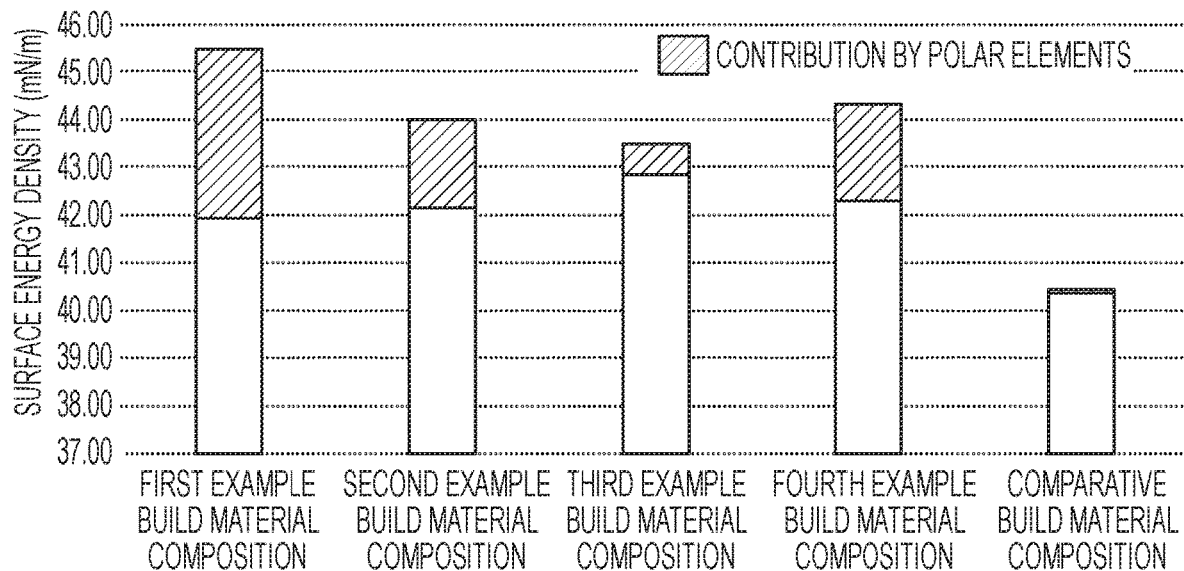
FIG. 8 is a graph showing the total surface energy density, and the contribution by polar elements to the total surface energy density, of example build material compositions and a comparative build material composition, with the surface energy density (in mN/m) shown on the y-axis, and the build material composition identified on the x-axis.

The surface energy density of each build material composition is shown in FIG. 8. In FIG. 8, the surface energy density (in mN/m) is shown on the y-axis, and the build material composition is identified on the x-axis. As illustrated, the plasma treatment resulted in the example build material compositions having surface energy densities greater than the surface energy density of the comparative (non-treated) build material composition.

The contribution to the surface energy density by polar elements is also identified for each build material composition in FIG. 8. As illustrated, regardless of the duration of the plasma treatment, the plasma treated increased the polar element contribution to surface energy density relative to the non-treated comparative example. The remainder of the surface energy may be the contribution of dispersive elements.

Bulk Density after Full Tapped Consolidation

The bulk density of the third example build material (plasma treated for 60 minutes) and the comparative example build material was measured. The build materials were then exposed to a tap density test, and the bulk density was measured throughout the test and after full tapped consolidation. More particularly, for each of the third example build material composition and the comparative build material composition, full tapped consolidation was achieved similarly to the example set forth herein, and a compaction curve was generated.

Figure 10:
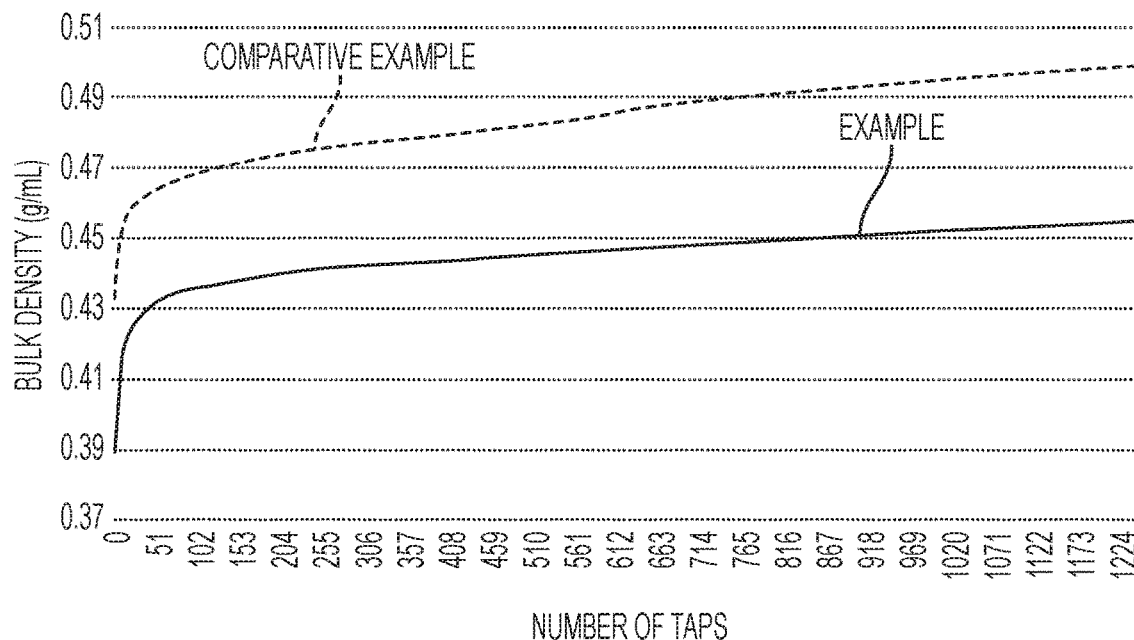
FIG. 10 shows a compaction curve of the one of the example build material compositions (labeled "EXAMPLE") and a compaction curve of the comparative build material composition (labeled "COMPARATIVE EXAMPLE"), with the bulk density (in g/mL) shown on the y-axis, and the number of taps shown on the x-axis.

The compaction curve of the third example build material composition (labeled "EXAMPLE") and the compaction curve of the comparative build material composition (labeled "COMPARATIVE EXAMPLE") are each shown in FIG. 10. In FIG. 10, the bulk density (in g/mL) is shown on the y-axis, and the number of taps is shown on the x-axis. The bulk density after full tapped consolidation of each of the third example build material composition and the comparative build material composition was determined from the respective compaction curves. The bulk density after full tapped consolidation of the third example build material composition was about 0.455 g/mL. The bulk density after full tapped consolidation of the comparative build material composition was about 0.5 g/mL. As shown in FIG. 10, throughout consolidation and after full tapped consolidation, the bulk density the third example build material composition was less than the bulk density of the comparative build material composition.

As the particle size of the third example build material composition was the same as the particle size of the comparative build material composition, the lower bulk density of the third example build material composition indicates that the third example build material composition had a larger average void volume than the comparative build material composition. As such, these results indicate that the flow and/or penetration of liquids applied on the third example build material composition was improved (as compared to the flow and/or penetration of liquids on the comparative build material composition). Further, these results indicate that the third example build material composition had improved degassing of vapor and/or gases (as compared to the degassing of vapor and/or gases of the comparative build material composition).

Printed Part Attributes

Several example 3D objects were printed with the third example build material (plasma treated for 60 minutes) using examples of the 3D printing methods disclosed herein. Several comparative 3D objects were also printed with the comparative build material composition. Each 3D object was printed on a large format 3D printer with an example fusing agent that included carbon black as the energy absorber. The fusing agent was not modified for the various build materials.

Figure 9A:
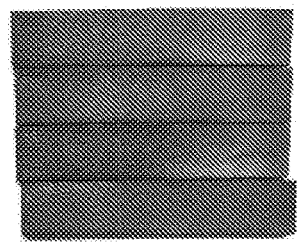
FIGS. 9A and 9B are black and white images of example 3D objects formed from one of the example build material compositions (FIG. 9A) and comparative 3D objects formed from the comparative build material composition (FIG. 9B)
Figure 9B:
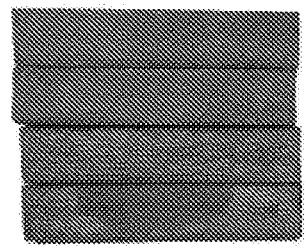

The example 3D objects formed from the third example build material composition are shown in FIG. 9A, and the comparative 3D objects formed from the comparative build material composition are shown in FIG. 9B. The objects shown in FIGS. 9A and 9B were built in the Z-direction, and the figures illustrate the Y-plane of the 3D objects.

As shown in FIGS. 9A and 9B, the example 3D objects had improved surface finish quality and reduced mechanical distortion as compared to the comparative 3D objects. The example 3D objects (FIG. 9A) did not have wrinkles on their surface (surface buckling), and the comparative 3D objects (FIG. 9B) did have wrinkles on their surface. These results further indicate that the third example build material composition had better coalescence than the comparative build material composition printed at the same conditions.

Further, each of the example 3D objects formed from the third example build material composition was sufficiently fused/coalesced. The non-patterned build material adjacent to each of the example 3D objects was able to be removed and separated from the completed example 3D object. Thus, the third example build material composition was shown to be a suitable build material composition for the 3D printing methods disclosed herein.

Penetration

The horizontal penetration length of a liquid (i.e., the horizontal distance that the liquid migrated from where the liquid was applied) was measured for each of the example build material compositions and the comparative build material composition. More particularly, microfluidic flow cells (available from Ibidi) were packed with each of the build material compositions. Four microfluidic flow cells were prepared for each build material composition. During the packing of each flow cell, the flow cell was tapped five times to achieve a bulk density of about 0.48 mg/L. Each microfluidic flow cell had a channel with a 50 mm length, a 5 mm width, and a 0.8 mm depth. As such, the thickness of the layers of build material composition formed in the microfluidic flow cells was 0.8 mm (i.e., 800 µm).

Each flow cell was illuminated with ultraviolet (UV) light, and 100 µL of a liquid, including about 1.0 wt % of fluorescein, was added to each microchannel. The flow event was recorded during the 2 minutes after the liquid was added to the microchannel. The fluorescein in the liquid improved the visualization of the flow of the liquid. The liquid (including the fluorescein) had a pH of 8.03, a conductivity of 515 mS/cm, a viscosity of 2.22 cP, a surface tension of 30.2 mN/m, a density of 1.035882 g/cm$^3$, and a velocity of sound of 1633.16 m/s.

Figure 11:
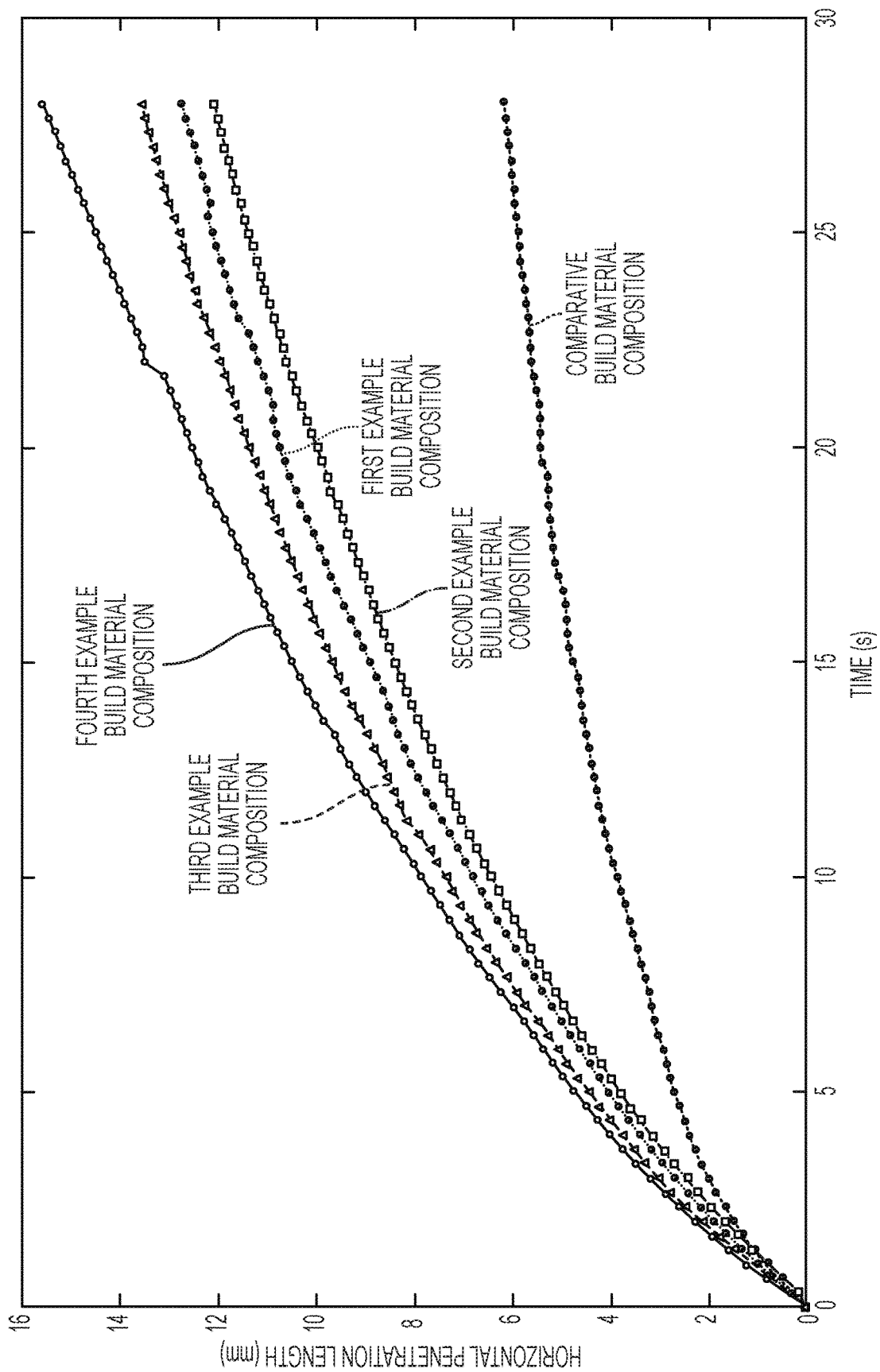
FIG. 11 is a graph of the horizontal penetration length of a liquid on the example build material compositions and the comparative build material composition as a function of time, with horizontal penetration length (in mm) shown on the y-axis and time (in seconds (s)) shown on the x-axis.

The horizontal penetration length of the liquid for each build material composition as a function of time for the 27.8 seconds after the liquid was added is shown in FIG. 11. The results for each individual build material illustrate the average of the four tests. In FIG. 11, the horizontal penetration length (in mm) is shown on the y-axis, and the amount of time after the liquid was added (in seconds, s) is shown on the x-axis. The flow events shown in FIG. 11 are identified by the build material composition used.

As illustrated in FIG. 11, the liquid penetrated farther into the example build material compositions than the liquid penetrated into the comparative build material composition. As also illustrated in FIG. 11, the liquid penetrated faster into the example build material compositions than the liquid penetrated into the comparative build material composition. These results indicate that the penetration of liquids applied on the example build material compositions was improved (as compared to the penetration of liquids on the non-treated comparative build material composition).

Example 2

Additionally, example build material compositions and a comparative build material composition including a polyamide 12-TiO$_2$ (VESTOSINT® Z2744 available from Evonik Industries) were prepared. Each build material composition included a polyamide 12 (with a melting point within the range of from 184° C. to 187° C., a D50 particle size of 55 µm, and a bulk density of 450 g/L) and titanium dioxide in an amount of about 3 wt %. Each build material composition also included less than 5 wt % of additives (i.e., antioxidant(s), whitener(s), antistatic agent(s), and flow aid (s)). It is to be understood that the titanium dioxide included in the example build material compositions was not part of the less than 5 wt % of additives.

Each example build material composition was treated with an oxygen plasma (i.e., the plasma treating involved oxygen gas) in a laboratory plasma system. The comparative build material composition was not treated.

The surface energy density, the contribution to the surface energy density by polar elements, the bulk density after full tapped consolidation, and the liquid penetration of the build material compositions including the polyamide 12-TiO$_2$ were analyzed similar to the manner described in reference to the build material compositions including the polyamide 12 in Example 1. The results of this analysis were similar to the results disclosed herein for the build material compositions including the polyamide 12. As such, the conclusions drawn herein for build material compositions including the polyamide 12 are equally applicable to the build material compositions including the polyamide 12-TiO$_2$.

Example 3

The polyamide 12 build material described in Example 1 was subjected to oxygen plasma treatment for 60 minutes, and was used as an example powder. The polyamide 12 build material described in Example 1 was used as is (i.e., was not treated), and was used as a comparative powder.

Figure 12:
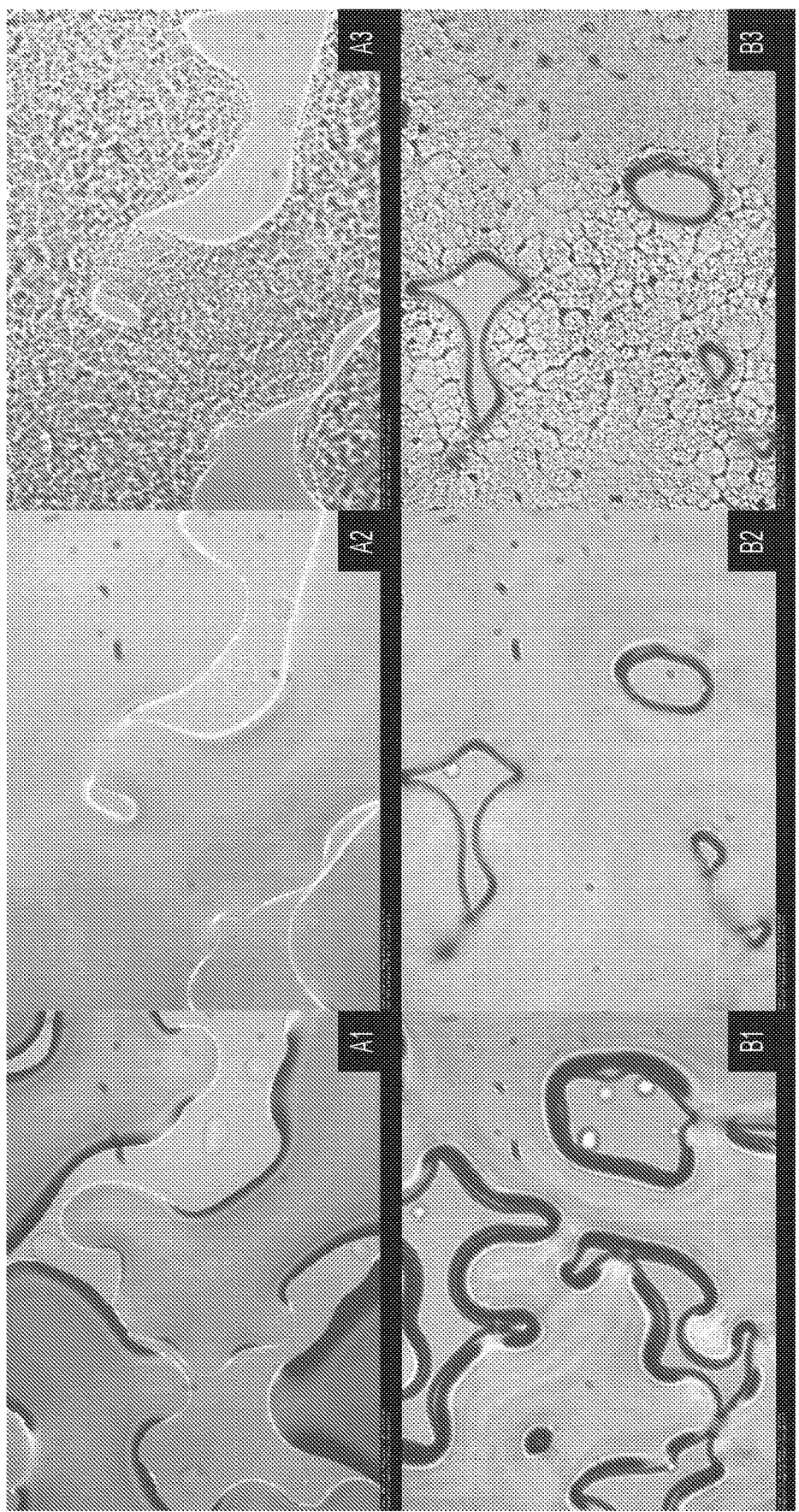
FIG. 12 depicts black and white versions of originally colored scanning electron micrograph (SEM) images showing an example build material at full melt (A1), at the onset of crystallization (A2), and at full crystallization (A3), and showing a comparative example build material at full melt (B1), at the onset of crystallization (B2), and at full crystallization (B3).

Each of the example and the comparative example powders were spread on a microscope slide and analyzed with a QIcam Fast 1394 color camera on a Linkam LTS 350 heated stage. The powders were melted at 210° C. FIG. 12 illustrates the example (plasma treated) powder at full melt at A1 and the comparative example (non-treated) powder at full melt at B1. The crystallization of the powders was observed. The time to the onset of crystallization for the example (plasma treated) powder was 300 seconds, and the time to the onset of crystallization for the comparative example (non-treated) powder was 286 seconds. FIG. 12 illustrates the example (plasma treated) powder at the onset of crystallization at A2 and the comparative example (non-treated) powder at the onset of crystallization at B2. The time from the onset of crystallization to full crystallization for the example (plasma treated) powder was 60 seconds, and the time from the onset of crystallization to full crystallization for the comparative example (non-treated) powder was 100 seconds. FIG. 12 illustrates the example (plasma treated) powder at full crystallization at A3 and the comparative example (non-treated) powder at full crystallization at B3.

The crystallization rate from A2 to A3 was almost a 2-time (2×) reduction compared with the crystallization rate from B2 to B3, and the overall crystallization rate (from melt to full crystallization) was reduced for the example (plasma treated) powder compared to the comparative example powder.

The average crystal (spherulite) size for the example (plasma treated) powder at full crystallization and the comparative example (non-treated) powder at full crystallization were estimated from the images in FIG. 12, A3 and B3. The average crystal sizes for the example (plasma treated) powder at full crystallization ranged from about 2 µm to about 10 µm, while the average crystal sizes for the comparative example (non-treated) powder at full crystallization ranged from about 10 µm to about 30 µm. On average, the spherulites of the example (plasma treated) powder at full crystallization ranged from 2 times to 3 times smaller than the spherulites of the comparative example powder at full crystallization.

These characteristics of the example (plasma treated) powder lead to improved coalescence, which leads to reduced mechanical distortion, better shape retention, and overall improved part aesthetics.

Example 4

The polyamide 12 build material described in Example 1 was subjected to oxygen plasma treatment for 60 minutes, and was used as an example powder. The polyamide 12 build material described in Example 1 was used as is (i.e., was not treated), and was used as a comparative powder.

Layers of the example powder and the comparative powder were exposed to an anti-coalescing agent (ACA, Table 1) and a penetrating agent (PA, Table 2).

TABLE 1

| Ingredient | Specific component | ACA (wt %) |
|---|---|---|
| Anti-coalescing polymer | Perfluoroalkoxy alkane | 3-10 |
| Co-solvent | 2-pyrrolidone | 5-15 |
|  | Triethylene glycol | 5-10 |
| Surfactant | TERGITOL ™ TMN-6 | 0.5-1 |
|  | TERGITOL ™ 15-S-30 | 0.25-1 |
|  | TEGO ® Wet 510 | 0.25-1 |
|  | DOWFAX ™ 2A1 | 0.1-1 |
| Humectant | LIPONIC ® EG-1 | 3-8 |
| Water | Deionized water | Balance |

TABLE 2

| Ingredient | Specific component | PA (wt %) |
|---|---|---|
| Non-ionic surfactant | TERGITOL ™ 15-S-30 | 0.45 |
| Fluoro-surfactant | CAPSTONE ® FS-35 | 0.90 |
| Anionic surfactant | DOWFAX ™ 2A1 | 0.50 |
| Co-solvent | Triethylene glycol | 8.00 |
|  | 2-pyrrolidone | 10.00 |
| Humectant | LIPONIC ® EG-1 | 5.00 |
| Water | Deionized water | Bal. |

It is desirable for the anti-coalescing agent to coat the powder particles, and it is desirable for the penetrating agent to flush through the voids among the powder particles and thus not wet the powder particles. The fluids were applied and the results were visually observed. The results of this test are shown in Table 3.

TABLE 3

|  | ACA | PA |
|---|---|---|
| Example Powder (plasma treated) | Coated well at low loadings | Did not flush nicely |
| Comparative Example Powder (non-treated) | Required higher loadings to achieve coating | Flushed nicely |

The data in Table 3 supported the mechanism of each fluid (i.e., the anti-coalescing agent is mean to coat the powder particles discretely, while the penetrating agent is meant to flush right past the powder particles); while also supporting the utility of the surface modification. In other words, the plasma treatment increased the wettability, which enhanced discrete particle coating while reducing the effectiveness of a fluid that is not meant to wet.

It is to be understood that the ranges provided herein include the stated range and any value or sub-range within the stated range, as if such values or sub-ranges were explicitly recited. For example, from about 43 mN/m to about 46 mN/m should be interpreted to include not only the explicitly recited limits of from about 43 mN/m to about 46 mN/m, but also to include individual values, such as about 43.5 mN/m, about 44.67 mN/m, about 45.0 mN/m, about 45.75 mN/m, etc., and sub-ranges, such as from about 43.53 mN/m to about 44.5 mN/m, from about 44.25 mN/m to about 45.2 mN/m, from about 44.75 mN/m to about 45.79 mN/m, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A three-dimensional (3D) printing kit, comprising:
   a build material composition including an oxygen solution-treated semi-crystalline thermoplastic polymer having a surface energy density greater than 41 mN/m, wherein a surface of the oxygen solution-treated semi-crystalline thermoplastic polymer:
   i) is modified with an amine (—NH$_2$) functional group and is prepared using ammonia; or
   ii) is modified with a urethane functional group and is prepared using a compound selected from the group consisting of urea and a carbamic acid derivative; or
   iii) is modified with an epoxy functional group and is prepared using a glycidyl methacrylate; and
   a fusing agent to be applied to at least a portion of the build material composition during 3D printing, the fusing agent including an energy absorber to absorb electromagnetic radiation to coalesce the oxygen solution-treated semi-crystalline thermoplastic polymer in the at least the portion.

2. The 3D printing kit as defined in claim 1 wherein polar elements of the oxygen solution-treated semi-crystalline thermoplastic polymer contribute to at least 5% of the surface energy density and increase a hydrophilicity of the oxygen solution-treated semi-crystalline thermoplastic polymer relative to its native semi-crystalline thermoplastic polymer.

3. The 3D printing kit as defined in claim 1 wherein the oxygen solution-treated semi-crystalline thermoplastic polymer has a surface oxygen content that is increased relative to its native semi-crystalline thermoplastic polymer.

4. The 3D printing kit as defined in claim 1 wherein the oxygen solution-treated semi-crystalline thermoplastic polymer has a bulk density after full tapped consolidation of 0.48 g/mL or less.

5. The 3D printing kit as defined in claim 1 wherein the oxygen solution-treated semi-crystalline thermoplastic polymer has an average particle size ranging from about 2 μm to about 200 μm.

6. The 3D printing kit as defined in claim 1, further comprising:
   a coloring agent selected from the group consisting of a black agent, a cyan agent, a magenta agent, and a yellow agent; or
   a detailing agent including a surfactant, a co-solvent, and water; or
   an anti-coalescing agent; or
   any combination of the coloring agent, the detailing agent, and the anti-coalescing agent.

7. The 3D printing kit as defined in claim 1 wherein one of:

the fusing agent is a core fusing agent and the energy absorber has absorption at least at wavelengths ranging from 400 nm to 780 nm; or the fusing agent is a primer fusing agent and the energy absorber has absorption at wavelengths ranging from 800 nm to 4000 nm and has transparency at wavelengths ranging from 400 nm to 780 nm.

8. The 3D printing kit as defined in claim 1 wherein the oxygen solution-treated semi-crystalline thermoplastic polymer includes a filler selected from the group consisting of titanium dioxide and glass.

9. The 3D printing kit as defined in claim 1 wherein the oxygen solution-treated semi-crystalline thermoplastic polymer is prepared using an oxygen-introducing liquid selected from the group consisting of sodium hypochlorite and hydrogen peroxide.

10. The 3D printing kit as defined in claim 1 wherein a semi-crystalline thermoplastic polymer of the oxygen solution-treated semi-crystalline thermoplastic polymer is a polyamide.

11. The 3D printing kit as defined in claim 1 wherein the surface of the oxygen solution-treated semi-crystalline thermoplastic polymer is modified with the amine (—$NH_2$) functional group and is prepared using the ammonia.

12. The 3D printing kit as defined in claim 1 wherein the surface of the oxygen solution-treated semi-crystalline thermoplastic polymer is modified with the urethane functional group and is prepared using the urea or the carbamic acid derivative.

\* \* \* \* \*